(12) United States Patent
Jung et al.

(10) Patent No.: US 11,539,419 B2
(45) Date of Patent: Dec. 27, 2022

(54) SYSTEM, METHOD, AND APPARATUS OF BEAM-TRACKING AND BEAM FEEDBACK OPERATION IN A BEAM-FORMING BASED SYSTEM

(71) Applicant: Samsung Electronics Co., Ltd., Suwon-si (KR)

(72) Inventors: Byounghoon Jung, Seoul (KR); Jungmin Moon, Suwon-si (KR); Seunghoon Park, Seoul (KR); Anil Agiwal, Suwon-si (KR); Sunheui Ryoo, Yongin-si (KR); Jungsoo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/876,639

(22) Filed: May 18, 2020

(65) Prior Publication Data
US 2020/0280359 A1 Sep. 3, 2020

Related U.S. Application Data

(63) Continuation of application No. 15/406,064, filed on Jan. 13, 2017, now Pat. No. 10,700,752.

(30) Foreign Application Priority Data

Nov. 3, 2016 (KR) .................. 10-2016-0145759

(51) Int. Cl.
*H04B 7/06* (2006.01)
*H04B 7/0408* (2017.01)
(Continued)

(52) U.S. Cl.
CPC ......... *H04B 7/0632* (2013.01); *H04B 7/0408* (2013.01); *H04B 7/063* (2013.01);
(Continued)

(58) Field of Classification Search
CPC ........................ H04B 7/0408; H04W 16/30; H04W 36/0066; H04W 36/0072; H04W 16/28; H04L 5/001; H04L 5/0062
See application file for complete search history.

(56) References Cited

U.S. PATENT DOCUMENTS 8,451,781 B2  5/2013  Jeong et al.
8,588,193 B1  11/2013  Ho et al.
(Continued)

FOREIGN PATENT DOCUMENTS

CN  101529754 A  9/2009
CN  103384386 A  11/2013
(Continued)

OTHER PUBLICATIONS

Chinese Office Action dated Oct. 10, 2020, issued in Chinese Application No. 201780006483.8.
(Continued)

*Primary Examiner* — Khaled M Kassim
*Assistant Examiner* — Berhanu D Belete
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A mobility application method of a user equipment (UE) residing in a system of wireless communication systems, which supports transmission/reception of data, using a beamforming, via multiple input multiple output (MIMO) antennas is provided. The method includes measuring beam measurement
(Continued)

reference signals that a network transmitted using different transmission nodes and evolved NodeB (eNBs) and transmitting the measured information to the network in a system using a number of beams.

12 Claims, 55 Drawing Sheets

Related U.S. Application Data

(60) Provisional application No. 62/350,453, filed on Jun. 15, 2016, provisional application No. 62/343,053, filed on May 30, 2016, provisional application No. 62/321,353, filed on Apr. 12, 2016, provisional application No. 62/291,913, filed on Feb. 5, 2016, provisional application No. 62/278,613, filed on Jan. 14, 2016.

(51) Int. Cl.
*H04W 72/12* (2009.01)
*H04W 74/00* (2009.01)
*H04W 74/08* (2009.01)
*H04B 7/0413* (2017.01)
*H04W 84/04* (2009.01)

(52) U.S. Cl.
CPC ......... *H04B 7/0617* (2013.01); *H04B 7/0695* (2013.01); *H04W 72/1284* (2013.01); *H04W 74/004* (2013.01); *H04W 74/006* (2013.01); *H04B 7/0413* (2013.01); *H04W 74/0833* (2013.01); *H04W 84/042* (2013.01)

(56) References Cited

U.S. PATENT DOCUMENTS

| | | | |
|---|---|---|---|
| 9,125,070 B2 | 9/2015 | Kim et al. | |
| 9,585,083 B2* | 2/2017 | Li | H04W 48/12 |
| 9,629,171 B2 | 4/2017 | Roy et al. | |
| 9,825,747 B2 | 11/2017 | Chen et al. | |
| 9,954,590 B2* | 4/2018 | Yu | H04B 7/061 |
| 10,149,221 B2* | 12/2018 | Kim | H04W 36/00837 |
| 10,201,018 B2 | 2/2019 | Sahlin et al. | |
| 2004/0014429 A1 | 1/2004 | Guo | |
| 2010/0027507 A1 | 2/2010 | Li et al. | |
| 2010/0032587 A1 | 2/2010 | Hosch et al. | |
| 2010/0267341 A1 | 10/2010 | Bergel et al. | |
| 2011/0080825 A1* | 4/2011 | Dimou | H04J 11/0086 370/216 |
| 2011/0237265 A1 | 9/2011 | Sugawara et al. | |
| 2012/0052828 A1 | 3/2012 | Kamel et al. | |
| 2012/0106346 A1 | 5/2012 | Aguirre et al. | |
| 2012/0320874 A1 | 12/2012 | Li et al. | |
| 2013/0028186 A1 | 1/2013 | Kim | |
| 2013/0051364 A1 | 2/2013 | Seol et al. | |
| 2013/0059587 A1 | 3/2013 | Lindoff et al. | |
| 2013/0065622 A1 | 3/2013 | Hwang | |
| 2013/0072243 A1 | 3/2013 | Yu et al. | |
| 2013/0163544 A1* | 6/2013 | Lee | H04B 7/0617 370/329 |
| 2013/0235742 A1 | 9/2013 | Josiam et al. | |
| 2013/0258885 A1 | 10/2013 | Yu et al. | |
| 2013/0301454 A1 | 11/2013 | Seol et al. | |
| 2014/0011529 A1 | 1/2014 | Bergel et al. | |
| 2014/0294110 A1 | 10/2014 | Cheong et al. | |
| 2014/0295842 A1 | 10/2014 | Choi et al. | |
| 2015/0063225 A1* | 3/2015 | Kanamarlapudi | H04W 76/25 370/329 |
| 2015/0078335 A1 | 3/2015 | Sivanesan et al. | |
| 2015/0103770 A1 | 4/2015 | Chang et al. | |
| 2015/0195750 A1* | 7/2015 | Sivanesan | H04W 74/0833 348/14.02 |
| 2015/0222345 A1 | 8/2015 | Chapman et al. | |
| 2015/0236774 A1 | 8/2015 | Son et al. | |
| 2015/0365865 A1 | 12/2015 | Belschner et al. | |
| 2015/0373596 A1 | 12/2015 | Yiu | |
| 2016/0007261 A1 | 1/2016 | Oh et al. | |
| 2016/0028519 A1 | 1/2016 | Wei | |
| 2016/0065284 A1 | 3/2016 | Yu et al. | |
| 2016/0080984 A1* | 3/2016 | Turakhia | H04W 36/0061 370/230 |
| 2016/0157267 A1 | 6/2016 | Frenne et al. | |
| 2016/0174124 A1 | 6/2016 | Basu Mallick et al. | |
| 2016/0183233 A1* | 6/2016 | Park | H04W 36/0072 370/329 |
| 2016/0192269 A1* | 6/2016 | Kim | H04W 36/0072 370/332 |
| 2016/0192401 A1* | 6/2016 | Park | H04W 72/046 370/329 |
| 2016/0192433 A1 | 6/2016 | Deenoo et al. | |
| 2016/0262047 A1* | 9/2016 | YI | H04W 24/08 |
| 2016/0353510 A1 | 12/2016 | Zhang et al. | |
| 2016/0373943 A1 | 12/2016 | Wang et al. | |
| 2017/0034868 A1* | 2/2017 | Chang | H04W 76/18 |
| 2017/0094531 A1 | 3/2017 | Kakishima et al. | |
| 2017/0104517 A1 | 4/2017 | Kakishima et al. | |
| 2017/0195894 A1 | 7/2017 | Wen et al. | |
| 2017/0195998 A1* | 7/2017 | Zhang | H04L 5/0048 |
| 2017/0325057 A1* | 11/2017 | Zhang | H04W 4/02 |
| 2017/0366996 A1* | 12/2017 | Park | H04W 48/14 |
| 2018/0020503 A1* | 1/2018 | Deenoo | H04W 24/08 |
| 2018/0041949 A1 | 2/2018 | Liu et al. | |
| 2018/0042000 A1* | 2/2018 | Zhang | H04B 7/063 |
| 2018/0138962 A1* | 5/2018 | Islam | H04L 5/0032 |
| 2018/0219604 A1 | 8/2018 | Lu et al. | |
| 2018/0248601 A1* | 8/2018 | Kishiyama | H04B 7/0417 |
| 2018/0249510 A1 | 8/2018 | Lee et al. | |
| 2019/0104549 A1* | 4/2019 | Deng | H04L 27/2607 |
| 2019/0238210 A1* | 8/2019 | Tang | H04B 7/0857 |
| 2019/0254064 A1* | 8/2019 | Islam | H04W 16/00 |
| 2019/0357200 A1* | 11/2019 | Futaki | H04W 76/10 |
| 2020/0083947 A1* | 3/2020 | Islam | H04W 74/006 |

FOREIGN PATENT DOCUMENTS

| | | |
|---|---|---|
| KR | 10-2016-0056239 A | 5/2016 |
| WO | 2014/117748 A1 | 8/2014 |
| WO | 2015/137636 A2 | 9/2015 |
| WO | 2015/141065 A1 | 9/2015 |
| WO | 2015/144256 A1 | 10/2015 |
| WO | 2015/147717 A1 | 10/2015 |

OTHER PUBLICATIONS

Nokia Networks, "Beam offloading in elevation BF/FD MIMO", 3GPP, Nov. 15-22, 2015, pp. 1-3, TSG-RAN WG1 Meeting #83, R1-157387, Anaheim, CA., USA.
Qualcomm Inc., "Beamformed CSI-RS desgin for CSI reporting class B", Nov. 15-22, 2015, pp. 1-3, 3GPP, TSG-RAN WG1 #83 6.2.4.2.1, R1-157053, Anaheim, CA., USA.
Extended European Search Report dated Jan. 24, 2019, issued in the European Applicatoin No. 17738689.3.
European Office Action dated Aug. 16, 2021, issued in European Patent Application No. 17738689.3.
Chinese Office Action dated Nov. 2, 2021, issued in Chinese Patent Application No. 201780006483.8.

* cited by examiner

FIG. 3

| RBI | RB-RSRP | | | | | | Oct 1 |
| RB-RSRP | R | R | R | R | R | R | Oct 2 |

...

| RBI | RB-RSRP | | | | | | Oct n |
| RB-RSRP | R | R | R | R | R | R | Oct n+1 |

FIG. 6

| Port# | RB-RSRP | | | | | | Oct 1 |
|---|---|---|---|---|---|---|---|
| RB-RSRP | R | R | R | R | R | R | Oct 2 |

. . .

| Port# | RB-RSRP | | | | | | Oct n |
|---|---|---|---|---|---|---|---|
| RB-RSRP | R | R | R | R | R | R | Oct n+1 |

FIG. 7

| Time# | | Port# | Oct 1 |
| P# | BRSRP | | Oct 2 |

...

| Time# | | Port# | Oct n |
| P# | BRSRP | | Oct n+1 |

FIG. 25

| TC-RNTI | C-RNTI | Beam Feedback Information |

FIG. 26

| TC-RNTI | Category (UL Beam Feedback) | C-RNTI | Beam Feedback Information |

FIG. 31B

| BI_old | | | | | | | Oct 1 |
| BI_old | BI_new | | | | | | Oct 2 |
| BI_new | R | R | R | R | R | R | Oct 3 |

FIG. 32A

| RBI | R | R | R | R | R | Oct 1

FIG. 32B

| RBI_old | RBI_new | R | R | Oct 1 |

SYSTEM, METHOD, AND APPARATUS OF BEAM-TRACKING AND BEAM FEEDBACK OPERATION IN A BEAM-FORMING BASED SYSTEM

CROSS-REFERENCE TO RELATED APPLICATION(S)

This application is a continuation application of prior application Ser. No. 15/406,064, filed on Jan. 13, 2017, which was based on and claimed priority under 35 U.S.C. § 119(e) of a U.S. provisional patent application Ser. No. 62/278,613, filed on Jan. 14, 2016, in the U.S. Patent and Trademark Office, of a U.S. provisional patent application Ser. No. 62/291,913, filed on Feb. 5, 2016, in the U.S. Patent and Trademark Office, of a U.S. provisional patent application Ser. No. 62/321,353, filed on Apr. 12, 2016, in the U.S. Patent and Trademark Office, of a U.S. provisional patent application Ser. No. 62/343,053, filed on May 30, 2016, in the U.S. Patent and Trademark Office, of a U.S. provisional patent application Ser. No. 62/350,453, filed on Jun. 15, 2016, in the U.S. Patent and Trademark Office, and under 35 U.S.C. § 119(a) of a Korean patent application number 10-2016-0145759, filed on Nov. 3, 2016, in the Korean Intellectual Property Office, the disclosure of each of which is incorporated by reference herein in its entirety.

TECHNICAL FIELD

The present disclosure relates to a system, a method, and an apparatus that perform beam-tracking and beam feedback operation in a beamforming-based system. More particularly, the present disclosure relates to beam feedback and beam management (beam tracking) in a wireless system where user equipment (UE) and evolved Node B (eNB) using multiple input multiple output (MIMO) antennas coexist. The present disclosure relates to a beam feedback procedure that informs a beam using entity (eNB) of beam information observed and measured by a beam measuring entity UE in an environment and a wireless communication system where a UE and an eNB using MIMO antennas coexist, or a system employs a beamforming, particularly, a beamforming using MIMO antennas, and a method of continuously tracking beams using the beam feedback procedure.

BACKGROUND

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post long term evolution (LTE) systems.'

In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example beam-forming, massive multiple input multiple output (MIMO), full dimensional MIMO (FD-MIMO), array antennas, analogue beam-forming, large scale antennas, and the like.

In order to improve system networks for 5G communication systems, various technologies have been developed, e.g., evolved small cell, advanced small cell, cloud radio access network (cloud RAN), ultra-dense network, device to device communication (D2D), wireless backhaul, moving network, cooperative communication, coordinated multi-points (CoMP), interference cancellation, and the like.

In addition, for 5G communication systems, other technologies have been developed, e.g., hybrid frequency-shift keying (FSK) and QAM modulation (FQAM) and sliding window superposition coding (SWSC), as advanced coding modulation (ACM), filter bank multi carrier (FBMC), non-orthogonal multiple access (NOMA), sparse code multiple access (SCMA), and the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system, a method, and an apparatus that perform beam-tracking and beam feedback operation in a beamforming-based system. The present disclosure further provides beam feedback and beam management (beam tracking) in a wireless system where user equipment (UE) and evolved Node B (eNB) using multiple input multiple output (MIMO) antennas coexist.

Another aspect of the present disclosure is to provide a method of measuring a reference signal for selecting a transmission/reception node and a beam of a UE in an environment where transmission/reception points, in the same eNB maintaining the radio resource control (RRC) connection state with the UE, have different protocol architectures, a method of feeding back measured information, a method of changing in a beam and a transmission/reception node, a method of allocating a reference signal for a transmission/reception node and a beam unique for a UE of a system including a transmission/reception node and an eNB, adapted to the methods, a method of sharing information regarding allocated resources with UE, a method of signaling and allocating resources for receiving feedback of the measured information, and a method of changing in a beam and a transmission/reception node.

Another aspect of the present disclosure is to provide a method that feeds back beam information and changes beams in such a way that a UE periodically measures beam information and reports the information to an eNB, and the eNB and the UE select a restricted number of beams and transmit/receive information to/from each other via the selected beams, thereby increasing the resource use efficiency.

In accordance with an aspect of the present disclosure, a method of beam feedback of a terminal is provided. The method includes receiving a beam feedback trigger condition, determining whether beam feedback satisfies the beam feedback trigger condition, when ascertaining that beam feedback satisfies the beam feedback trigger condition, triggering beam feedback from a medium access control (MAC) layer of the terminal, and transmitting a MAC control element (MAC CE) including beam feedback information, based on the beam feedback trigger.

In accordance with another aspect of the present disclosure, a terminal is provided. The terminal includes a transceiver for performing the transmission and reception of signals, and a controller for receiving a beam feedback trigger condition, determining whether beam feedback satisfies the beam feedback trigger condition, triggering, when ascertaining that beam feedback satisfies the beam feedback trigger condition, beam feedback from a MAC layer of the terminal, and transmitting a MAC CE including beam feedback information, based on the beam feedback trigger.

In accordance with another aspect of the present disclosure, a method of receiving beam feedback in a base station is provided. The method includes transmitting a beam feedback trigger condition to a terminal, and receiving, from the terminal, a MAC CE including beam feedback information. The beam feedback information is triggered from a MAC layer of the terminal when beam feedback satisfies the beam feedback trigger condition.

In accordance with another aspect of the present disclosure, a base station is provided. The base station includes a transceiver for performing the transmission and reception of signals, and a controller for transmitting a beam feedback trigger condition to a terminal, and receiving, from the terminal, a MAC CE including beam feedback information. The beam feedback information is triggered from a MAC layer of the terminal when beam feedback satisfies the beam feedback trigger condition.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description, taken in conjunction with the accompanying drawings, in which:

FIGS. 2 to 5 are diagrams showing a structure of a frame for feeding back a multiple beam identification (ID) and a beam measurement value according to various embodiments of the present disclosure;

FIGS. 6 and 7 are diagrams showing a structure of a frame for feeding back a beam measurement value and a resource of a beam according to various embodiments of the present disclosure;

FIG. 25 is a diagram showing a frame structure of beam feedback transmitted by a UE according to an embodiment of the present disclosure;

FIG. 26 is a diagram showing a frame structure of beam feedback transmitted by a UE according to an embodiment of the present disclosure;

FIGS. 31A and 31B are diagrams showing frame structures for a beam change according to various embodiments of the present disclosure;

FIGS. 32A and 32B are diagrams showing frame structures for a beam change according to various embodiments of the present disclosure;

Throughout the drawings, it should be noted that like reference numbers are used to depict the same or similar elements, features, and structures.

DETAILED DESCRIPTION

Figure 1:
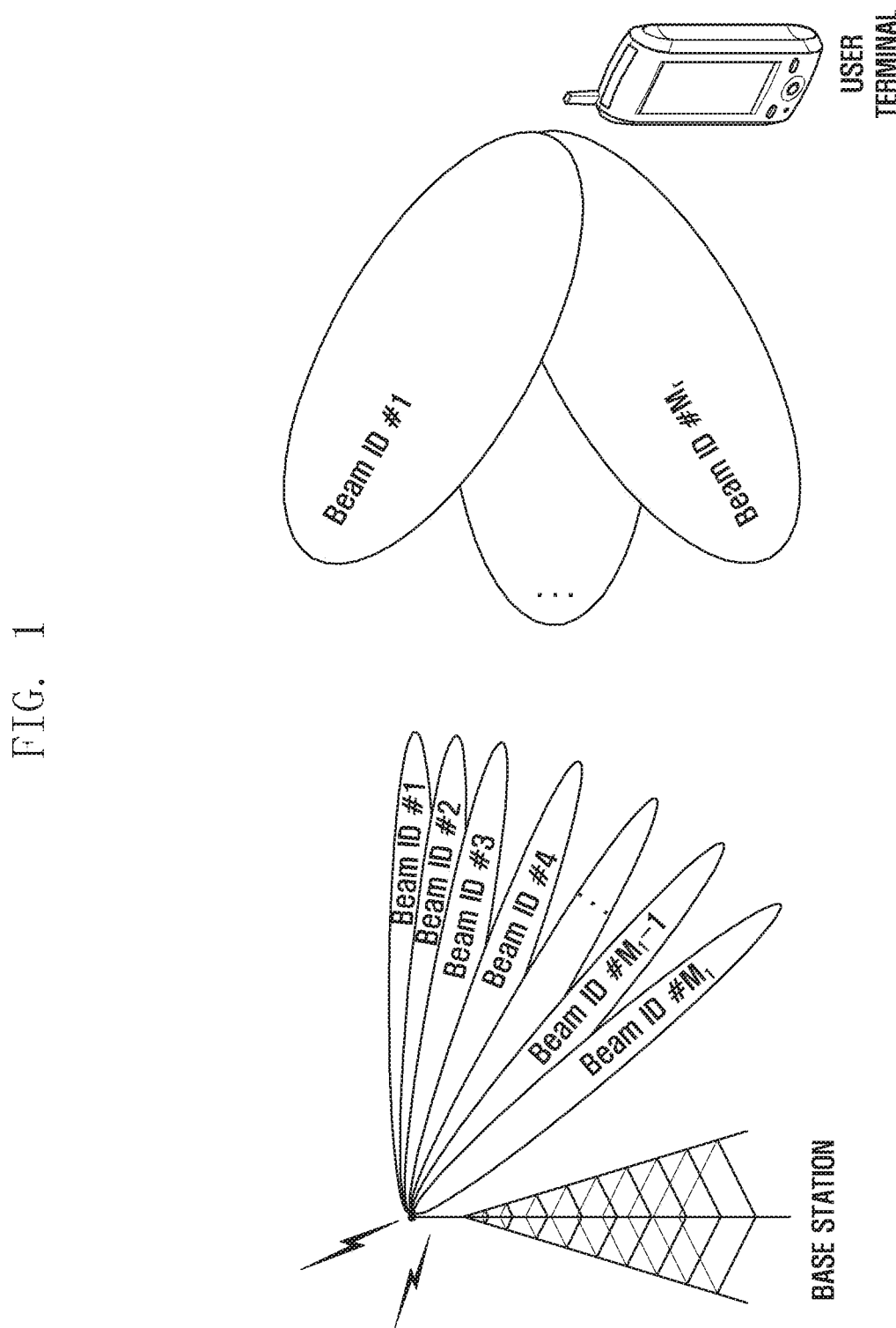
FIG. 1 is a diagram showing a multiple beam system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Smartphones, and the like, have started to be widely used, and this has led to a rapid increase in users' data use. Demand for data use has greatly increased. This means that wider bandwidth is required. To this end, high frequency needs to be used. The higher the frequency, the higher the degree of attenuation in signals according to distances. For example, when a center frequency of 30 or more GHz is used, the coverage area of an evolved NodeB (eNB) is reduced due to signal attenuation, and this causes the need to use a number of beams. Using a number of beams causes increases in delays.

Wireless communication systems consider an architecture where one eNB including a number of available transmission/reception nodes supports a wide physical coverage area to improve delays due to frequent UE information exchange and to efficiently use resources.

Examples of the wireless communication systems are:

Distributed antenna system (DAS) is a physical antenna implemented with transmitters/receivers that differ from each other under the control of one eNB, and transmits/receives the same signal.

Remote radio head (RRH) system is a structure including an antenna and a radio frequency (RF) unit, which is implemented with transmitters/receivers that differ from each other under the control of one eNB, and transmits/receives different signals.

Coordinated multi-points (CoMP) transmission/reception system is a structure configured with transmitters/receivers which differ from each other under the control of one or more different eNBs, and operates in such a way that the transmitters/receivers are synchronized with one user and simultaneously transmit/receive the same information to/from the user, or one transmission/reception node transmits/receive information to/from the user while the other transmitters/receivers are silent.

A beamforming technology and a system according to embodiments of the present disclosure are as follows.

A. Analogue Beamforming:

A technology of forming a beam that obtains an antenna gain with directivity in a physically specified direction, in such a way that different levels of transmission power and different phases are transmitted by using a number of array antenna and antenna radiation patterns are superimposed Set a beam in a desired direction without information regarding a channel of a desired receiver from multiple input multiple output (MIMO) antennas Only transmit/receive once in one direction (radiation patterns in other directions are cancelled)

Using a number of antennas increases the intensity of directivity to be higher and thus makes it possible to transmit signals to a further distance, under the same power condition, compared to other antennas, and forms a beam with a relatively large antenna gain (beam width/beam length difference, and the like, according to the number of antennas)

Beam length is long, however, it supports only a narrow area

B. Digital Beamforming:

A technology of forming a number of orthogonal beams that cancels interference between desired channels in a transmission/reception environment of MIMO antennas in such a way as to apply different encoding schemes to information before transmitting according to antennas, using information regarding multiple channels between antennas with different levels of intensity Applying a pre-coding scheme to data to be transmitted to individual antennas and thus using different channel characteristics as much as possible Single-user MIMO and Multi-user MIMO can be supported C. Hybrid Beamforming:

A technology of simultaneously using an analogue beamforming and a digital beamforming A technology that uses digital beamforming by applying different types of pre-coding schemes according to antennas to transmitting antennas and a beam formed by analogue beamforming In the following description, embodiments of the present disclosure are described, based on one of the analogue beamforming, the digital beamforming, and the hybrid beamforming and beams formed by the beamforming. A method of occupying a resource, which can be identified physically or based on frequency/time/code/signal, and the like, and transmitting information via the resource is called 'beamforming.' In this case, the occupied resource can be applied to all systems called a beam.

Related technology used in a wireless communication technology following the 3GPP standard has characteristics as follows.

A. Uplink Transmission (Transmission from a Station to a Base Station):

Basically, transmission is performed via a resource that is allocated and reserved by an eNB (base station)

A UE which needs to perform uplink transmission transmits a request for a resource that an eNB has allocated, i.e., scheduling request (SR), and is allocated the resource for uplink transmission. More specifically, a UE transmits SR, then transmits a buffer status report (BSR) via a resource which has been allocated by the eNB, notifies the eNB of the use of uplink data, is allocated a resource, and performs uplink transmission. The UE performs transmission, via contention with another UE or via contention-based random access channel (RACH)

B. Channel Measurement Feedback:

A UE has notified an eNB of its measured channel information via a technology of the related art. The technology of the related art is channel measurement and feedback performed by a physical layer. Examples of the measured channel information reference signal received power (RSRP), reference signal received quality (RSRQ), signal-to-noise ratio (SNR), signal-to-interference-plus-noise ratio (SINR), channel quality indicator (CQI), channel state information-reference signal (CSI-RS), and the like. These types of information may be obtained in such a way that the UE measures a signal transmitted from an eNB, e.g., cell specific reference signal or common reference signal (CRS), dedicated reference signal (DRS), CSI-RS, and demodulation reference signal (DMRS).

The UE transmits the obtained information via a resource that an eNB allocated based on an uplink transmission protocol. When a wireless communication technology of the related art ascertains that there is no resource allocated by an eNB, it does not have any method to provide the information to the eNB or has not needed to provide the information to the eNB.

A wireless communication system of the related art transmits signals for maintaining the connectivity, such as control signals and reference signals, via a frequency channel and a time resource which can allow for common reception, so that all users can hear the signals, in order to improve the communication efficiency.

In contrast, a beamforming system using MIMO antennas allocates different resources, such as frequency channel, time, beam, code, and the like, to different beams, and uses the resources and beams. The beamforming system cannot use a resource due to a change in beam characteristics (direction, channel, and the like) that occurred between timings where the resource is reserved and used.

For example, in a system using a number of analogue beams for transmission/reception, a UE and an eNB select a specified beam which can be estimated to have high performance and perform the transmission/reception of information via the selected beam. In this case, the eNB pre-reserves a resource for uplink transmission by the UE, to use the best beam or a beam with the lowest number of problem that the eNB has known about at the pre-reservation time. However, a reserved beam resource may experience a change in channel due to movement of a UE or other variables (e.g., an obstacle that abruptly appears, such as, a car, weather change, and the like). When uplink information fails in transmission due to change in characteristics of a reserved beam resource, a technology of the related art has not addressed the issue immediately.

Therefore, the beamforming system using MIMO antennas, which allocates different resources, such as frequency channel, time, beam, code, and the like, to different beams, and uses the resources and beams, needs a beam management technique that exchange beam state information between a UE and an eNB, tracks a change of a beam rapidly, and applies the beam to the transmission.

In the case of the technology of the related art that transmits signals for maintaining the connectivity, such as control signals and reference signals, via a frequency channel and a time resource which can allow for common reception so that all users can hear the signals, a state of a channel that has been used may be low quality. In order to address this issue, when there is another channel of another frequency, the low quality channel is changed to the other channel of the other frequency. Alternatively, when a radio link failure condition is satisfied, the technology of the related art needs to declare the failure and then attempt to re-connect to the network.

However, in the case of the beamforming system using MIMO antennas, which allocates different resources, such as frequency channel, time, beam, code, and the like, to different beams, and uses the resources and beams, although characteristics of the beam used by the system becomes low, the probability that another available beam will exist at the same location is high. In this case, a UE may have a chance to maintain the connectivity via the available beam. Therefore, a technology is needed to use a series of operations described above.

In the case of the technology of the related art (using an omni-antenna, a system using a digital beamforming, and the like), the state of a channel that has been used may be low quality. In order to address this issue, the low quality channel is changed to another channel of another frequency. Alternatively, when a radio link failure (RLF) condition is satisfied, the technology of the related art needs to declare the failure and then attempt to re-connect to the network.

However, in the case of a system using an analogue beamforming, although the state of a channel of a beam that the system has used becomes low quality, the probability that another available beam will exist at the same location is high. In this case, the system may maintain the connectivity via the available beam.

In the case of a technology of the related art, a UE may inform an eNB of a change in state of a resource, particularly, a channel, which is in use in the eNB, using channel information feedback which can be performed via only a physical layer. The UE, according to a technology of the related art, receives specified signals (CRS, DRS, RS, Beam RS, CSI-RS, and the like) transmitted from an eNB, detects channel states, processes and packages the channel state information as feedback information (e.g., CQI, RI, PMI, and the like), and transmits the feedback information to the eNB, via a resource that is allocated by the eNB and is capable of performing uplink transmission, e.g., physical uplink control channel (PUCCH), physical uplink shared channel (PUSCH), and the like. Alternatively, a UE transmits an uplink transmission request (or a request for allocating a resource for uplink transmission) to an eNB, is allocated a resource, and transmits channel state information.

However, in the case of the beamforming system using MIMO antennas, which allocates different resources, such as frequency channel, time, beam, code, and the like, to different beams, and uses the resources and beams, a unique resource (e.g., analogue beam, hybrid beam, and the like) that UE/eNB has used may be low in performance. In this case, a new protocol is needed which informs the eNB of another available resource, is allocated a corresponding resource later, and uses the allocated resource.

An embodiment of the present disclosure designs a beam feedback procedure that informs an eNB of beam information observed and measured by the UE, without delay, in an environment and a wireless communication system where a UE and an eNB using MIMO antennas coexist, or a system employing a beamforming, particularly, multiple beams, and a method of continuously tracking beams using the beam feedback procedure.

FIG. 1 is a diagram showing a multiple beam system according to an embodiment of the present disclosure.

Referring to FIG. 1, a multiple beam system includes a UE and an eNB (base station) forming analogue beams in various directions. The analogue beam used by an eNB and a UE may be formed by a number of small antenna arrays. The analogue beam performs wireless transmission/reception in one direction, using one antenna array group once. When one or more antenna array groups which may be simultaneously operated are included, the analogue beam may perform wireless transmission/reception in one or more directions once.

According to an embodiment of the present disclosure, in a beamforming system using MIMO antennas allocates different resources, such as frequency channel, time, beam, code, and the like, to different beams, and uses the resources and beams, an eNB (or transmission/reception node) and a UE consider an environment for performing transmission/reception using a pair or beams, once, using one or more beams. For example, when an eNB or a UE does not use a number of beams, e.g., when an eNB uses one or more beams and a UE uses one beam or when an eNB uses one beam and a UE uses one or more beams, an embodiment provides a method of exchanging information regarding available beams.

More specifically, a UE performs the following three processes, (1) beam information measurement, (2) providing beam information, and (3) changing beams in use, exchanges and alters beam information in use in the same eNB (or transmission/reception node), discovers a beam suitable for a corresponding condition, and uses a corresponding beam. In a beamforming system using MIMO antennas allocates different resources, such as frequency channel, time, beam, code, and the like, to different beams, and uses the resources and beams, an eNB and a UE needs to detect a channel state of a transmission/reception beam in real time, and to maintain and alter a beam tracking and using the channel state. To this end, the following operations are needed.

A. Beam Measurement

Beam measurement is performed to measure channels of beam pairs created by a combination of beams between a UE and a neighboring eNB Beam measurement may be periodically or aperiodically performed by the UE or the eNB Embodiments of the present disclosure are not limited by types of beam measurement methods, assuming an environment where a UE or an eNB may measure channel states of each other's beam pairs Embodiments of the present disclosure assume an environment where a UE measures beam information by any method, on background, updates a measured value according to every beam information measurement, and recognizes beams B. Beam Feedback or Beam Reporting Beam feedback is an operation that a UE informs an eNB of its measuring beam information Since a transmission node, i.e., an eNB (or UE), does not know downlink (or uplink) beam information, a UE (or an eNB) needs to perform feedback Beam information feedback may be periodically or aperiodically performed, and a UE or an eNB may perform beam information feedback to each other The embodiment of the present disclosure is described in such a way that the UE transmits its measuring beam information to an eNB. However, it should be understood that the present disclosure is not limited to beam feedback or beam reporting performed by the UE. The embodiment may also be modified in such a way that an eNB transmits its measuring beam information to the UE. Therefore, the following procedure for beam feedback and beam change performed by the UE may be applied to the operations of an eNB in the same or similar way as the UE.

In embodiments of the present disclosure, beam feedback and beam feedback information is referred to beam state information (BSI) or beam refinement information (BRI).

C. Beam Change

An eNB or a UE is capable of determining a beam pair to be used later, based on received beam feedback information An eNB or a UE is capable of performing a number of operations to use the determined beam pair The following description provides summary of embodiments of the present disclosure.

In an eNB/UE system performing communication using an analogue beam (a beam with a fixed physical direction), an available beam may be changed. In order to track the changed beam and change a beam in use, medium access control (MAC) Layer operation is proposed.

Embodiments of the present disclosure provide a protocol and a method of feeding back measured beam information to other party, and a method of changing a beam used by both parties using the feedback.

A. Method of Determining the Need for a Beam Change by the UE

When the performance of a beam in use becomes low or a beam (another beam) which is better than the beam in use is observed, a beam measurement entity (UE) determines that a beam in use needs to be changed.

A UE determines to transmit, to an eNB, feedback for requesting beam information and a corresponding determined detail B. Beam Feedback Configuration of UE Identification of a beam to transmit information as feedback a. When a reference signal containing a beam ID is received or a beam ID of the received signal is known:

a1. Feedback containing a corresponding ID b. When a reference signal without a beam ID is received:

b1. A corresponding beam receiving time, transmitted information regarding an eNB antenna port, which may be derived from a reception frequency location (or a corresponding frequency location) (due to presence of prior information), and the like, are transmitted instead of a beam ID b2. The eNB saves a beam used for transmission, a transmission timing, and a port used for transmission, maps them with corresponding received feedback information, and selects a beam.

C. Beam Feedback of UE

Available uplink beam feedback method:

a. Dedicated Feedback: Uplink beam feedback used in such a way that an eNB allocates a specified resource operated based on scheduling, such as beam/time/frequency, and the like, to a specified UE, and the UE transmits beam information to the eNB.

b. UL Beam Sweep Feedback: uplink beam feedback used in such a way that an eNB sets a reception interval, sweeping available beams, and in a set interval, a UE (1) repeats transmission of the identical information, with respect to reception beams of eNBs that differ from each other, or (2) selects a specified beam (or beams) and transmits the identical information via the selected beam (beams).

b1. Transmittable, despite beam change, without causing any problems.

b2. A specified resource in a corresponding interval may be scheduled to a specified UE.

b3. A corresponding interval may be used so that a number of unspecified UEs perform transmission freely (e.g., 3GPP LTE RACH).

Primary beam feedback method according to embodiments of the present disclosure.

a. Basically, a UE uses Dedicated Feedback. When detecting that a beam in use needs to be changed, a UE performs UL Beam Sweep Feedback.

b. Basically, a UE uses Dedicated Feedback. In a state where the UE recognizes that a beam in use needs to be changed, when the UE estimated that the performance of a beam of the related art is low, it performs UL Beam Sweep Feedback.

c. Feedback methods according to various embodiments of the present disclosure, which will be described below, may be used.

In the following description, operations and procedures according to various embodiments of the present disclosure are explained.

The term 'UE (or terminal)' is referred to as a beam measurement entity performing beam measurement. The term 'evolved Node B (eNB) (or base station) is referred to as a beam using entity configured to transmit a reference signal for beam measurement, allocate a resource to a beam measurement entity, and use the measurement beam information fed back by the beam measurement entity.

In an embodiment of the present disclosure, the UE serves as an entity for performing beam measurement and feedback and the eNB serves as an entity for performing the transmission of a beam reference signal and the allocation of resource, however, it should be understood that the UE and the eNB are not limited to the operations as described above. The embodiment may be modified in such a way that the eNB serves as an entity for performing beam measurement and feedback and the UE serves as an entity for performing the transmission of the beam reference signal and the allocation of resource.

In the following embodiments of the present disclosure, when one beam of a beam measurement entity and one beam of a beam using entity, which may be estimated to have the best performance, are determined from among the analogue beams that a beam measurement entity and a beam using entity can use, the two beams of the two entities form one beam pair (or beam pairs), which is called 'best beam (or best beams).' Alternatively, the 'best beam (or best beams)' may also be referred to as two individual beams of the beam pair (or beam pairs). In an embodiment of the present disclosure, the 'best beam' is referred to as a beam with the best performance that a beam using entity (eNB) uses to communicate with a beam measurement entity (UE), from among a pair of best beams measured according to reference signals transmitted by the beam using entity (eNB), however, it should be understood that the present disclosure is not limited to the best beam as defined above. For example, the best beam according to embodiments of the present disclosure may be used for various meanings.

The beam measurement entity may notify all beam using entities of information regarding the best beam pair (or beam pairs) as feedback. Alternatively, the beam measurement entity may notify a corresponding beam measurement entity of information regarding only one beam that a beam using entity will use (e.g., a UE may notify a corresponding UE of information regarding only one beam of an eNB, which will be used when the eNB transmits/receives information to the corresponding UE).

<Measurement Information Transmitted by a Measurement Entity, Via Beam Feedback>

The UE performs measurement and transmits feedback information based on the measurement to an eNB. In this case, the feedback information may have one of the following configurations.

A. Beam feedback information configured with eNB beam ID (bit stream, bit map)+beam quality measurement value (RSRP, RSRQ, CQI, SINR, SNR, RSSI, . . . ).

Figure 2:
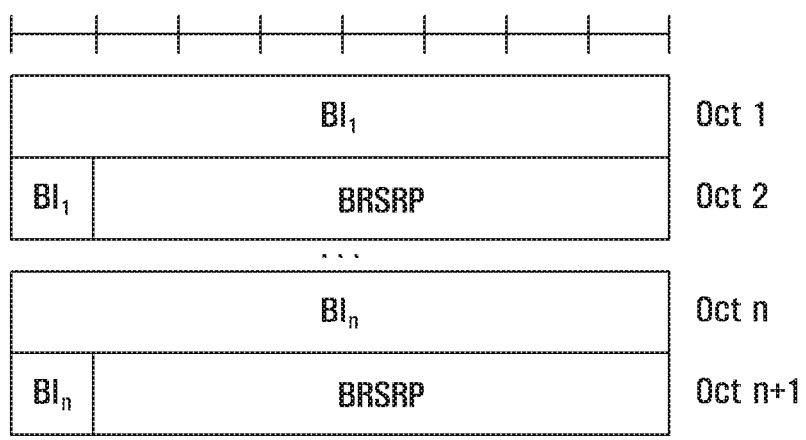

FIG. 2 is a diagram showing a structure of a frame for feeding back a multiple beam ID and a beam measurement value according to an embodiment of the present disclosure.

Referring to FIG. 2, an example of MAC-CE structure for transmitting N beam information (ID 9 bit, BRSRP 7 bit) is shown.

BI (9-bit): a field indicating a beam index

BRSRP (7-bit): a field indicating RSRP of a beam

Although the embodiment shown in FIG. 2 is described in such a way that the BI is 9 bits and BRSRP is 7 bits, it should be understood that individual fields may be created with any other size bits.

FIG. 3 is a diagram showing a structure of a frame for feeding back a multiple beam ID and a beam measurement value according to an embodiment of the present disclosure.

Referring to FIG. 3, an example of MAC-CE structure for transmitting N beam information (eNB beam ID 3 bits, BRSRP 7 bits) is shown.

RBI (3-bit): a field indicating a beam index
RB-RSRP (7-bit): a field indicating reception RSRP of a beam
R: Reserved bit, set to "0"

Although the embodiment shown in FIG. 3 is described in such a way that the RBI is 9 bits and RB-RSRP is 7 bits, it should be understood that individual fields may be created with any other size bits.

B. Beam feedback information configured with an eNB beam ID (i.e., bit stream, bit map)+UE beam ID (bit stream, bit map)+beam quality measurement value (RSRP, RSRQ, CQI, SINR, SNR, RSSI, . . . ).

Figure 4:
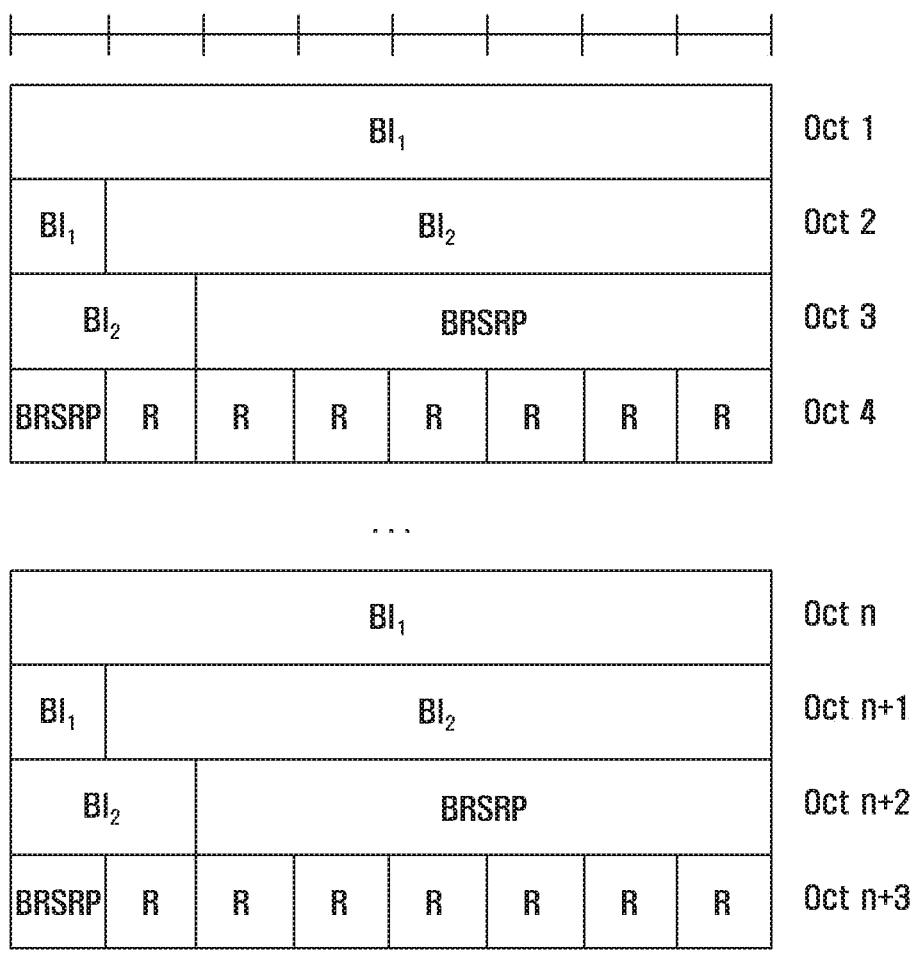

FIG. 4 is a diagram showing a structure of a frame for feeding back a multiple beam ID and a beam measurement value according to an embodiment of the present disclosure.

Referring to FIG. 4, an example of MAC-CE structure for transmitting N beam information (eNB ID 9 bits, UE ID 5 bits, BRSRP 7 bits) is shown.

Figure 5:
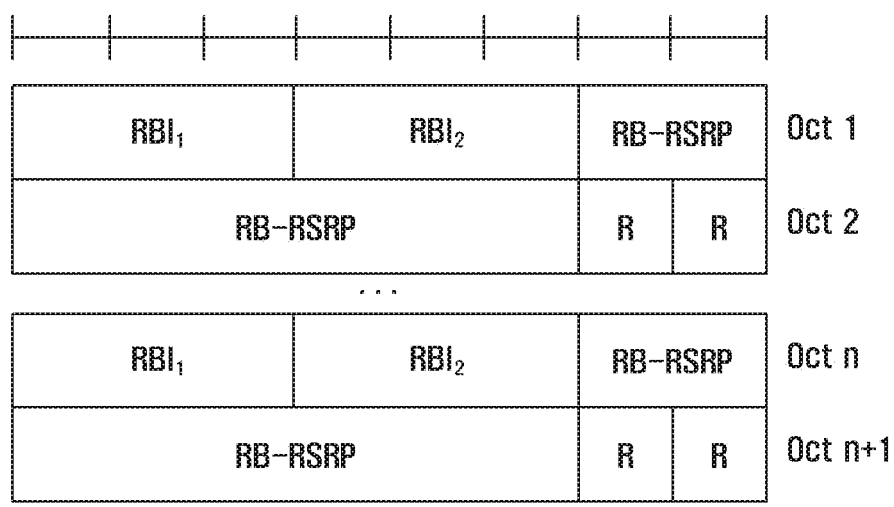

BI_1 (9-bit): a field indicating a beam index of an eNB
BI_2 (9-bit): a field indicating a beam index of UE
BRSRP (7-bit): a field indicating RSRP of a beam FIG. 5 is a diagram showing a structure of a frame for feeding back a multiple beam ID and a beam measurement value according to an embodiment of the present disclosure.

Referring to FIG. 5, an example of MAC-CE structure for transmitting N beam information (eNB beam ID 3 bits, UE beam ID 3 bits, BRSRP 7 bits) is shown.

RBI_1 (3-bit): a field indicating a beam index of an eNB
RBI_2 (3-bit): a field indicating a beam index of a UE
BRSRP (7-bit): a field indicating RSRP of a beam The beam ID may be a unique beam ID of each of the eNB and UE. Information regarding a corresponding beam ID is included in a reference signal for beam measurement and transmitted via the reference signal.

The beam ID may be a beam ID (not unique) specifying a location of a resource transmitting a reference signal for measuring a beam by each of the eNB and the UE. A reference signal for beam measurement may be encoded or scrambled, using information regarding a corresponding beam transmission location, and then transmitted. Alternatively, a reference signal for beam measurement may create a sequence, using information regarding a corresponding beam transmission location, and then the sequence may be transmitted.

The beam ID and the beam measurement information may be transmitted via various methods, such as UL Control Information, radio resource control (RRC) message Information Element (RRC-IE), and the like, instead of MAC-CE.

The beam measurement information may be various measurement values, such as, RSRQ, CQI, SNR, SINR, RSSI, and the like, as well as RSRP.

C. Beam feedback information configured with a method of specifying an eNB beam ID as part of the reception resource, such as a time when a UE received a beam measurement reference signal, a reception location, a reception antenna port, and the like, and a corresponding beam quality measurement value (RSRP, RSRQ, CQI, SINR, SNR, RSSI, . . . )

c1. The UE may know a reception resource of a received beam measurement reference signal (e.g., a reception time, a slot number, a frame number, a reception cell ID, a transmission node ID, a transmission antenna port, a reception antenna port, a reception beam ID, a reception frequency band, a reception channel number, a reception carrier number, a transmission channel name, and the like).

c2. When an eNB and a UE knows about a rule to converting a transmission/reception resource of the beam measurement reference signal to a variable between them, beam feedback including reception resource information instead of a received unique beam ID may be transmitted.

For example, when the number of transmitting antennas of a corresponding eNB, as a preset number, repeats in each resource (e.g., a sub carrier, a symbol, a slot, a sub-frame, and the like), and there is a protocol to transmit a beam measurement reference signal For example, an instance that there is a protocol to repeat the transmission of the same beam to every a specified resource (e.g., a sub-frame, a cycle, a slot, a sub-carrier, and the like). In this case, the pattern may have had a reference (e.g., from the top, bottom, and middle of a frequency band used by an eNB, and the like).

Alternatively, in an instance where there is a rule that can include correct transmission locations by ports, using an equation, (e.g., the mod operation of reception sub-carrier number x has: mod (x, 2), mod (x, 4), mod (x, 8), mod (x, 10), mod (x, 16), and the like) and the like.

The UE knowing the rule is capable of substituting reception resource information with a beam ID and transmitting corresponding feedback.

FIG. 6 is a diagram showing a structure of a frame for feeding back a beam measurement value and a resource of a beam according to an embodiment of the present disclosure.

Referring to FIG. 6, an example of a frame structure (MAC-CE) for feeding back transmission port number (3-bit) of a beam measurement reference signal and a beam measurement value is shown.

Port #: a field indicating a transmission port number. The port # may be a reception port number.

FIG. 7 is a diagram showing a structure of a frame for feeding back a beam measurement value and a resource of a beam according to an embodiment of the present disclosure.

Referring to FIG. 7, an example (P #=Port #) of a frame structure (MAC-CE) for feeding back a reference signal transmission time for beam measurement (e.g., a subframe number, a slot number, a symbol number, and the like) (6-bit), a transmission antenna port number (3-bit), and a beam measurement value is shown.

Time #: a field indicating a reference signal transmission time for beam measurement. The port # may be a reception port number. The reference signal transmission time for beam measurement may be a reference signal reception time. The reference signal transmission/reception time may be an identifier of a resource (e.g., a channel number, a frequency number, a slot number, a frame number, a coverage area number, and the like), instead of time. The reference signal transmission/reception time and the transmission/reception port number are 6-bit and 3-bit in size, respectively, but are not limited thereto.

In addition, the beam feedback transmission frame may include a Beam Change Request Indicator of 1 bit (or a bit size of a specified beam ID, 1-bit indicator attached to every beam ID) requesting to change a beam in use to a beam which will be used in the future (e.g., the base beam, the first transmitted beam, and the last transmitted beam) included in feedback information transmitted by the UE.

<Beam Feedback and Beam Reporting>

In the following description, operations related to beam feedback transmission of UE, the allocation of beam feedback resources by an eNB, related to UE's operations, and the reception of beam feedback by the eNB are explained via various embodiments.

In a system where an eNB allocates uplink transmission resources and controls a UE using corresponding resources, such as an LTE system, when a UE of the related art uses a technology of the related art, it transmits feedback via the following methods, with no choice.

Figure 8:
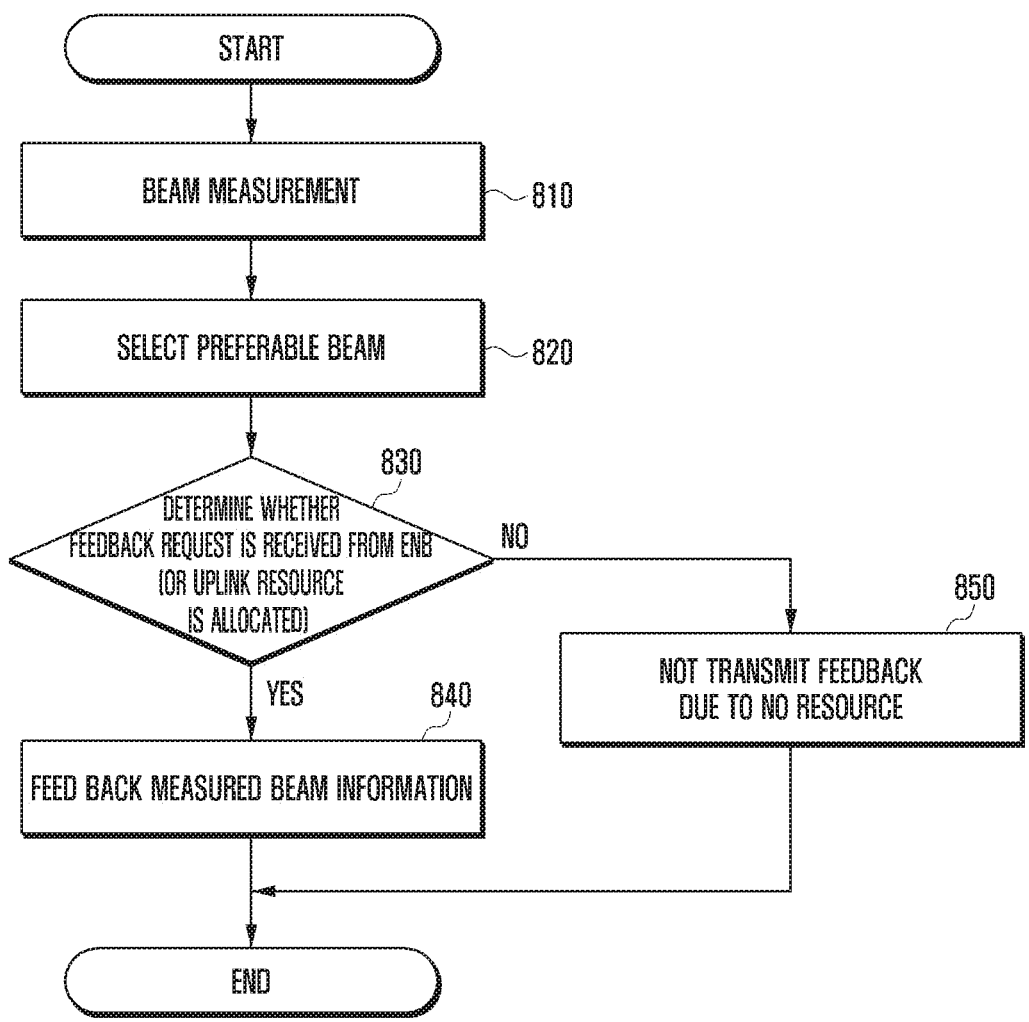
FIG. 8 is a flowchart that describes a method for a user equipment (UE) to perform beam measurement and feedback according to an embodiment of the present disclosure.

FIG. 8 is a flowchart that describes a method for a UE to perform beam measurement and feedback according to an embodiment of the present disclosure.

Referring to FIG. 8, the UE measures a beam in operation 810. The UE selects a preferable beam based on the beam measurement result in operation 820.

The UE determines whether it receives a feedback request from an eNB in operation 830. Presence of a feedback request from an eNB includes an instance that an eNB has already allocated an uplink resource for beam feedback to the UE.

When the UE has received a feedback request from an eNB in operation 830, it is capable of feeding back its measured beam information to the eNB via an uplink resource allocated by the eNB in operation 840. On the other hand, when the UE has not received a feedback request from an eNB in operation 830, since the UE is not allocated an uplink resource for feeding back beam information, it does not transmit its measured beam information to the eNB in operation 850. In this case, the UE terminates the procedure or may feedback beam information to the eNB after it is allocated an uplink resource.

As described above, when the UE does not have an uplink resource to transmit its beam measurement result, it does not perform uplink transmission to the eNB until it is allocated an uplink resource by the eNB. For example, when an abrupt change in a beam state occurs, e.g., when the quality of a serving beam in use abruptly decreases or when another neighboring beam needs to be used, the UE cannot transmit necessary beam information to the eNB at the right moment. This problem is more markedly shown in extremely high frequency environment where the beam width gradually decreases and the number of beams that an eNB needs to transmit/receive by turns increases. An eNB is capable of transmitting/receiving only a restricted number of beams once. In order to transmit feedback to an eNB using a desired beam, the UE needs to wait for the allocation of a resource by the eNB for a relatively long period of time, which is disadvantageous.

Therefore, in order to address the issue, in the case of the beamforming system using MIMO antennas allocates different resources, such as frequency channel, time, beam, code, and the like, to different beams, and uses the resources and beams, the UE needs to support the UE capable of triggering and transmitting beam feedback information, a protocol, and the system. The trigger of beam feedback transmission by the UE is performed in such a way that a higher layer compares beam measurement values with each other, determines a condition as to whether it is used, and transmits information, not in such a way that physical layers, supported by a wireless communication technology of the related art, such as LTE, and the like, use allocated resources and perform feedback.

More specifically, a measurement value of each beam (or each beam pair), which can be obtained by measuring beam measurement signals, may vary to an instant value like a wave according to channel fluctuation. Changing a beam using this instant value to another beam causes a high risk for performance guarantee and appropriateness of the beam change. Therefore, the UE needs to take arithmetic mean/ geometric mean/moving mean, and the like, considering a preset number of or more such measurement values, compare an average measurement value of one beam with that of another beam, and determine whether it performs beam change. It is suitable for a higher layer (MAC, RLC, . . . ), rather than a physical layer, to perform the processes of averaging instant, beam information measurement values, and comparing information of different beams. In addition, it is also suitable for a higher layer, rather than a physical layer, to determine to transmit beam feedback due to the corresponding operations, and select a resource to transmit beam feedback.

In embodiments of the present disclosure, a higher layer of a UE performs an intra-cell channel management in such a way as to determine feedback information transmission via a channel by the determination of UE, instead of by a resource allocated by an eNB, calculate an average of beam information, compare different average beam measurement values, determine a beam, and select a resource to transmit beam feedback or request resource allocation. Therefore, since the method according to embodiments of the present disclosure performs channel management operations in a higher layer, it differs from a method of the related art that performs channel information feedback in physical layers (PHY).

Figure 9:
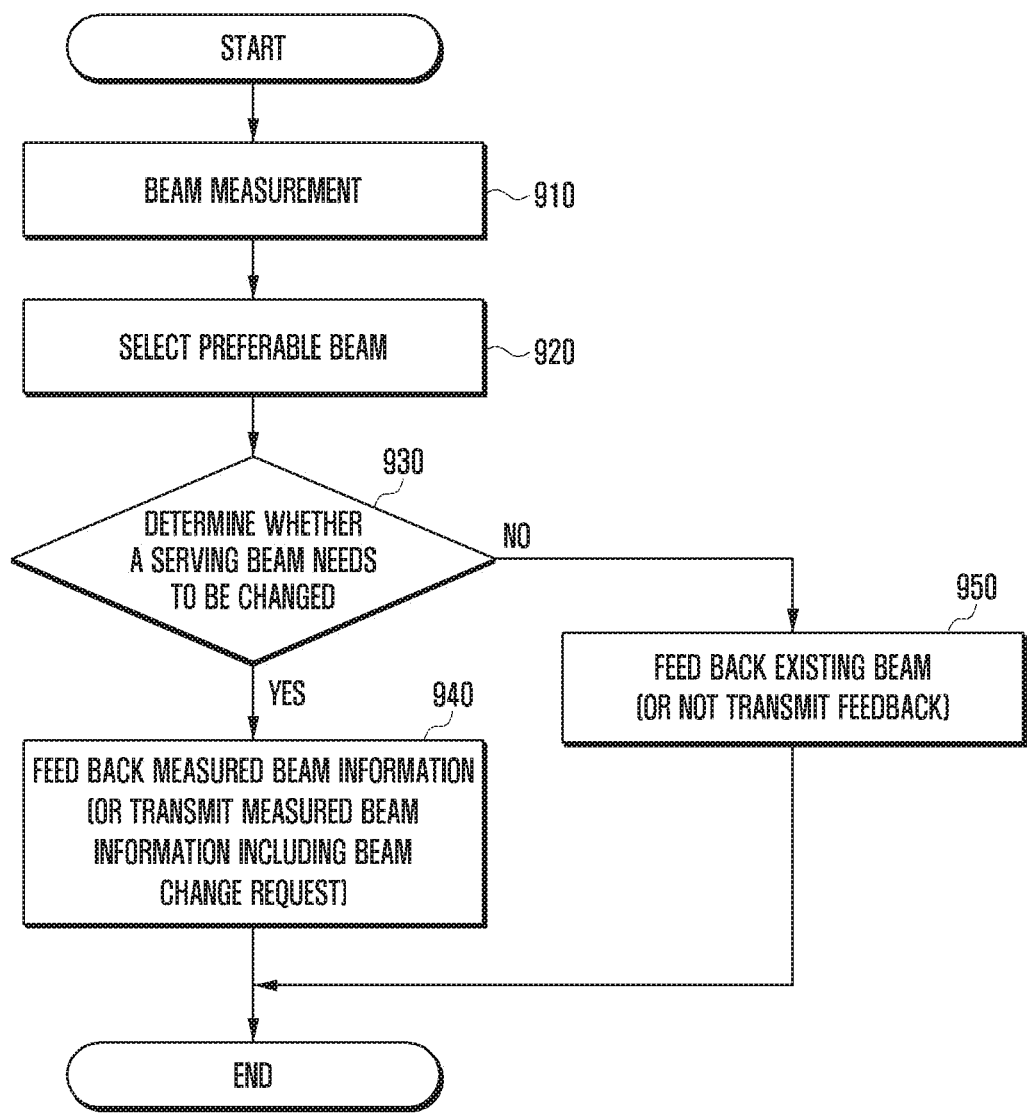
FIG. 9 is a flowchart that describes a method for a UE to perform beam measurement and feedback according to an embodiment of the present disclosure.

FIG. 9 is a flowchart that describes a method for a UE to perform beam measurement and feedback according to an embodiment of the present disclosure.

Referring to FIG. 9, the UE measures a beam in operation 910. The UE receives beam reference signal (BRS) transmitted from an eNB, measures received different beams by turns with respect to the BRS, and obtains a beam quality measurement value for the UE reception beam pairs and each eNB transmission beam.

The UE selects a preferable beam in operation 920. The selected beam may be a best beam. The UE compares beam quality measurement values with each other, and selects the best UE reception beam for each eNB transmission beam. In addition, the UE identifies beams (or beam groups) which are better for an eNB to perform transmission, in order of quality from best to lowest, and selects the identified beam as a preferable beam (or preferable beam group).

The UE determines whether a serving beam needs to be changed with another beam in operation 930. When the UE determines that a serving beam needs to be changed with another beam in operation 930, it is capable of feeding back its measured beam information to the eNB in operation 940. In addition, beam information can further include beam change request. On the other hand, when the UE determines that a serving beam does not need to be changed with another beam in operation in 930, it is capable of feeding back its pervious beam information to the eNB in operation 950. In addition, the UE can omit feedback of beam information in operation 950.

The determination conditions of a UE as to whether beam feedback transmission is needed as follows. The following condition is called a beam change trigger condition or a beam feedback trigger condition.

A. The channel quality or performance of a serving beam (scheduling beam) (or serving beams) is less than a specified threshold. The threshold may be a constant, or a fixed value, according to the standard, a value that an eNB sets using an RRC message, MAC-CE, PHY DCI, and the like, or a value selected by the UE.

a1. Current beam measurement value<threshold a2. The measurement value may be RSRP, RSRQ, SNR, SINR, CQI, BER, FER, PER, BLER, and the like. Alternatively, the measurement value may be any measurement value if it is suitable to determine channel quality.

a3. The number of current serving beam may be one. Alternatively, the number of current serving beam may be one or more that an eNB can transmit to the current UE. When the number of current serving beam is one or more, and a beam measurement value of at least one of the one or more beams is less than a threshold, trigger may be performed. Measurement values of all serving beams are less than a threshold, trigger may also be performed.

a4. The threshold may be an absolute value that an eNB allocates to an RRC signal or that a UE selects, e.g., a value corresponding to a probability of estimated PDCCH of error (e.g., 10%, 5%, 2%, and the like).

B. Channel quality or performance of beams, except for a serving beam (scheduling beam), is greater than or equal to a specified threshold b1. New beam measurement value>threshold b2. The measurement value may be RSRP, RSRQ, SNR, SINR, CQI, BER, FER, PER, BLER, and the like. Alternatively, the measurement value may be any measurement value if it is suitable to determine channel quality.

b3. The number of new beams may be one. Alternatively, the number of new beams may be one or more that an eNB can transmit to the current UE. When the number of new beams is one or more, and a beam measurement value of at least one of the one or more beams is greater than or equal to a threshold, trigger may be performed. When measurement values of all new beams are greater than or equal to a threshold, trigger may also be performed.

b4. The threshold may be an absolute value that an eNB allocates to an RRC signal or that UE selects, e.g., a value corresponding to a probability of estimated PDCCH of error (e.g., 10%, 5%, 2%, and the like)

C. The channel quality or performance of another beam is greater than or equal to a specified threshold/offset, compared to a serving beam.

c1. New beam measurement value>current beam measurement value+threshold.

c2. The measurement value may be RSRP, RSRQ, SNR, SINR, CQI, BER, FER, PER, BLER, and the like. Alternatively, the measurement value may be any measurement value if it is suitable to determine channel quality.

c3. The number of current/new beam may be one. Alternatively, the number of current/new beam may be one or more that an eNB can transmit to the current UE. When the number of current/new beam is one or more, and at least one of the one or more new and current beams satisfies the condition of item c1, trigger may be performed. When all new and current beams satisfy the condition of item c 1, trigger may also be performed.

c4. The threshold may be an absolute value that an eNB allocates to an RRC signal or that a UE selects, e.g., a value corresponding to a probability of estimated PDCCH of error (e.g., 10%, 5%, 2%, and the like).

D. The channel quality or performance of a serving beam (scheduling beam) is less than a specified threshold, and the channel quality or performance of other beams, except for a serving beam (scheduling beam), is greater than or equal to a specified threshold d1. (A current beam measurement value<threshold_out) & (new beam measurement value>threshold_in)

d2. The measurement value may be RSRP, RSRQ, SNR, SINR, CQI, BER, FER, PER, BLER, and the like. The measurement value may be any measurement value if it is suitable to determine channel quality.

E. Expiration of a timer (e.g., Feedback Timer)

e1. Uplink beam feedback is not transmitted during a corresponding timer e2. Uplink resource is not allocated during a corresponding timer e3. Uplink transmission fails during a corresponding timer, and the like.

F. A serving beam (i.e., an eNB beam, a UE beam, or a beam pair), derived from the beam measurement, is not included within the top K (or K % from the top) in the ranking of the entire beam (i.e., an eNB beam, a UE beam, or a beam pair).

G. A serving beam (i.e., an eNB beam, a UE beam, or a beam pair), derived from the beam measurement, is included within the bottom K (or K % from the bottom) in the ranking of the entire beam (i.e., an eNB beam, a UE beam, or a beam pair).

H. After feedback is transmitted using a dedicated feedback resource allocated by an eNB, the response (HARQ ACK, RLC ACK, Feedback ACK, and the like) is not received until a period of time (timer) has elapsed.

h1. Feedback message that a UE transmits via a dedicated feedback resource which has been previously allocated may contain information requesting a response (or acknowledgement) of an eNB in response to the corresponding feedback h2. Information requesting a corresponding response may be a bit (indicator) located at a specified location in a preset PHY or MAC message.

h3. Information requesting a corresponding response may be a preset sequence.

h4. A corresponding response needs to be received within a preset period of time after feedback information is transmitted.

h5. Feedback message that a UE transmits via a dedicated feedback resource which has been previously allocated does not include a specified response request message. However, the UE may request a response from the eNB, using preset methods as follows.

h6. A method may be preset so that a response to every feedback message is always transmitted.

h7. A method may be preset so that a UE and an eNB exchange signals/messages with each other before transmitting a feedback message, and then the eNB transmits, to the UE, a response with respect to several feedback messages (one or more feedback messages)

h8. A method may be preset so that a UE and an eNB exchange signals/messages with each other before transmitting a feedback message, and then the eNB transmits, to the UE, a response with respect to feedback messages transmitted before the condition is destroyed/cancelled.

Embodiment related to item H is described below with reference to FIG. 10.

Figure 10:
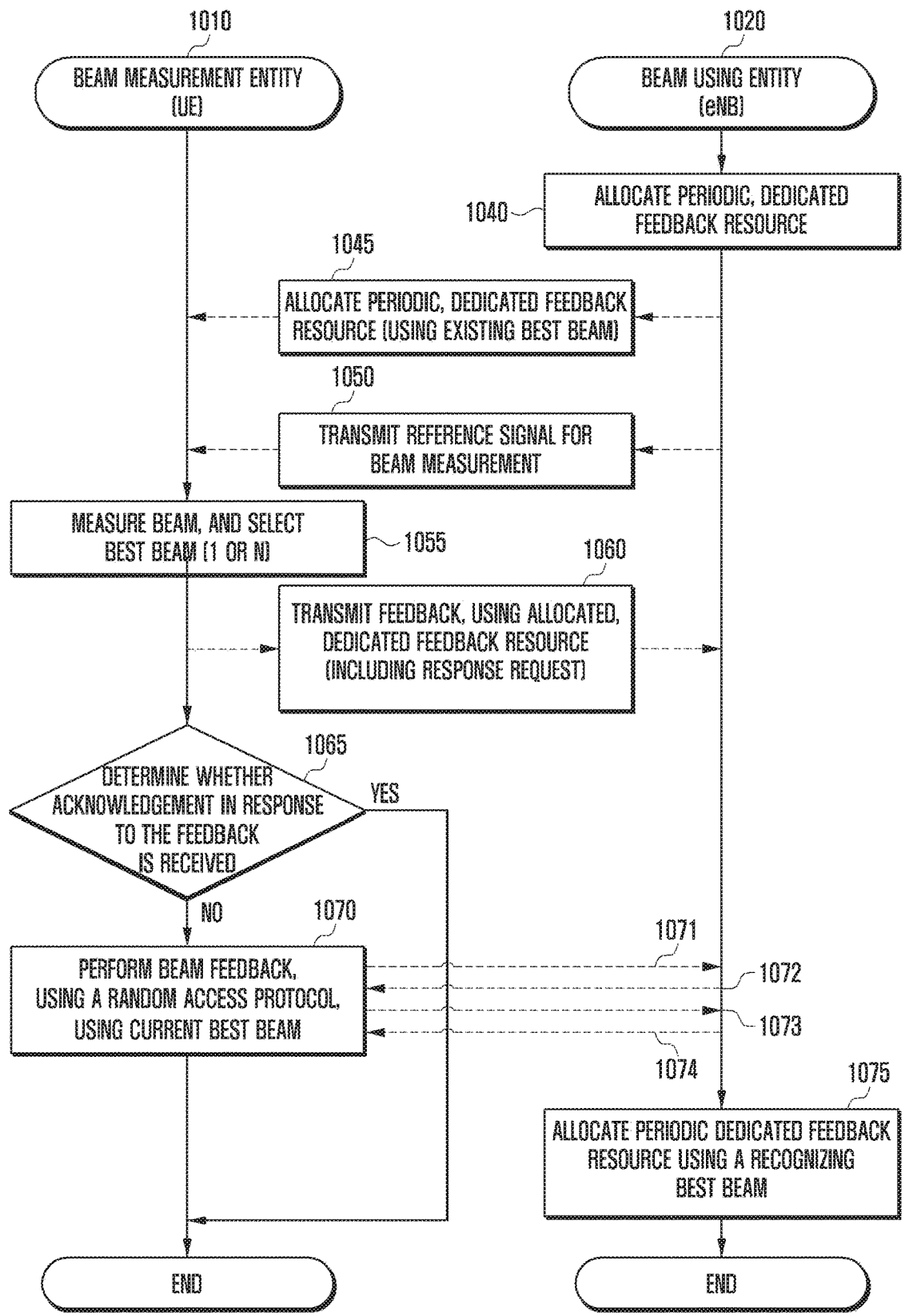
FIG. 10 is a flow diagram that describes a beam feedback procedure for a UE to request a response to feedback according to an embodiment of the present disclosure.

FIG. 10 is a flow diagram that describes a beam feedback procedure for a UE to request a response to feedback according to an embodiment of the present disclosure.

Referring to FIG. 10, a beam measurement entity 1010 transmits a response request to a beam using entity 1020, and receives the response therefrom. The beam measurement entity 1010 is a UE and the beam using entity 1020 is an eNB. However, it should be understood that the beam measurement entity may be an eNB and the beam using entity may be a UE.

The beam using entity 1020 is capable of allocating a feedback resource to the beam measurement entity 1010 in operation 1040. The feedback resource may be a periodic dedicated feedback resource. The beam using entity 1020 is capable of transmitting information regarding the allocated feedback resource to the beam measurement entity 1010 in operation 1045. Operations 1040 and 1045 may be commonly called 'feedback resource allocation.' The beam using entity 1020 is capable of transmitting information regarding a feedback resource to the beam measurement entity 1010 using a best beam currently in use. The beam using entity 1020 is capable of transmitting a reference signal for beam measurement to the beam measurement entity 1010 in operation 1050. The beam using entity 1020 is capable of transmitting beam measurement reference signals for individual beams to the beam measurement entity 1010.

The beam measurement entity 1010 measures a beam in operation 1055. The beam measurement entity 1010 is capable of selecting a best beam based on the beam measurement result. Since the beam measurement method and the beam selection method are described above, a detailed description will be omitted below.

The beam measurement entity 1010 is capable of transmitting the beam measurement result to the beam using entity 1020 in operation 1060. The beam measurement result may include content of feedback resources described above in embodiments of the present disclosure. The beam measurement entity 1010 is capable of transmitting feedback to the beam using entity 1020 using the allocated, dedicated feedback resource. In an embodiment of the present disclosure, the beam measurement entity 1010 is capable of transmitting feedback containing a response request to the beam using entity 1020. The content of the response request is described above in item H.

The beam measurement entity 1010 is capable of determining whether it receives a response to the feedback in operation 1065. When the beam measurement entity 1010 receives a response to the feedback in operation 1065, it recognizes that the beam using entity 1020 has received information regarding a best beam fed back by the beam measurement entity 1010, and may change a transmission/reception beam to a best beam.

On the other hand, when the beam measurement entity 1010 has not received an acknowledgement in response to the feedback in operation 1065, it is capable of performing beam feedback in operation 1070. The beam measurement entity 1010 may perform beam feedback using a random access protocol. The beam measurement entity 1010 may perform feedback using a current best beam according to the beam measurement result. The beam measurement entity 1010 transmits feedback to the beam using entity 1020 in operation 1071, and receives an acknowledgement in response to the feedback therefrom in operation 1072. When the beam measurement entity 1010 has not received an acknowledgement in response to the feedback in operation 1072, it re-transmits feedback to the beam using entity 1020 in operation 1073, and receives an acknowledgement in response to the feedback therefrom in operation 1074. The transmission and response procedure for feedback information using a random access protocol is new, compared to the procedure of the related art. More particularly, the beam measurement entity 1010 repeats the feedback transmission and the response reception a number of times, until it receives an acknowledgement from the beam using entity 1020.

The beam using entity 1020 is capable of allocating a periodic dedicated feedback resource using its recognizing best beam in operation 1075.

I. Failure in attempting data transmission/reception using a serving beam, more than a preset number of times, within a preset period of time (timer, and the like)

J. Uplink beam feedback transmission is not performed for a preset period of time (timer)

K. Uplink transmittable resources (e.g., SR, Random Access, UL scheduled PUSCH, PUCCH, . . . ) exist, and satisfy one or more of the conditions.

The threshold of the conditions may be an absolute channel estimation or measurement value (e.g., RSRP, RSRQ, RSSI, CQI, SNR, and the like) that makes an eNB and/or UE to estimate and determine that a corresponding beam channel quality is not suitable for communication.

The eNB may notify a UE of the threshold of the conditions (a notification method a specified parameter of an RRC message, MAC data, a specified parameter of MAC-CE, a specified parameter of DCI, and the like). Alternatively, the threshold of the conditions may be set by the UE.

The conditions may also include a combination of one or more conditions, so that combined conditions are simultaneously satisfied.

2. Feedback Methods According to Feedback Resource Allocation Cycles 2. 1. Periodic Feedback Transmission Method A. A resource allocable entity (eNB) allocates resources at every time period and a measurement entity (UE) transmits feedback using a corresponding resource.

a1. A resource allocable entity allocates resources, such as, a periodic frequency/time/resource block/sub-frame/symbol, and the like, to a specified UE, and provides the UE with information, such as a corresponding allocated resource location, a UE feedback transmission cycle, and the like.

a2. Resource allocation information may be provided via part of a transmission signal, such as Preamble, RRC signal (e.g., RRC connection reconfiguration), IE of an RRC signal, MAC-CE, a broadcast message (e.g., master information block (MIB), system information block (SIB), . . . ), PHY downlink control information (PHY DCI), and the like.

a3. The beam feedback may be a signal, which can be transmitted via an uplink control channel (e.g., PUCCH) or an uplink data channel (e.g., PUSCH), e.g., one or part of the following: UCI Multiplexing, MAC-CE, MAC PDU, Preamble, RRC-IE, RRC signal, and the like. The beam feedback may include information, such as eNB beam ID, beam pair ID, reception beam ID, the number of users, channel capacity, RSRP, RSRQ, SNR, SINR, RSSI, CQI, PMI, RI, and the like.

a4. An uplink resource for the beam feedback may be a resource through which corresponding UE that an eNB has known about can perform transmission/reception using a currently serving beam, a resource through which a UE can perform transmission/reception using a beam that an eNB determined as a receivable beam, or a resource through which a UE receives (sweep) a number of beams, which can be used by an eNB, by turns, within an interval.

a5. A resource for periodic feedback allocated by the eNB allows UE, which the eNB knows at the current scheduling timing, to perform reception, using one or more beams or one best beam which will be the best when the UE uses the beam. In this case, the eNB may include beam information, which will be received via a corresponding resource, in the scheduling information, as a form of "eNB beam ID," and may transmit the information to the UE.

Figure 11:
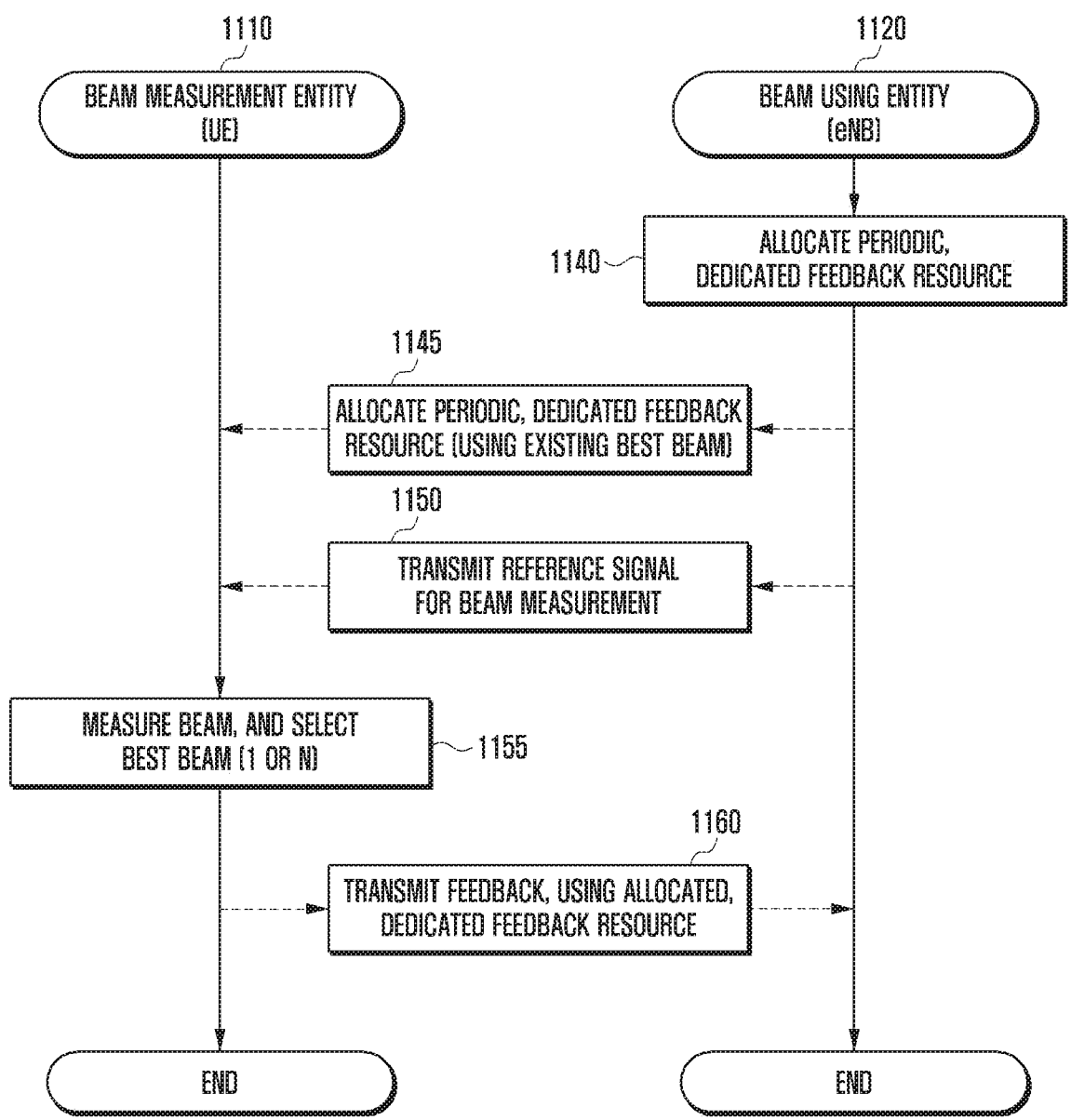
FIG. 11 is a flow diagram that describes a method for a UE to measure a beam and transmitting beam feedback, when a periodic UE dedicated feedback resource has been allocated, according to an embodiment of the present disclosure.

FIG. 11 is a flow diagram that describes a method for a UE to measure a beam and transmitting beam feedback, when a periodic UE dedicated feedback resource has been allocated according to an embodiment of the present disclosure.

Referring to FIG. 11, a beam measurement entity 1110 is a UE and a beam using entity 1120 is an eNB. However, it should be understood that the beam measurement entity may be an eNB and the beam using entity may be a UE.

The beam using entity 1120 is capable of allocating a feedback resource to the beam measurement entity 1110 in operation 1140. The feedback resource may be a periodic dedicated feedback resource. The beam using entity 1120 is capable of transmitting information regarding the allocated feedback resource to the beam measurement entity 1110 in operation 1145. Operations 1140 and 1145 may be commonly called 'feedback resource allocation.' The beam using entity 1120 is capable of transmitting information regarding a feedback resource to the beam measurement entity 1110 using a best beam currently in use. The beam using entity 1120 is capable of transmitting a reference signal for beam measurement to the beam measurement entity 1110 in operation 1150. The beam using entity 1120 is capable of transmitting beam measurement reference signals for individual beams to the beam measurement entity 1110.

The beam measurement entity 1110 measures a beam in operation 1155. The beam measurement entity 1110 is capable of selecting a best beam based on the beam measurement result. Since the beam measurement method and the beam selection method are described above, a detailed description will be omitted below.

The beam measurement entity 1110 is capable of transmitting the beam measurement result to the beam using entity 1120 in operation 1160. The beam measurement result may include content of feedback resources described above in embodiments of the present disclosure. The beam measurement entity 1110 is capable of transmitting feedback to the beam using entity 1120 using the allocated, dedicated feedback resource. In an embodiment of the present disclosure, the beam measurement entity 1110 is capable of transmitting feedback containing a response request to the beam using entity 1120.

In this case, the eNB may allocate a resource to a best beam (or beam group) that can be communicated with the UE that the eNB has known about. When the eNB changes a beam or a beam group (a serving beam or a set of serving beams) to communicate with UE, it also changes a periodic dedicated feedback resource and re-allocates resources. Alternatively, the eNB may changes a beam to communicate with the UE via an allocated resource from a beam used by a UE of the related art to a beam that the UE will newly use, and may not transmit allocation information regarding a particular periodic dedicated feedback resource to the UE.

Although the embodiment is implemented in such a way as to perform the allocation of a periodic dedicated feedback resource, the transmission of a reference signal for beam measurement, and the measurement, it may also be performed in different order from that of the embodiment. For example, it may be modified in such a way as to perform, in order, the transmission of a reference signal for beam measurement, the measurement of a beam by the UE, and the allocation of a periodic dedicated feedback resource.

Figure 12:
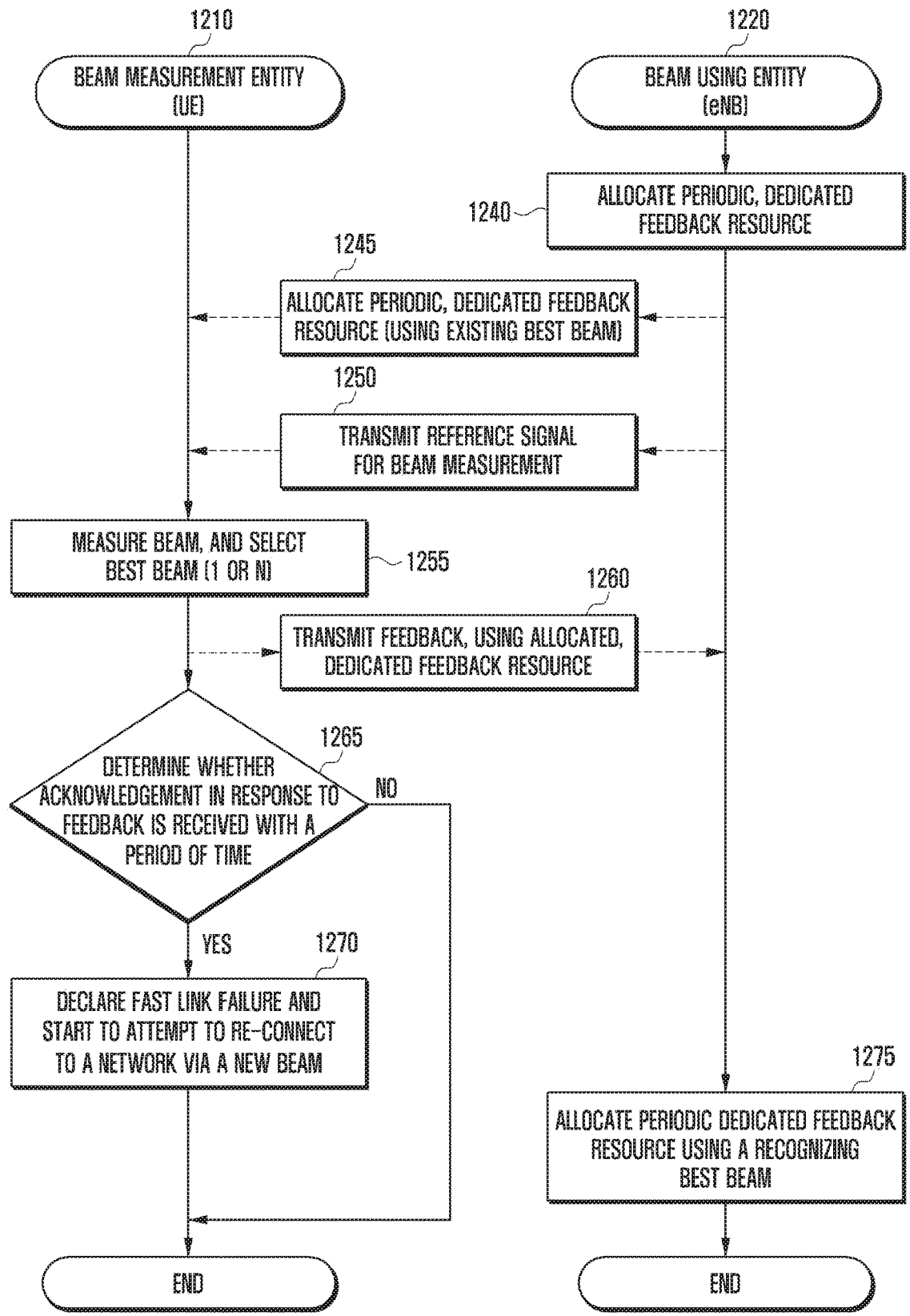
FIG. 12 is a flow diagram that describes a method for an evolved NodeB (eNB) to transmit an acknowledgement in response to beam feedback information transmitted using an allocated, dedicated feedback resource, considering a condition as to whether a corresponding acknowledgement is received, according to an embodiment of the present disclosure.

FIG. 12 is a flow diagram that describes a method for an eNB to transmit an acknowledgement in response to beam feedback information transmitted using an allocated, dedicated feedback resource, considering a condition as to whether a corresponding acknowledgement is received according to an embodiment of the present disclosure.

Referring to FIG. 12, a beam measurement entity 1210 is a UE and a beam using entity 1220 is an eNB. However, it should be understood that the beam measurement entity may be an eNB and the beam using entity may be a UE.

Operations 1240 to 1260 of FIG. 12 refer to the part described above in an embodiment of the present disclosure with reference to operations 1140 to 1160 of FIG. 11.

Requesting a response (HARQ, RLC ACK, and the like) may always be needed from the property of beam feedback transmission. The UE may transmit beam feedback explicitly including a response request (when feedback includes an ACK request field, it is transmitted with checking/marking the field).

The beam measurement entity 1210 is capable of determining whether it receives an acknowledgement in response to feedback in operation 1265. When the beam measurement entity 1210 has received an acknowledgement in response to feedback in operation 1265, it ascertains that the beam using entity 1220 has received information regarding a beam fed back by the beam measurement entity 1210.

On the other hand, when the beam measurement entity 1210 has not received an acknowledgement in response to feedback in operation 1265, it declares fast link failure and attempts to re-connect to a network via a new beam in operation 1270. In this case, the beam attempting to re-connect to a network may be a best beam detected as in operation 1255. When the UE has not received a response request within a preset period of time, despite a number of attempts to receive feedback including the response request, it ascertains that the current beam state is not suitable for uplink communication, declares fast link failure, and re-connects to a network using a new beam. In this case, when the network detects that uplink feedback transmission has not been performed by the UE via an allocated feedback resource within a period of time, it may also declare link failure on the UE In addition, in a state where the network holds information regarding the UE on which link failure is declared for a period of time, it may support the UE to perform fast re-connection using another beam. In a state where the network releases the connection of a UE on which link failure is declared (or discards information regarding the UE), when the UE attempts to perform re-connection, the network may follow a re-connection procedure of the related art.

The beam using entity 1220 is capable of allocating a periodic dedicated feedback resource to a best beam that it has recognized in operation 1275. Information regarding the best beam that the beam using entity 1220 has recognized may be information regarding a best beam included in feedback received from the beam measurement entity.

B. When a periodic feedback transmission resource is not allocated, a measurement entity (UE) performs transmission of feedback in such a way as to periodically request the allocation of a resource (scheduling request), or transmit uplink information using a random access protocol, and the like.

b1. Although a measurement entity does not have a resource which has been already allocated and is capable of periodically transmitting feedback, when the measurement entity has an allocated resource to transmit a resource allocation request (scheduling request) in the uplink, it periodically transmits a corresponding resource allocation request to an eNB. In this case, the measurement entity is allocated an uplink resource by the eNB and transmits feedback to the eNB via the allocated resource.

b2. An uplink resource for the beam feedback may be a resource through which corresponding UE that the eNB has known about can perform transmission/reception using a serving beam, a resource through which a UE can perform transmission/reception using a beam that an eNB determined as a receivable beam, or a resource through which a UE receives (sweeps) a number of beams, which can be used by an eNB, in turns, within an interval.

A method for an eNB to periodically allocate unique resources to UEs respectively and allow the UEs to transmit uplink beam feedback is disadvantageous in that the amount of resources to be allocated increases according to increase in the number of users and the number of beams controlled by an eNB. In order to address the issue, a system is considered that allocates a resource that is capable of allowing individual users to periodically and simultaneously attempt to perform resource occupation and resource transmission, and receives beam feedback from a number of users using the resource. This resource is defined as a random access resource. The random access resource may be periodically allocated. Each UE may transmit uplink beam feedback via the resource. This system is advantageous in that, each time that a beam is changed between a UE and an eNB, it does not need to allocate feedback resource to individual UEs using a changed beam, and it provides an available beam to a UE although the quality of a beam is abruptly changed, so that the UE can communicate with the eNB using the available beam.

Figure 13:
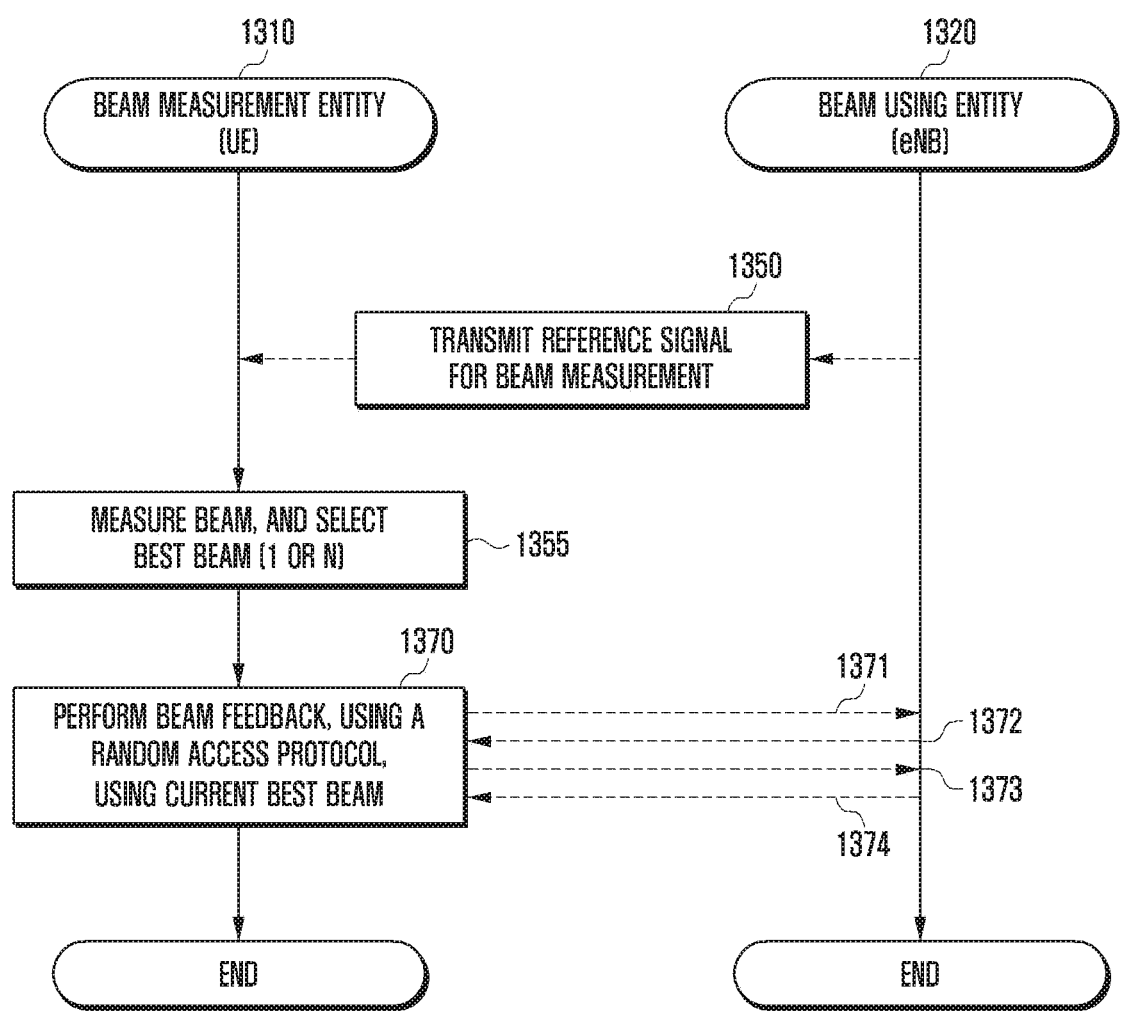
FIG. 13 is a flow diagram that describes a method for a UE to perform beam feedback, using a random access resource that an eNB periodically allocated, according to an embodiment of the present disclosure.

FIG. 13 is a flow diagram that describes a method for a UE to perform beam feedback, using a random access resource that an eNB periodically allocated, according to an embodiment of the present disclosure.

Referring to FIG. 13, it is assumed that an eNB allocates a random access resource through which the UE periodically transmits feedback information.

A beam using entity 1320 is capable of transmitting a reference signal for beam measurement in operation 1350. The beam using entity 1320 is capable of transmitting reference signals for beam measurement corresponding to a number of beams respectively.

A beam measurement entity 1310 measures a beam in operation 1355. The beam measurement entity 1310 is capable of selecting a best beam based on the beam measurement result. Since the beam measurement method and the beam selection method are described above, a detailed description will be omitted below.

The beam measurement entity 1310 is capable of performing beam feedback in operation 1370. The beam measurement entity 1310 may perform beam feedback using a random access protocol. The beam measurement entity 1310 may perform feedback using a current best beam according to the beam measurement result. The beam measurement entity 1310 transmits feedback to the beam using entity 1320 in operation 1371, and receives an acknowledgement in response to the feedback therefrom in operation 1372. When the beam measurement entity 1310 has not received an acknowledgement in response to the feedback in operation 1372, it re-transmits feedback to the beam using entity 1320 in operation 1373, and receives an acknowledgement in response to the feedback therefrom in operation 1374. The transmission and response procedure for feedback information using a random access protocol is new, compared to the procedure of the related art. More particularly, the beam measurement entity 1310 repeats the feedback transmission and the response reception a number of times, until it receives an acknowledgement from the beam using entity 1320.

The random access resource is an eNB beam sweep reception interval. The random access resource requires more an amount of resource occupation in order to receive the same information which causes resource waste. Since UEs may collide with each other during the transmission of information, the random access resource may decrease the performance, such as, a delay, and the like, when a collision of UEs occurs.

The embodiment of the present disclosure considers a random access scheme which may be a contention-based RACH and a contention-free RACH which are used in the LTE. Alternatively, the embodiment of the present disclosure may also employ a random access scheme, similar to the scheme based on a contention-based RACH and a contention-free RACH, which allows UEs to attempt to perform transmission using arbitrary or pre-set information (sequence), and the like, during an interval where an eNB performs reception without knowing which UE will attempt to perform transmission.

Figure 14:
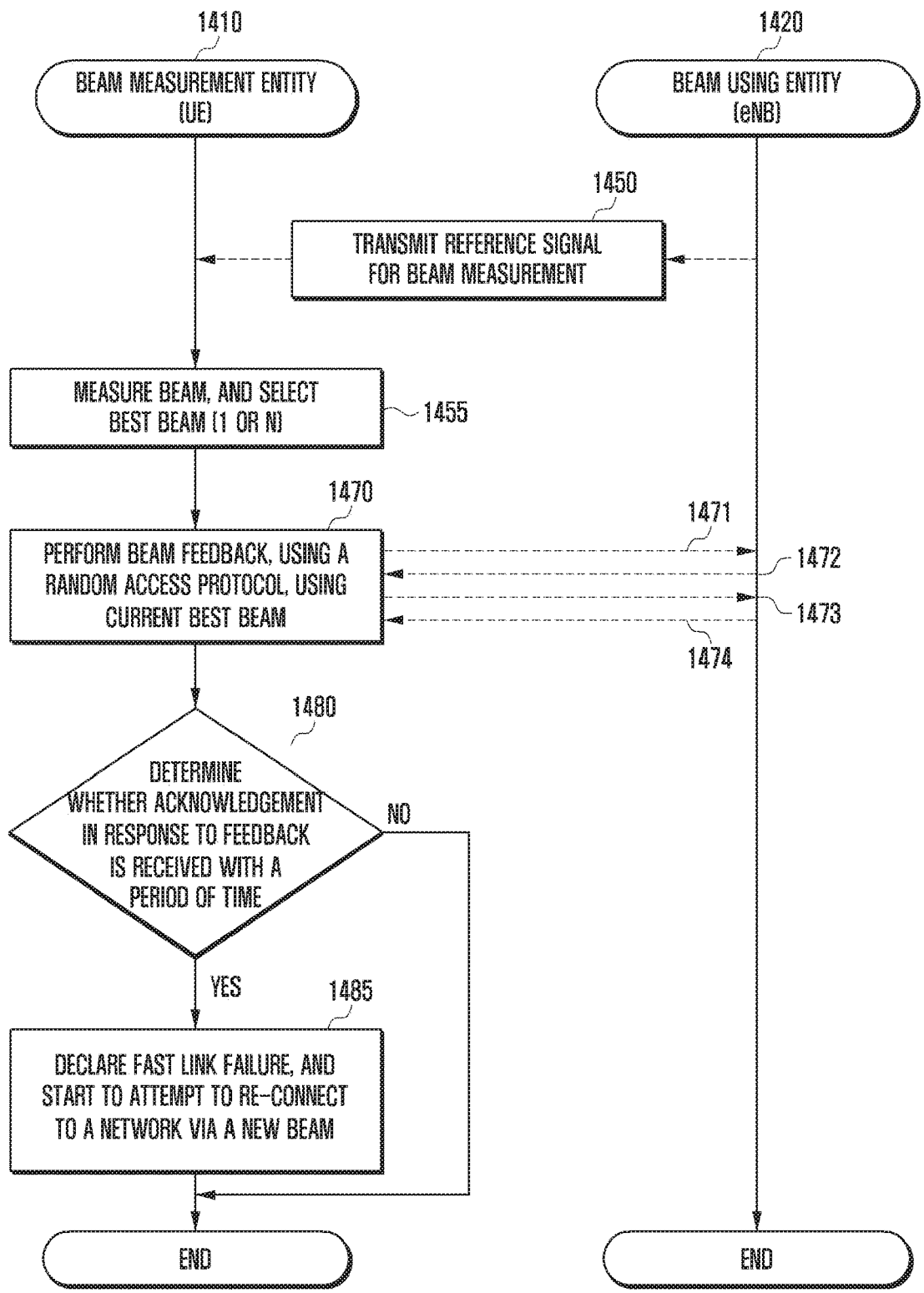
FIG. 14 is a flow diagram that describes a method of performing feedback using a periodic random access resource, considering a response request, according to an embodiment of the present disclosure.

FIG. 14 is a flow diagram that describes a method of performing feedback using a periodic random access resource, considering a response request, according to an embodiment of the present disclosure.

Referring to FIG. 14, it is assumed that an eNB allocates a random access resource through which UE periodically transmits feedback information.

Operations 1450 to 1474 of FIG. 14 refer to the part described above in an embodiment of the present disclosure with reference to operations 1350 to 1374 of FIG. 13.

A beam measurement entity 1410 is capable of determining whether it receives an acknowledgement in response to feedback in operation 1480. The beam measurement entity 1410 determines whether it receives an acknowledgement in response to feedback within a preset period of time. When the beam measurement entity 1410 has received an acknowledgement in response to feedback in operation 1480, it ascertains that a beam using entity 1420 has received information regarding a beam fed back by the beam measurement entity 1410. On the other hand, when the beam measurement entity 1410 has not received an acknowledgement in response to feedback in operation 1480, it proceeds with operation 1485.

Although a UE attempts to transmit feedback using random access a number of times, it has not received a response request within a preset period of time. In this case, the UE ascertains that the current beam state is not suitable for uplink communication, declares fast link failure, and re-connects to a network using a new beam.

The conditions to determine that a response request has not been received within a preset period of time:
  Random access response (RAR) message in response to a single transmission of Random Access Preamble is not received with a preset period of time
  RAR message in response to a preset number of times of transmission of Random Access Preamble is not received even once with a preset period of time
  RAR message in response to a preset number of attempts of transmission (including the number of re-transmission attempts) of Random Access Preamble within a preset period of time is not received even once.

In this case, when the network detects that uplink feedback transmission has not been performed by the UE via an allocated feedback resource within a period of time, it may also declare link failure on the UE In a state where the network holds information regarding the UE on which link failure is declared for a period of time, it may support the UE to perform fast re-connection using another beam.

In a state where the network releases the connection of a UE on which link failure is declared (or discards information regarding the UE), when the UE attempts to perform re-connection, the network may follow a re-connection procedure of the related art.

When the beam measurement entity 1410 has not received an acknowledgement in response to feedback in operation 1480, it declares link failure and attempts to re-connect to a network via a new beam in operation 1485. In this case, the beam attempting to re-connect to a network may be a best beam detected as in operation 1455. Link failure is described above in an embodiment of the present disclosure referring to FIG. 12.

2. 2. Aperiodic Feedback Transmission Method

When a resource allocable entity (eNB) determines to receive feedback, based on a timing and a criterion, and is then allocated a resource, a measurement entity (UE) transmits feedback via the allocated resource. To this end, conditions and operation methods are described as follows.

The beam feedback may be transmitted via an uplink control channel (e.g., PUCCH) or an uplink data channel (e.g., PUSCH). The beam feedback may include information, such as, eNB beam ID, beam pair ID, reception beam ID, the number of users, channel capacity, RSRP, RSRQ, SNR, SINR, RSSI, CQI, PMI, RI, and the like.

An uplink resource for the beam feedback may be a resource through which corresponding UE that the eNB has known about can perform transmission/reception using a serving beam, a resource through which the UE can perform transmission/reception using a beam that an eNB determined as a receivable beam, or a resource through which the UE receives (sweeps) a number of beams, which can be used by an eNB, in turns, within an interval.

A resource for aperiodic feedback allocated by the eNB allows UE, which the eNB knows at the current scheduling timing, to perform reception, using one or more beams or one best beam which will be the best when the UE uses the beam. In this case, the eNB may include beam information, which will be received via a corresponding resource, in the scheduling information, as a form of "eNB beam ID," and may transmit the information to the UE.

Examples of a criterion that a resource allocable entity uses to determine whether it performs aperiodic feedback:

New feedback is not received until a specified time has elapsed from a previous feedback reception time (resource is allocated when a timer expired)

Any information is not received from the UE until a specified time has elapsed (resource is allocated when a timer expired)

Measurement result of channel or link state with corresponding UE (quality, power, SNR, SINR, CQI, RSRP, RSRQ, . . . ) is less than or equal to a specified threshold Measurement result of channel or link state with corresponding UE (quality, power, SNR, SINR, CQI, RSRP, RSRQ, . . . ) is decreased less than the previous measurement result (or previous average, within a period of time of the previous step), to a value that is less than or equal to a specified threshold A measurement entity (UE) determines to transmit feedback, based on a timing and a criterion, and then requests resource allocation (scheduling request), or transmits uplink information, using a random access protocol, and the like. To this end, transmission conditions and transmission methods are described as follows.

A resource capable of transmitting new feedback is not allocated until a specified time has elapsed from a previous feedback reception time (resource is allocated when a timer expired)

Any information is not received from an eNB until a specified time has elapsed (resource is allocated when a timer expired)

Measurement result of channel or link state with a corresponding eNB (quality, power, SNR, SINR, CQI, RSRP, RSRQ, . . . ) is less than or equal to a specified threshold Measurement result of channel or link state with a corresponding eNB (quality, power, SNR, SINR, CQI, RSRP, RSRQ, . . . ) is decreased less than the previous measurement result (or previous average, within a period of time of the previous step), to a value that is less than or equal to a specified threshold In addition, the following feedback method may propose a UE's initiating feedback transmission method due to an event.

As described above, when the beaming using entity (UE) has a periodic beam feedback resource allocated by an eNB, it is capable of feeding back beam information using a corresponding resource. The UE initiatively determines whether beam feedback transmission is needed and needs to transmit beam measurement information to the eNB aperiodically.

In this case, the UE operates considering a condition as to whether a resource that has been allocated exists, which is described below.

Figure 15:
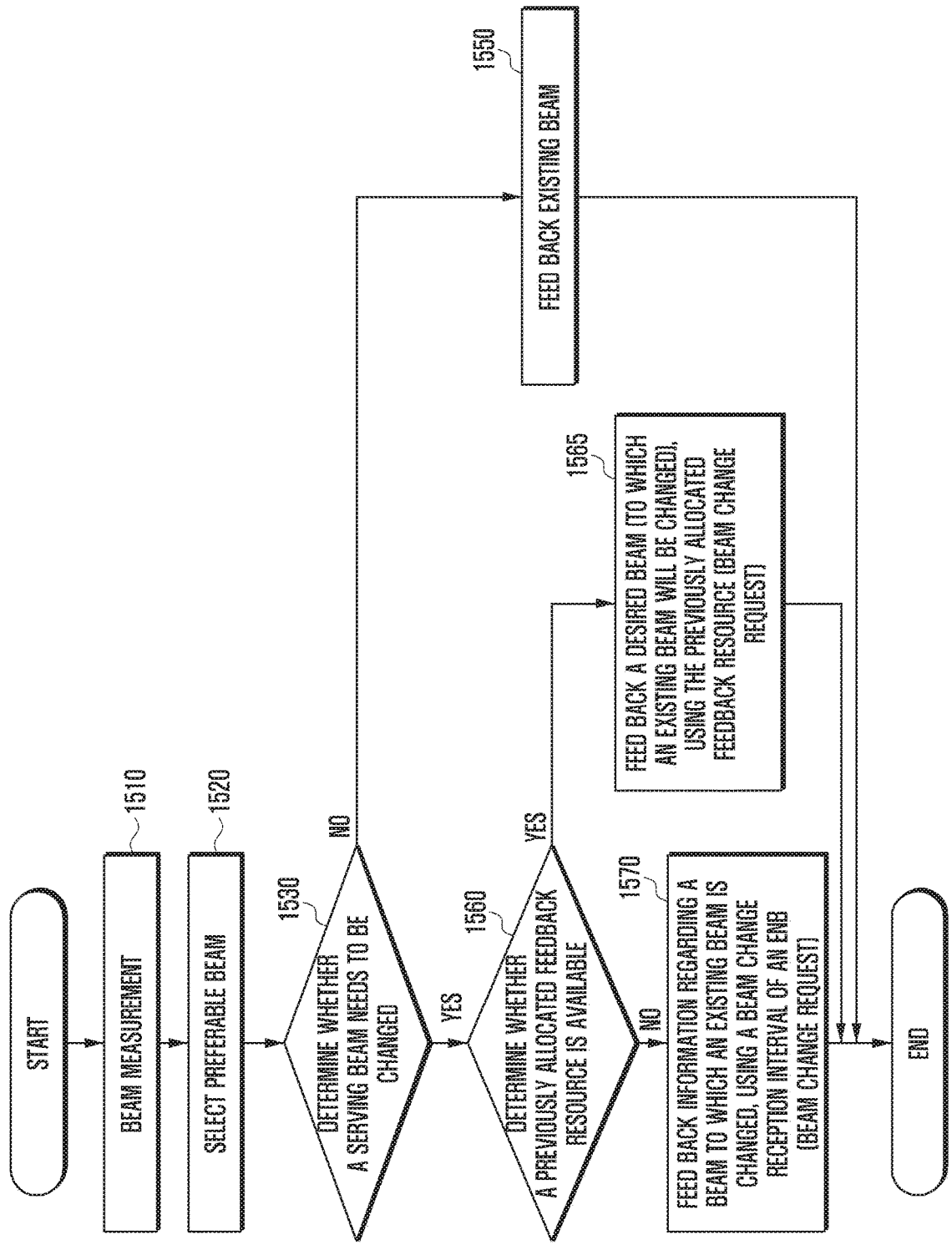
FIG. 15 is a flowchart that describes a method for a UE to perform feedback based on a condition as to whether a resource that has been allocated exists according to an embodiment of the present disclosure.

FIG. 15 is a flowchart that describes a method for a UE to perform feedback based on a condition as to whether a resource that has been allocated exists according to an embodiment of the present disclosure.

Referring to FIG. 15, the UE measures a beam in operation 1510. The UE receives BRS transmitted from an eNB, measures received different beams by turns with respect to the BRS, and obtains a beam quality measurement value for a UE reception beam pairs and each eNB transmission beam.

The UE selects a preferable beam in operation 1520. The selected beam may be a best beam. The UE compares beam quality measurement values with each other, and selects the best UE reception beam for each eNB transmission beam. In addition, the UE identifies beams (or beam groups) which are better for an eNB to perform transmission, in order of quality from highest to lowest, and selects the identified beam as a preferable beam (or preferable beam group).

The UE determines whether a serving beam needs to be changed with another beam in operation 1530. Since the method of determining whether beam change is needed is described above in embodiments of the present disclosure referring to FIG. 9, and the like, a detailed description is omitted below.

When a UE ascertains that a serving beam does not need to be changed with another beam in operation 1530, it is capable of feeding back an existing beam in operation 1550. The existing beam may be a serving beam currently in use. Since the serving beam does not need to be changed, it may be the best beam. In addition, when a UE ascertains that a serving beam does not need to be changed with another beam in operation 1530, the embodiment may be modified without operation 1550.

On the other hand, when a UE ascertains that a serving beam needs to be changed with another beam in operation

1530, it is capable of determining whether a previously allocated feedback resource is available in operation 1560.

When the UE ascertains that a previously allocated feedback resource is available in operation 1560, it is capable of performing feedback using the previously allocated feedback resource in operation 1565. The feedback may include information regarding a desired beam (to which an existing beam will be changed). Detailed feedback information refers to the section explaining information related to feedback.

On the other hand, when a UE ascertains that a previously allocated feedback resource is not available in operation 1560, it is capable of feeding back information regarding a beam to which an existing beam is changed, using a beam change reception interval of an eNB in operation 1570. The feedback information regarding the beam may include a beam change request. The beam change request may be explicit information. When a beam used for feedback via beam feedback information differs from a serving beam, the change of the beam may be implicitly indicated by requesting beam change.

The operation of a UE describes that when the UE that needs to change its current beam is exclusively allocated an uplink feedback resource for the corresponding UE by an eNB via a beam that the eNB has known about, the UE further determines whether it transmits beam feedback that has used a corresponding resource.

Since the condition that the UE use to determine whether it needs to change its current beam is described above in embodiments of the present disclosure, a detailed description will be omitted below.

In an embodiment of the present disclosure, the UE is capable of independently determining beam feedback according to resources allocated by an eNB and providing beam measurement information to the eNB. Various embodiments related to the beam feedback will be described below. In order to perform beam measurement information feedback based on UE's determination, each UE has been allocated a resource through which the UE can transmit information for requesting resource allocation (scheduling request) to an eNB.

However, an instance may occur that the UE has not been allocated the resource or cannot use the resource (e.g., an instance that the quality of a serving beam is abruptly degraded, an instance that the UE uplink is asynchronous, and the like). Despite consideration of the possibility and the situation that occurred, the UE may have an available beam to provide its beam measurement information to the eNB. In this case, in order to maintain the wireless connectivity of a UE using the available beam, a shared resource is, although it is not allocated to unique UE, needed that allows any UE to transmit information to an eNB.

The periodic beam feedback method and the aperiodic beam feedback method need resources allocated by an eNB so that the UE performs uplink feedback transmission. To this end, the eNB is capable of setting a cycle or a time interval during which beam feedback is performed one or more times.

The eNB is capable of notifying individual UEs of the set cycle or the set time interval. The notification method may be one of the following message transmissions:
  Notify an RRC message that contains an element specifying a beam feedback duration
  Notify a Downlink Control message (via PDCCH) that contains an element specifying a beam feedback duration
  Notify a Downlink MAC-CE message (via PDSCH) that contains an element specifying a beam feedback duration
    Notification using a method capable of containing an element specifying a beam feedback duration
  Candidates of a cycle or a time interval which can be set are as follows:
  Full beam sweep duration: a period of time that the UE takes to observe all beam pairs of a UE and an eNB
  5G NB Tx Beam Sweep duration: a period of time that the UE takes to observe all eNB beam pairs for one UE beam
  Every Beam Reference Signal measurement duration: a least beam observation cycle of a UE (e.g., Beam Reference Signal subframe transmission time interval)
  Any specified time interval 3. Design for a Shared Resource Through which an eNB can Receive for a UE's Initiating Uplink Beam Feedback In order for the UEs to transmit uplink information without resources allocated by an eNB, a shared resource interval set by an eNB so that all UEs can perform transmission is needed. In a wireless communication system of the related art, an example of the shared resource interval is a RACH through which an initial access UE transmits its information to an eNB in order to transmit a network access request to the eNB.

In the case of the beamforming system using MIMO antennas allocates different resources, such as frequency channel, time, beam, code, and the like, to different beams, and uses the resources and beams, a shared resource interval needs to be set and designed more sophisticatedly. A UE and an eNB have limited beam pairs to successfully transmits/receive information. Since the eNB does not know when and which UE transmits information, a shared resource interval needs to be designed to perform reception via all the beams, so that all UEs can transmit information and an eNB can receive the information.

Therefore, the eNB needs to design the shared resource interval so that it can sweep a receiving beam and perform reception, and notify the UE of the interval by broadcasting, and the like.

When an eNB allocates a shared resource interval to receive information from an unspecified UE by sweeping a reception beam, the UE is capable of successfully transmitting uplink beam feedback, using the interval, based on its voluntary determination and the eNB beam measurement information. In this case, since the beam feedback information may be transmitted/received by any beam, instead of a serving beam that has been used to communicate with the eNB, the success probability of corresponding transmission is much greater than that of the instance that information is transmitted using a beam that has been used via a resource allocated by an eNB.

The shared resource interval allocated by an eNB may be allocated for a beam for another purpose (e.g., control information transmission), not for a beam that an eNB and a UE use to exchange data. In this case, the shared resource interval may be allocated to use a beam with a width (e.g., a control beam with a broad beam width) that differs from the width of a beam that an eNB and a UE use to exchange data.

The shared resource interval allocated by an eNB is not a beamforming system using MIMO antennas, which allocates different resources, such as frequency channel, time, beam, code, and the like, to different beams, and uses the resources and beams, and that the eNB and the UE use to exchange data, but a channel using an omni-beam. The channel using an omni-beam may be defined and exist to be used between an eNB and UE.

The shared reception interval of the eNB beam change (sweeping) described above has the following characteristics.

The shared reception interval of the corresponding eNB beam change (sweeping) may be a resource which is allocated for a specified UE and allows only a group of the specified UE to perform transmission.

The shared reception interval of the corresponding eNB beam change (sweeping) may be a resource which is allocated for a number of an unspecified UE and allows a number of the unspecified UE to perform transmission.

The shared reception interval of the corresponding eNB beam change (sweeping) may be a scheduling signal including one or more of the following: a frequency (a frequency, a sub-frame number, resource block number, channel number, and the like), time (time, frame number, sub-frame number, a time/frame/sub-frame/slot after transmitting a corresponding notification, and the like), and beam resource information.

Since information regarding the shared reception interval of the corresponding eNB beam change (sweeping) is described on the standard, a UE and an eNB know that the information exists at a specified frame location. The information may not need transmission of a particular notification signal. The information may be contained in network information (e.g., MIB, SIB, and the like) that an eNB notifies via a broadcasting channel. The information may be contained in network information (DL scheduling information that is notified each UE in unicast mode, using a downlink control channel (PDCCH).

The UE detects information regarding the shared reception interval of the eNB beam change (sweeping), and transmits beam feedback which includes a beam change request for changing a serving beam (which may explicitly include a bit or array or which may implicitly recognize the transmission of a corresponding request as a beam change request) using a corresponding resource.

An eNB may receive beam UE's feedback information regarding a beam changed from a beam that has been used, using the shared reception interval of the eNB beam change (sweeping).

In an embodiment of the present disclosure, the beam feedback method using random access, described above and below, does not need to employ random access methods used in other standards, such as, 3GPP standard, IEEE, and the like. In an embodiment of the present disclosure, the beam feedback method is referred to as a method and procedure for exchanging information between a UE and an eNB using a method of transmitting feedback using an interval in which the eNB performs reception, sweeping a beam.

Figure 16:
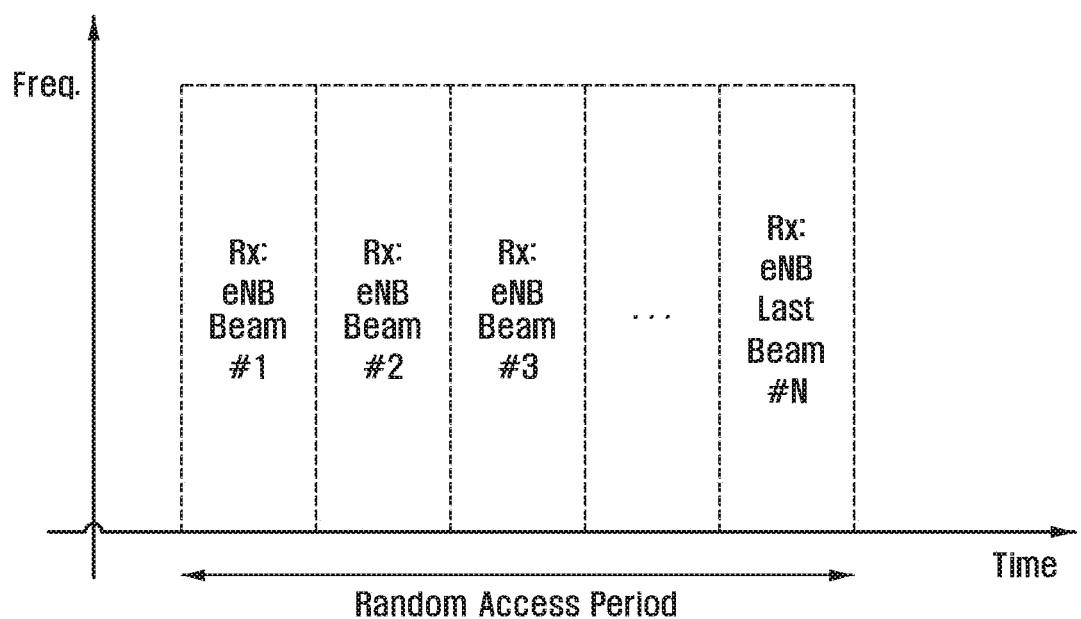
FIG. 16 is a diagram that describes a method of configuring a shared reception interval for an eNB beam change (sweeping) and a preamble transmission method according to an embodiment of the present disclosure.

FIG. 16 is a diagram that describes a method of configuring a shared reception interval for an eNB beam change (sweeping) and a preamble transmission method according to an embodiment of the present disclosure.

Referring to FIG. 16, the x-axis represents random access cycle and the y-axis represents frequency. The random access cycle is divided into a number of time intervals. Rx eNB #1, Rx eNB #2, Rx eNB #3, and Rx eNB last Beam #4 represent intervals. The eNB changes in beam according to intervals, and receives beam feedback information from the UE.

In an embodiment of the present disclosure, it is assumed that the number of beams that an eNB receives in one interval during Random Access period is one. In an embodiment of the present disclosure, the number of beams that an eNB receives during Random Access period may be one or more. In an embodiment of the present disclosure, the numbers of beams that an eNB receives in different intervals during the Random Access period may be the same. In an embodiment of the present disclosure, the number of beams that an eNB receives in one interval during Random Access period may be one or more. In this case, the eNB may receive corresponding beams, using different resources, such as, different frequencies, different physical locations, and the like.

Figure 17:
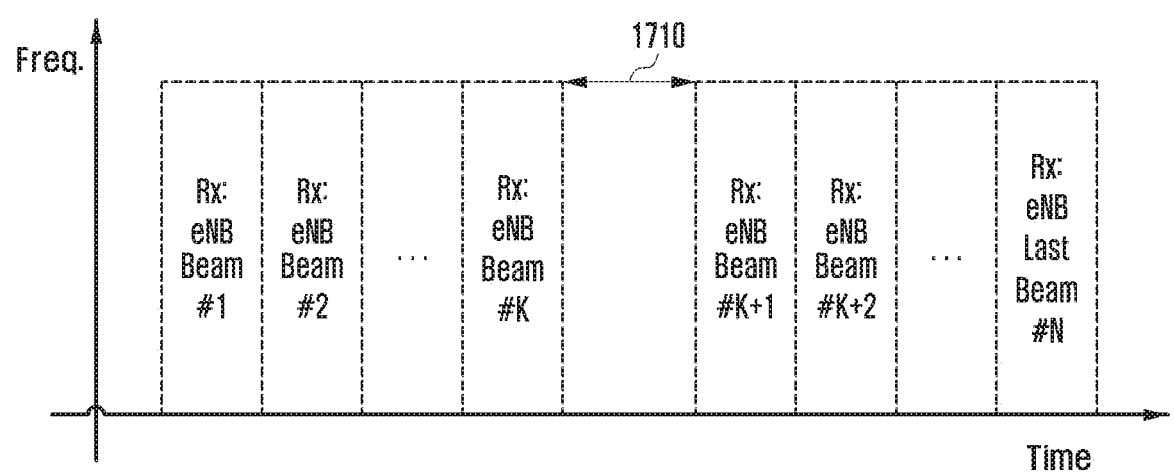
FIG. 17 is a diagram that describes a method of configuring a shared reception interval for an eNB beam change (sweeping) and a preamble transmission method according to an embodiment of the present disclosure.

FIG. 17 is a diagram that describes a method of configuring a shared reception interval for an eNB beam change (sweeping) and a preamble transmission method according to an embodiment of the present disclosure.

Referring to FIG. 17, the eNB beam change shared reception interval may be configured in such a way as to receive different beams that are apart from each other.

For example, an interval, indicated by a reference number 1710, is a reception interval shown as a blank. There may be a blank interval between interval for reception beam #K and an interval for reception beam #K+1. In this case, intervals for receiving a beam are spaced apart from each other. In an embodiment of the present disclosure, a number of blank intervals may be set within one cycle.

Figure 18:
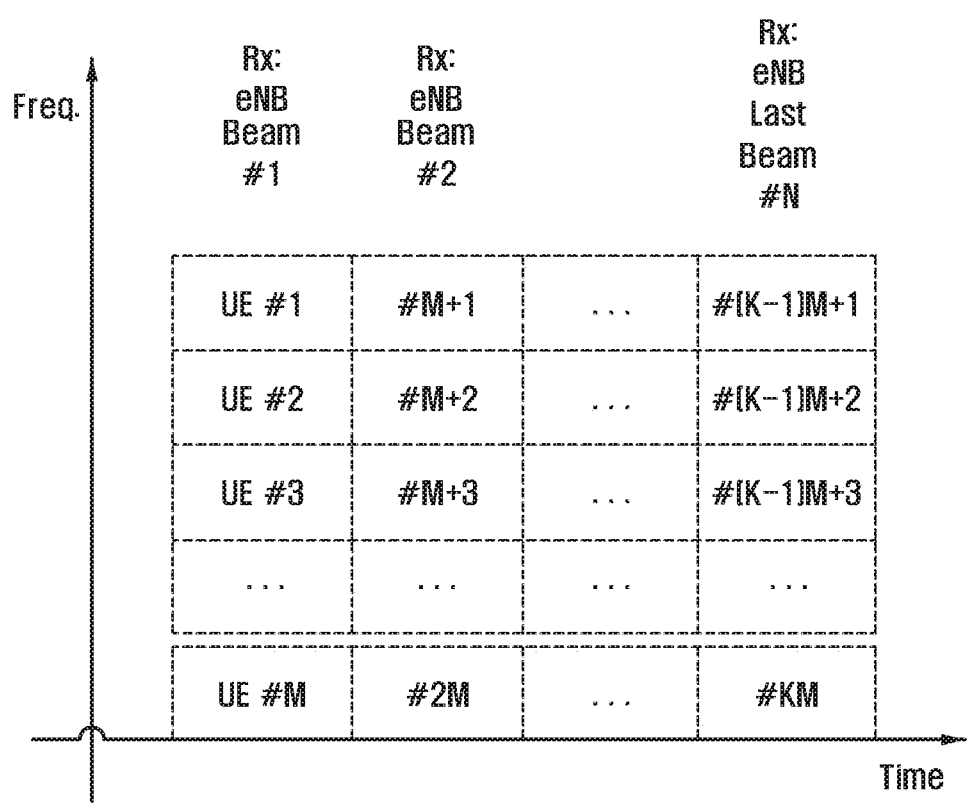
FIG. 18 is a diagram that describes a method of configuring a shared reception interval for an eNB beam change (sweeping) and a preamble transmission method according to an embodiment of the present disclosure.

FIG. 18 is a diagram that describes a method of configuring a shared reception interval for an eNB beam change (sweeping) and a preamble transmission method according to an embodiment of the present disclosure.

Referring to FIG. 18, different resources (e.g., frequencies) are allocated on each of the domains of beams to be received according to individual UEs.

In the graph shown in FIG. 18, the intervals of Rx beams vary according to intervals on the time-axis, and this configuration is the same as the embodiment shown in FIG. 16. In an embodiment referring to FIG. 18, the graph shows that Rx beam varies according to intervals on the time-axis and feedback information for different UEs is received on the frequency-axis. In the first time interval, feedback information for UE #1, UE #2, . . . , UE #M, according to frequencies, is received via Rx beam #1. In the second time interval, feedback information for UE #1, UE #2, . . . , UE #M, according to frequencies, is received via Rx beam #2.

The system according to the embodiment allocates unique resources to all the UEs (or a specified UE), enables the UEs (or specified UE) to transmit uplink information at a specified location, notifies individual UEs of the uplink information, and receives feedback of beam information via a corresponding resource.

Transmission of allocation information regarding a corresponding resource may be implemented with various methods. For example, the allocation information transmission method may be implemented in such a way as to transmit any type of information if the information can be transmitted, containing information regarding an allocated resource, e.g., a frequency and time. For example, the allocation information may be transmitted in the form of downlink control information (DCI) transmitted using 3GPP LTE PDCCH. An Rx beam received by the eNB may be an analogue beamforming form of a beam with N different directions, a digital beamforming form of a beam which is received at the same timing, overlapping with another, but is encoded by an encoding scheme that differs from that of the overlapping beam, a hybrid beam used by combing an analogue beam with a digital beam, or an omni-beam with the same directivity.

The information regarding the best beam performing feedback may be information regarding one or more beams.

When there is no beam feedback and beam change request method that has used a shared reception interval for an eNB beam change (sweeping), although a new beam capable of performing communication exists, a UE, which can no longer use a beam that it has used, does not use the new beam. Therefore, the UE needs to wait until a radio link failure (RLF) condition is satisfied, and then perform an initial access procedure where it newly connects to a network.

In an extremely high frequency band with strong directivity, such as, mmWave, and the like, a radio link may have various obstacles due to a passing vehicle, user's movement, and the like, and may experience frequent beam change within a relatively short period of time (e.g., less than 50 ms).

In a state where a UE has changed its location slightly and has another beam available for communication with a corresponding eNB (or a connected eNB), if the UE performs the determination of radio link failure to an existing network and the re-connection thereto, it may be a waste of time.

Therefore, the present disclosure provides a method that stably and rapidly transmitting a beam change request according to the beam change and the beam quality measurement, and an existing radio link failure, using a beam change reception interval of an eNB.

In the following description, various embodiments are explained, which are practically and usefully implemented, considering various environments: (1) a beam feedback method using a resource allocated by an eNB and (2) UE's initiating uplink beam feedback method co-exist mixed together, and each of the beam feedback methods performs beam feedback (3) periodically or (4) aperiodically.

Figure 19:
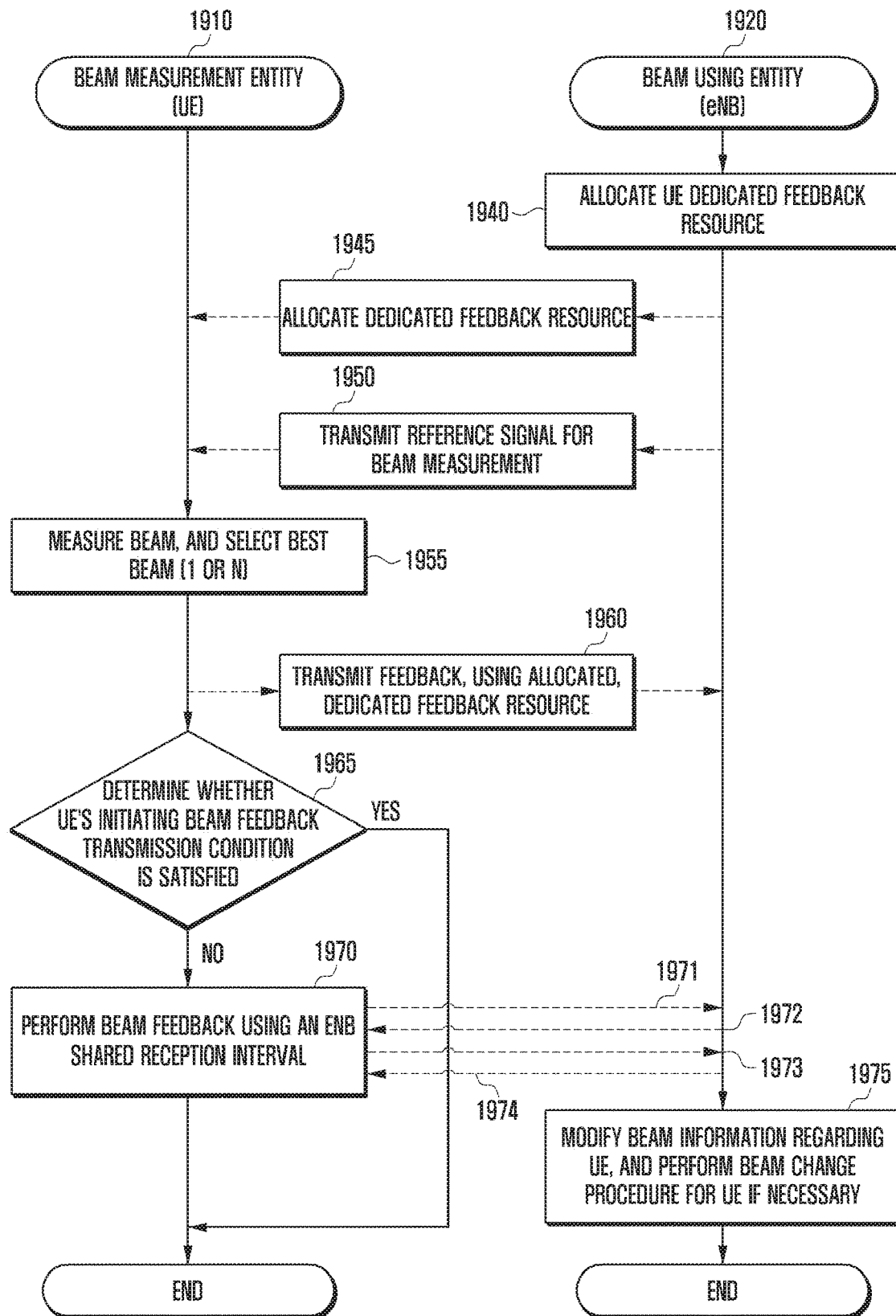
FIG. 19 is a flow diagram that describes a feedback method, considering a beam feedback method using a resource allocated by an eNB and a UE's initiating uplink beam feedback method, according to an embodiment of the present disclosure.

FIG. 19 is a flow diagram that describes a feedback method, considering a beam feedback method using a resource allocated by an eNB and a UE's initiating uplink beam feedback method, according to an embodiment of the present disclosure.

Referring to FIG. 19, a beam measurement entity 1910 may be a UE and a beam using entity 1920 may be an eNB. The beam using entity 1920 is capable of allocating the beam measurement entity 1910 a feedback resource in operation 1940. The feedback resource may be a dedicated feedback resource. The feedback resource may be allocated periodically or aperiodically. The beam using entity 1920 is capable of transmitting information regarding the allocated feedback resource to the beam measurement entity 1910 in operation 1945. Operations 1940 and 1945 are commonly called a feedback resource allocation. The beam using entity 1920 is capable of transmitting information regarding a feedback resource to the beam measurement entity 1910 using a best beam currently in use.

The beam using entity 1920 is capable of transmitting a reference signal for beam measurement to the beam measurement entity 1910 in operation 1950. The beam using entity 1920 is capable of transmitting reference signals for beam measurement corresponding to a number of beams respectively.

The beam measurement entity 1910 measures a beam in operation 1955. The beam measurement entity 1910 is capable of selecting a best beam based on the beam measurement result. Since the beam measurement method and the beam selection method are described above in embodiments of the present disclosure, a detailed description will be omitted below.

The beam measurement entity 1910 is capable of transmitting the beam measurement result to the beam using entity 1920 in operation 1960. The beam measurement result may contain content of the feedback resources described above in embodiments of the present disclosure.

The beam measurement entity 1910 is capable of determining whether UE's initiating beam feedback transmission condition is satisfied in operation 1965. The UE's initiating beam feedback refers to operations for a UE to directly determine whether beam feedback needs to be performed, and transmit beam feedback to an eNB based on the determination, without using periodic feedback transmission request of the eNB. When the beam measurement entity 1910 ascertains that UE's initiating beam feedback does not need to be performed in operation 1965, it ends the beam feedback.

On the other hand, when the beam measurement entity 1910 ascertains that UE's initiating beam feedback needs to be performed in operation 1965, it performs beam feedback using an eNB shared reception interval in operation 1970. Since the eNB shared reception interval was described above in embodiments of the present disclosure referring to FIGS. 16 to 18, a detailed description will be omitted below. The beam measurement entity 1910 may have previously received information regarding an eNB shared reception interval from the beam using entity 1920. The beam measurement entity 1910 is capable of transmitting feedback information, using a time resource and a frequency resource of the eNB shared reception interval.

The beam measurement entity 1910 is capable of performing beam feedback in operation 1970. The beam measurement entity 1910 is capable of performing feedback using a current best beam according to the beam measurement result. The beam measurement entity 1910 transmits feedback to the beam using entity 1920 in operation 1971, and receives an acknowledgement in response to the feedback in operation 1972. When the beam measurement entity 1910 has not received an acknowledgement in operation 1972, it re-transmits feedback to the beam using entity 1920 in operation 1973, and receives an acknowledgement therefrom in operation 1974. The beam measurement entity 1910 repeats the feedback transmission and the response reception a number of times, until it receives an acknowledgement from the beam using entity 1920.

The beam using entity 1920 is capable of modifying beam information regarding UE, based on the received beam feedback information or may change a beam for a UE if necessary in operation 1975.

It should be understood that the embodiment shown in FIG. 19 may also be modified in such a way that the allocation of a dedicated feedback resource through which the UE transmits beam feedback, the measurement of a reference signal for beam measurement, and the selection of a best beam are performed in different orders.

The UE needs to transmit beam feedback via a resource allocated by the eNB as the eNB requested. The eNB may allocate the beam feedback transmission resource periodically or aperiodically.

Alternatively, the UE is also capable of transmitting beam feedback, voluntarily or according to a UE's initiating manner, using a shared reception interval allocated by the eNB.

The UE's initiating beam feedback transmission condition may employ at least one of the feedback conditions described above in embodiments of the present disclosure.

In addition, the UE further transmits beam feedback via a dedicated resource allocated by an eNB of the related art and ascertains that the condition is satisfied. When a UE ascertains that the condition is satisfied, it may also transmit the same beam feedback information using a shared reception interval of the eNB. In this case, the beam feedback transmitted via a dedicated resource allocated by an eNB and the beam feedback transmitted via an eNB shared reception interval may be transmitted/received, using UE beams and/or eNB beams, which differ from each other.

The embodiment may set the conditions in such a way that the beam feedback resource allocation of an eNB is set to periodic resource allocation, a UE's initiating beam feedback transmission condition is set to a change from a best beam to another beam, and a shared reception interval of an eNB is set to a Random Access reception interval, which is descried below referring to FIG. 20.

Figure 20:
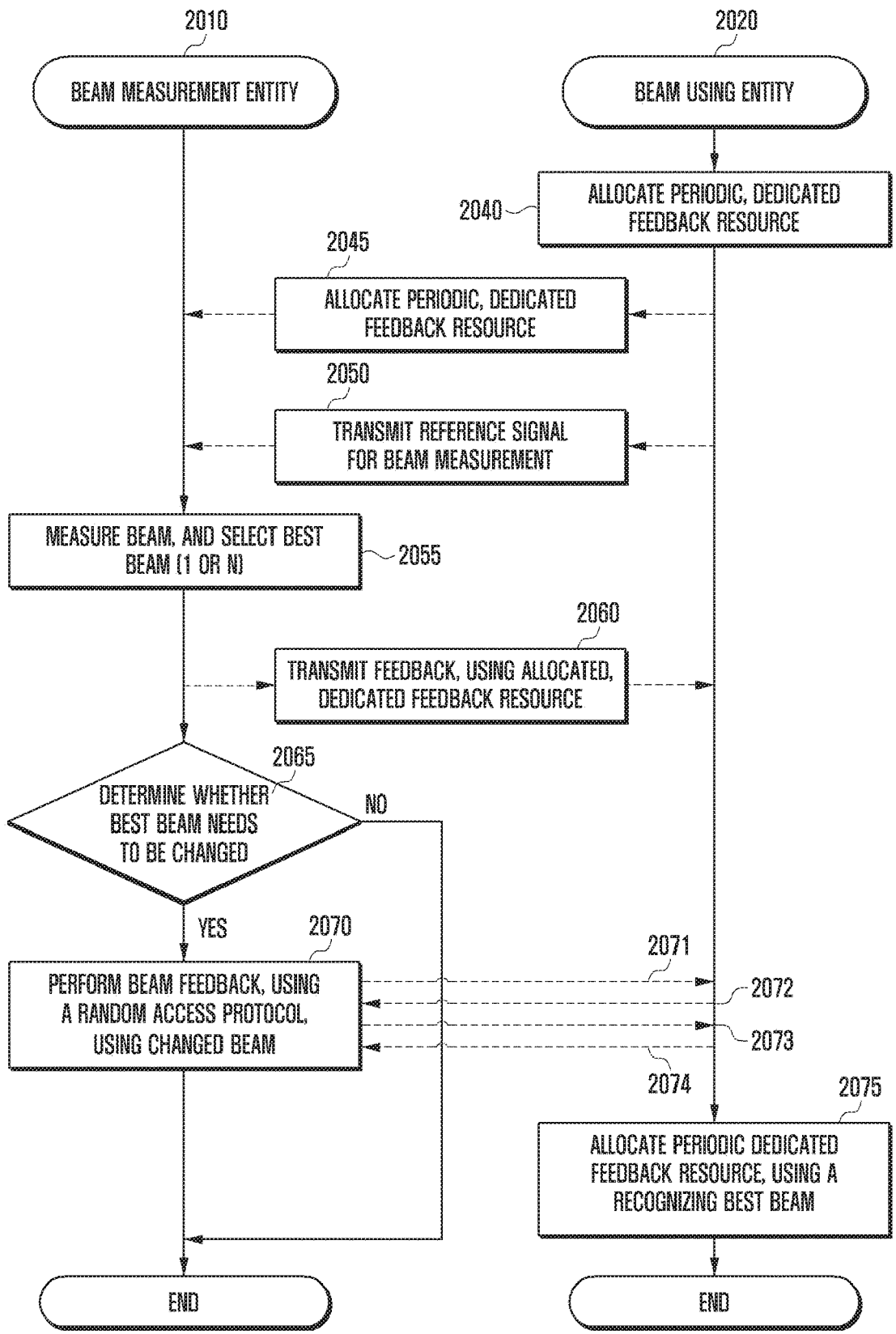
FIG. 20 is a flow diagram that describes a feedback method, considering a beam feedback method using a resource allocated by an eNB and a UE's initiating uplink beam feedback method, according to an embodiment of the present disclosure.

FIG. 20 is a flow diagram that describes a feedback method, considering a beam feedback method using a resource allocated by an eNB and a UE's initiating uplink beam feedback method, according to an embodiment of the present disclosure.

Referring to FIG. 20, a beam measurement entity 2010 may be a UE and a beam using entity 2020 may be an eNB.

Operations 2040 to 2060 refer to the description regarding operations 1940 to 1960 shown in FIG. 19. The feedback resource allocation may be periodic dedicated feedback resource allocation in operation 2045.

The beam measurement entity 2010 is capable of determining whether the best beam needs to be changed in operation 2065. The condition/criterion for determining whether the best beam needs to be changed refers to the section described above in the previous embodiments.

When the beam measurement entity 2010 ascertains that the best beam does not need to be changed in operation 2065, it does not perform UE's initiating beam feedback and ends the procedure.

On the other hand, when the beam measurement entity 2010 ascertains that the best beam needs to be changed in operation 2065, it is capable of performing beam feedback in operation 2070. The beam measurement entity 2010 may perform beam feedback using a random access protocol. The beam measurement entity 2010 may also perform beam feedback using a current best beam according to the beam measurement result. The beam measurement entity 2010 transmits feedback to the beam using entity 2020 in operation 2071, and receives an acknowledgement in response to the feedback in operation 2072. When the beam measurement entity 2010 has not received an acknowledgement in response to the feedback in operation 2072, it re-transmits feedback to the beam using entity 2020 in operation 2073, and receives an acknowledgement in response to the feedback in operation 2074. The transmission and response procedure for feedback information using a random access protocol is new, compared to the procedure of the related art. More particularly, the beam measurement entity 2010 repeats the feedback transmission and the response reception a number of times, until it receives an acknowledgement from the beam using entity 2020.

The beam using entity 2020 is capable of allocating a periodic dedicated feedback resource using its recognizing best beam in operation 2075.

Figure 21:
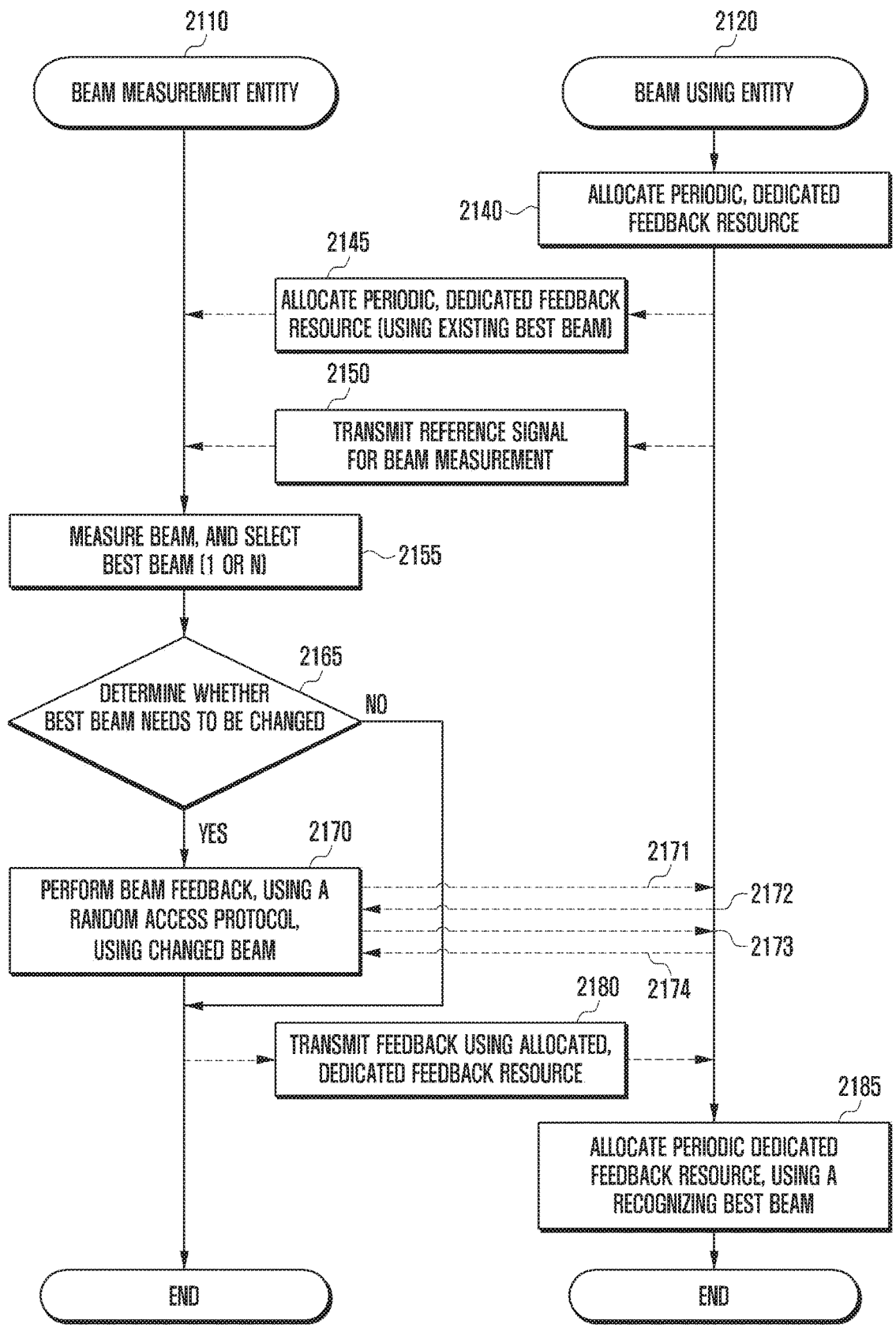
FIG. 21 is a flow diagram that describes a feedback procedure when a UE's initiating beam feedback is performed before an eNB allocates a feedback resource according to an embodiment of the present disclosure.

FIG. 21 is a flow diagram that describes a feedback procedure when a UE's initiating beam feedback is performed before an eNB allocates a feedback resource according to an embodiment of the present disclosure.

Referring to FIG. 21, a beam measurement entity 2110 may be a UE and a beam using entity 2120 may be an eNB.

Operations 2140 to 2155 refer to the description regarding operations 1940 to 1955 shown in FIG. 19.

The beam measurement entity 2110 is capable of determining whether the best beam needs to be changed in operation 2165. The condition/criterion for determining whether the best beam needs to be changed refers to the section described above in the previous embodiments.

The beam measurement entity 2110 performs beam feedback using the changed beam in operation 2170. The beam feedback refers to operation 2070 of FIG. 20. Operation 2171 to 2174 correspond to operation 2071 to 2074 shown in FIG. 20. In addition, operation 2180 corresponds to operation 2060 shown in FIG. 20.

The beam using entity 2120 allocates a periodic dedicated feedback resource using its recognizing best beam in operation 2185.

Figure 22:
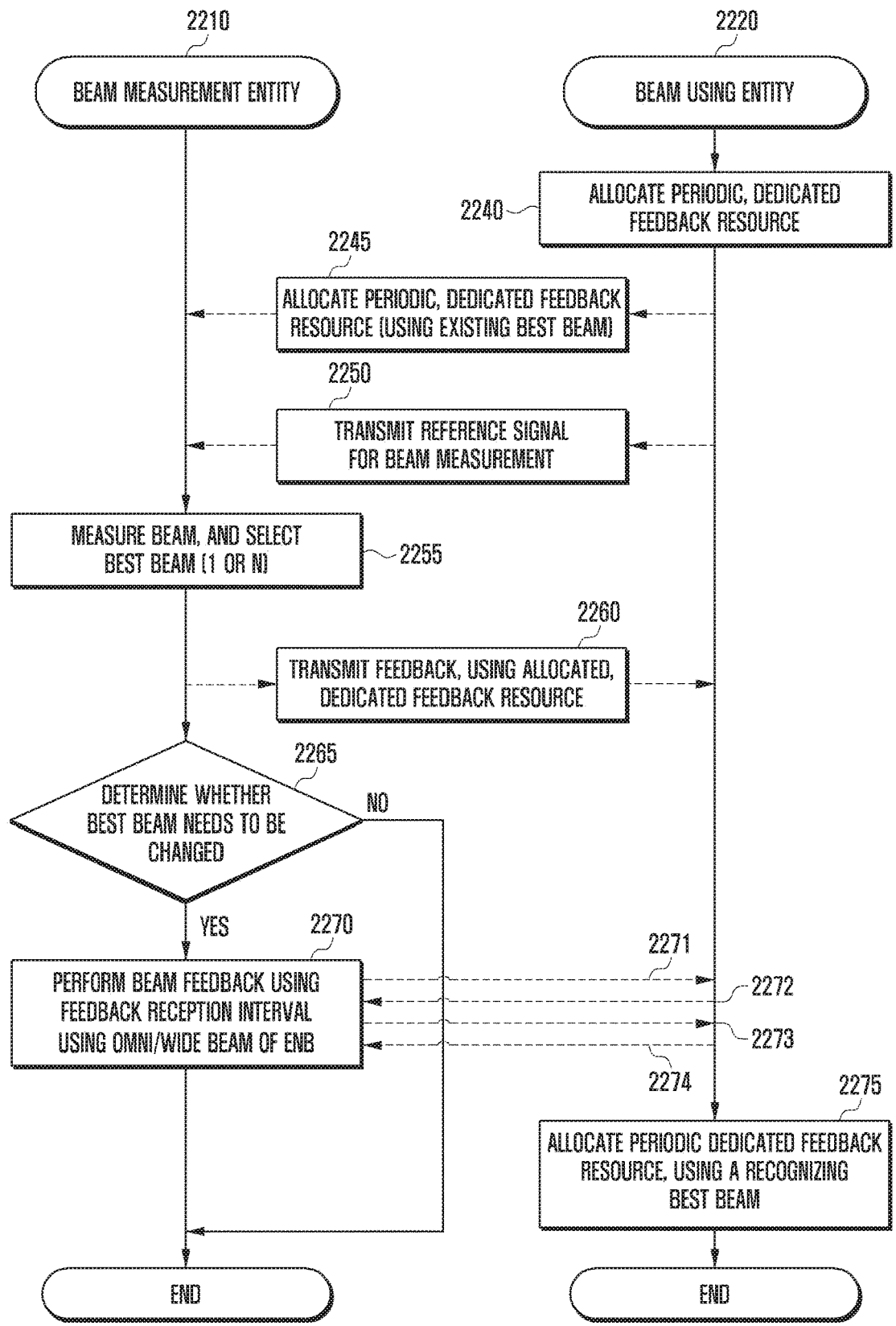
FIG. 22 is a flow diagram that describes UE's initiating feedback transmission using another bandwidth according to an embodiment of the present disclosure.

FIG. 22 is a flow diagram that describes a UE's initiating feedback transmission using another bandwidth according to an embodiment of the present disclosure.

Referring to FIG. 22, the UE's initiating beam feedback may be transmitted/received using a beam whose beam width differs from that of a beam that an eNB uses for information transmission, e.g., an omni-beam or a wide/narrower beam. A beam measurement entity 2210 may be a UE, and a beam using entity 2220 may be an eNB.

Operations 2240 to 2275 refer to the description regarding operations 2240 to 2075 shown in FIG. 20.

The beam measurement entity 2210 is capable of transmitting feedback via a beam whose beam width differs from that of a beam that an eNB uses for information transmission, and the beam using entity 2220 is capable of receiving feedback information regarding the beam measurement entity 2210, via a beam whose beam width differs from that of a beam used for transmitting information in operation 2270.

In operation 2270, for an instance that the beam direction is turned away or a UE does not know a beam for reception, the eNB may operate an interval for receiving wireless information using an omni-beam or a wide beam.

The UE may transmit information to the eNB, using (1) a random access or (2) a resource which is always allocated to each UE, during the interval.

The feedback transmission using the allocated, dedicated feedback resource may be performed regardless of the best beam change. Alternatively, the feedback transmission using the allocated, dedicated feedback resource may not be performed, based on the determination as to whether the best beam is changed.

Figure 23:
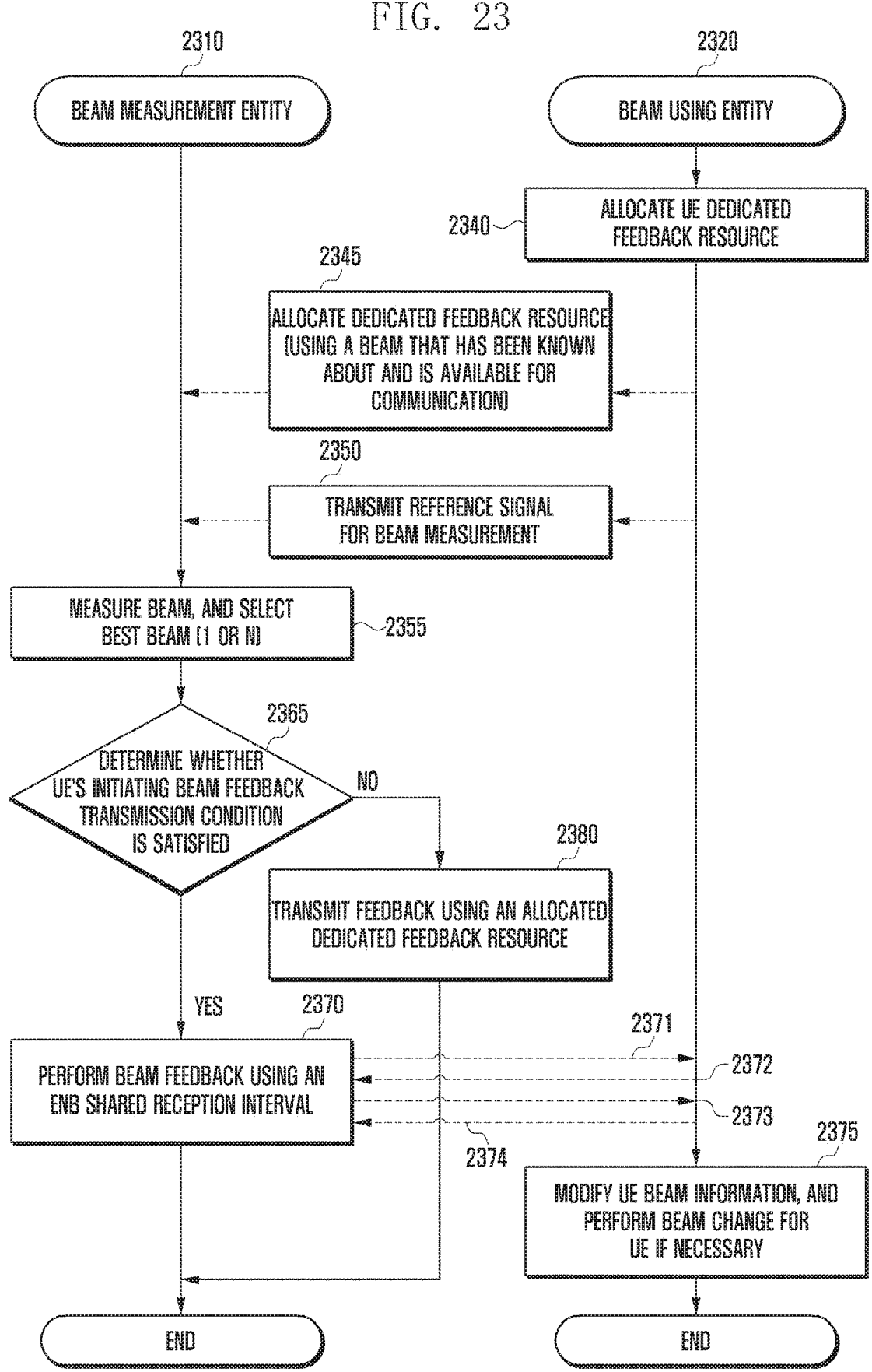
FIG. 23 is a flow diagram that describes a feedback procedure based on a condition as to whether UE's initiating beam feedback transmission condition is satisfied according to an embodiment of the present disclosure.

FIG. 23 is a flow diagram that describes a feedback procedure based on a condition as to whether UE's initiating beam feedback transmission condition is satisfied according to an embodiment of the present disclosure.

Referring to FIG. 23, a beam measurement entity 2310 is capable of determining whether UE's initiating beam feedback transmission condition is satisfied before every feedback, and selecting a mode of transmitting feedback based on the determination.

Referring to FIG. 23, the beam measurement entity 2310 may be a UE, and a beam using entity 2320 may be an eNB. Operations 2340 to 2365 refer to the description regarding operations 1940 to 1965 shown in FIG. 19.

When the beam measurement entity 2310 ascertains that UE's initiating beam feedback transmission condition is satisfied in operation 2365, it performs beam feedback using an eNB shared reception interval in operation 2370. A detailed operation regarding beam feedback refers to the description regarding an eNB shared reception interval as in operation 1970. Operations 2371 to 2374 refer to the description regarding operations 1971 to 1974 shown in FIG. 19.

The beam using entity 2320 is capable of modifying beam information regarding the UE or changing a beam for the UE, based on the received beam feedback information, in operation 2375.

When the beam measurement entity 2310 ascertains that the UE's initiating beam feedback transmission condition is not satisfied in operation 2365, it is capable of transmitting feedback information using an allocated dedicated feedback resource in operation 2380.

In an embodiment of the present disclosure, a UE is capable of transmitting beam feedback information using an allocated, dedicated feedback resource or an eNB shared reception interval. The UE is also capable of selecting a method of transmitting beam feedback, using a UE's initiating shared reception interval or an allocated, dedicated feedback resource, every beam measurement. In this case, the beam feedback transmitted via a dedicated resource allocated by an eNB and the beam feedback transmitted via an eNB shared reception interval may be transmitted/received using UE beams and/or eNB beams, which differ from each other.

Figure 24A:
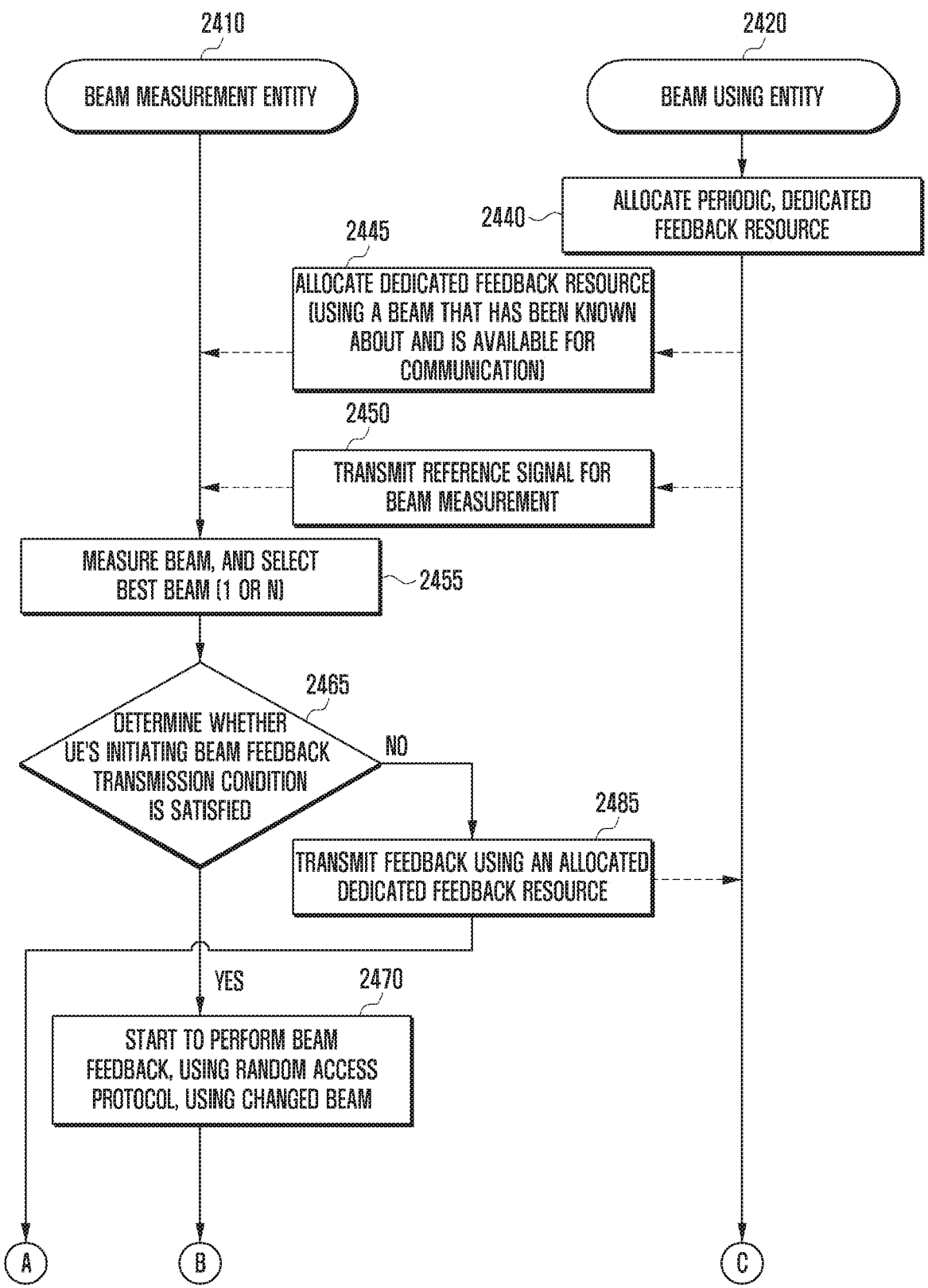
FIGS. 24A and 24B are flow diagrams that describe operations of a UE when a beam feedback method using an eNB shared reception interval of the embodiment shown in FIG. 23 is a contention-based random access method according to various embodiments of the present disclosure.
Figure 24B:
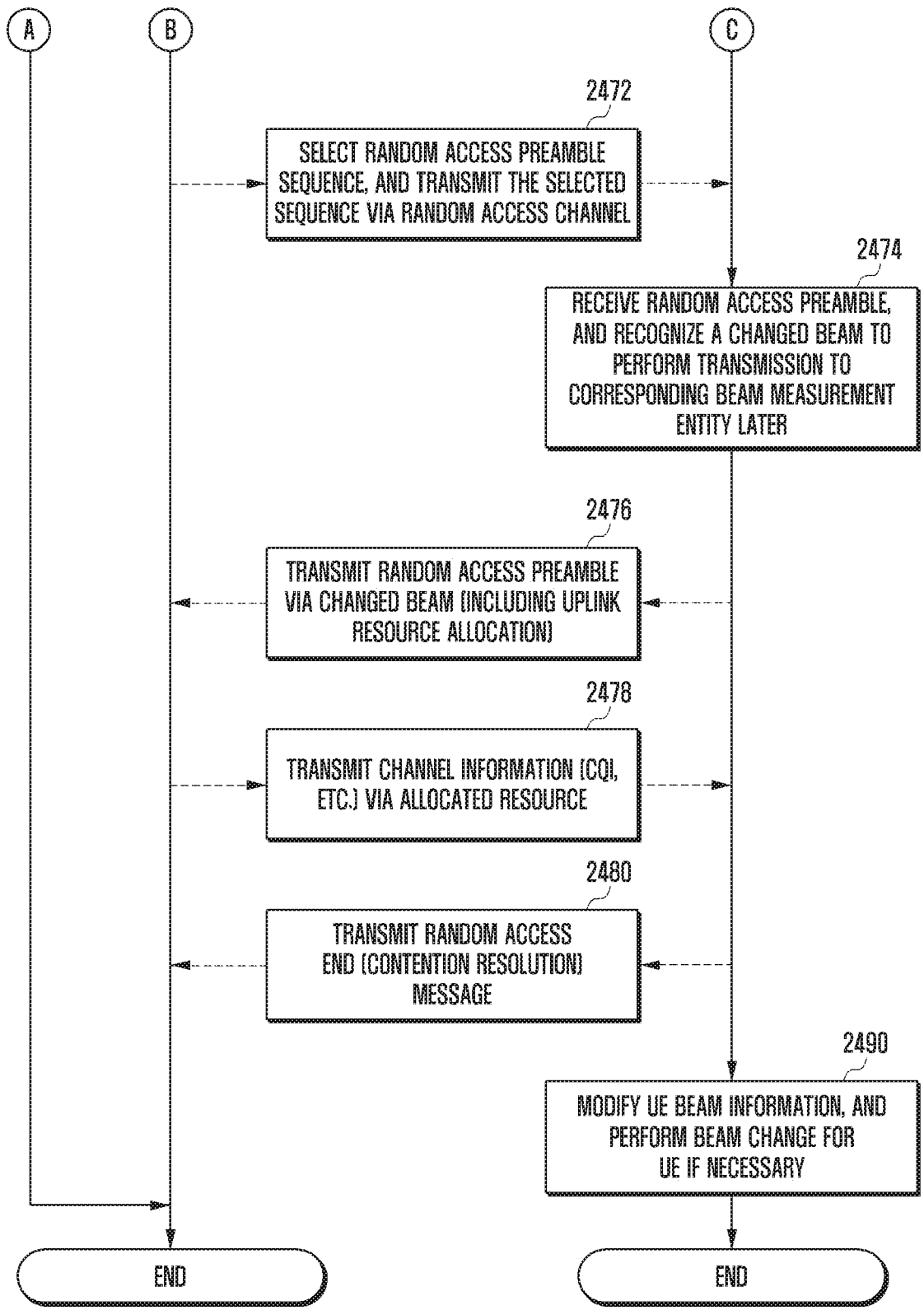

FIGS. 24A and 24B are flow diagrams that describe operations of a UE when a beam feedback method using an eNB shared reception interval of the embodiment shown in FIG. 23 is a contention-based random access method according to various embodiments of the present disclosure. The contention-based random access method is configured, referring to 3GPP LTE RACH.

Referring to FIGS. 24A and 24B, a beam measurement entity 2410 may be a UE, and a beam using entity 2420 may be an eNB.

Operations 2440 to 2465 refer to the description regarding operations 2340 to 2365 shown in FIG. 23.

When the beam measurement entity 2410 ascertains that the UE's initiating beam feedback transmission condition is satisfied in operation 2465, it starts to perform beam feedback using the changed beam in operation 2470. The beam measurement entity 2410 may start to perform beam feedback using a random access protocol.

The beam measurement entity 2410 selects a random access preamble sequence, and transmits a random access preamble using the selected random access preamble sequence in operation 2472. In this case, the beam measurement entity 2410 is capable of transmitting a random access preamble using a desired beam (a beam to which an existing beam will be changed). The UE, which has determined to transmit the UE's initiating beam feedback via an eNB shared interval (or a random access channel), selects one of the preamble sequences that the UE has known about (or which are notified as they are available by an eNB), and transmits a corresponding random access preamble using a random access channel notified by the eNB.

When the eNB has allocated an interval receiving a random access preamble by sweeping a beam, the UE is capable of transmitting a preamble (preambles) related to (1) all the eNB reception beams or (2) one or N eNB reception beams which are estimated for the eNB to perform most successful reception, according to a measurement result, within a corresponding interval.

The beam using entity 2420 receives the random access preamble in operation 2474. In addition, the beam using entity 2420 determines whether an acknowledgement needs to be transmitted to the beam measurement entity 2410 via the changed beam, based on the received random access preamble. The beam using entity 2420 is capable of determining whether a beam transmitting a random access preamble is a best beam that has been used or a changed beam. When the beam using entity 2420 ascertains that a beam transmitting a random access preamble is a changed beam, it may recognize that the best beam needs to be changed. The eNB is capable of determining whether the UE selecting a preamble succeeds/fails in transmitting an uplink preamble, via a PRACH receiving a random access preamble by sweeping a beam. In this case, a beam which has received a corresponding preamble using a beam (or beams) succeeding in reception is selected as a beam to perform wireless communication with corresponding UE. In this case, the eNB has not yet known about the UE that performed the preamble transmission, a preamble, and the purpose of the preamble.

Preamble transmission using contention-based random access of the related art is performed (1) for network initial access/re-connection of a UE or (2) to obtain uplink synchronization of UE. In addition to the two conditions (1) and (2), an embodiment of the present disclosure further includes (3) UE initiated random access performing condition for transmitting beam feedback information by the UE in order to transmit a corresponding RACH.

The beam using entity 2420 transmits a random access response to the beam measurement entity 2410 in operation 2476. The beam using entity 2420 may change a beam based on the received random access preamble, and may transmit a random access response via the changed beam. The random access response may include information for uplink resource allocation. The eNB indicates corresponding preamble transmission UE by random access radio network temporary identifier (RA-RNTI), based on a transmission/reception time of each preamble. The eNB selects a beam receiving a corresponding preamble as a best beam, allocates an uplink resource with the selected beam (UL Grant), creates a random access response (RAR) message from the uplink resource, and transmits the message to the UE, using a corresponding beam, within a random access response interval (RAR window). When channel reciprocity is assumed, a best beam suitable for a UE to perform transmission is identical to a best beam that an eNB may use to perform transmission.

The beam measurement information may be transmitted along with channel information in operation 2478. The channel measurement information may contain channel state information (CSI) and information regarding channel quality indicator (CQI). The UEs selecting different random access sequences check information contained in RAR messages, determine whether information transmitted by each of the UEs is correctly received, and identify corresponding RAR messages transmitted to them respectively (i.e., determine whether an RAR containing an RA-RNTI according to a time that each of the UE performed transmission is transmitted).

When the UE opens an RAR message received via its RA-RNTI and ascertains that its transmitted preamble ID is identical to a preamble ID in a corresponding RAR, it determined that the corresponding RAR is the RAR of the preamble transmitted by the UE and performs the following procedure.

1) Determine a TC-RNTI contained in the RAR as an ID to use in the next uplink message transmission 2) Obtain uplink synchronization using Timing Advance information contained in an RAR 3) Detect UL Grant in an RAR, and then an uplink transmission resource of the next message The UE performs transmission (feedback) of UE information, channel information, best beam information, and the like, according to uplink resource scheduling information (UL Grant) contained in a received random access response. In this case, the UE selects a sender ID for feedback information as a TC-RNTI, and transmits the sender ID, along with an ID representing that a corresponding message is an uplink beam feedback message (if it exists).

The eNB receives a corresponding message and identifies that the corresponding message is uplink beam feedback information from a specified UE in operation 2480, based on the following methods:

1) When the UE uses UL Grant, includes used C-RNTI information in an uplink message, and transmits the channel information, the eNB may detect that a corresponding UE is connected to the UE, using the received information.

Figure 25:
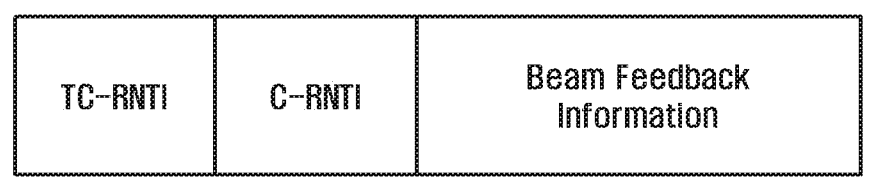

FIG. 25 is a diagram showing a frame structure of beam feedback transmitted by a UE according to an embodiment of the present disclosure.

Referring to FIG. 25, a beam feedback frame includes TC-RNTI, C-RNTI, and beam feedback information. The beam feedback frame includes TC-RNTI as a sender ID of a corresponding message, an ID (C-RNTI) contained in a message, specifying that a sender of a corresponding message is a UE in a connected state, and beam information (beam ID, beam reception location, beam channel performance, and the like) that the corresponding UE desired to change. The Beam Feedback Information may be one of the values that the UE can observe and calculate, e.g., RSRP, RSRQ, CQI, SNR, SINR, RSSI, and the like.

2) When the UE uses UL Grant, includes information representing that a corresponding message is UL Beam Feedback in an uplink message, and transmits the message, the eNB may update beam information regarding the corresponding UE (or may change a beam).

FIG. 26 is a diagram showing a frame structure of beam feedback transmitted by a UE according to an embodiment of the present disclosure.

Referring to FIG. 26, a beam feedback frame includes TC-RNTI, category, C-RNTI, and beam feedback information. The category may contain information indicating that a corresponding message is information for beam feedback.

An eNB receives a beam feedback message as in Item 1) or 2), recognizes that a transmission node of a corresponding message is a specified UE that has been connected (using a C-RNTI), and updates or modifies beam information regarding the corresponding UE (using beam feedback information).

The beam using entity 2420 is capable of transmitting a random access end message to the beam measurement entity 2410 in operation 2480. The random access may be contention-based random access. The random access end message may contain a contention-based random access result. The eNB receives UE information transmitted via UL Grant resource, and then transmits, to a UE, a reception acknowledgement message (i.e., contention resolution, simultaneous transmission), thereby addressing the random access collision between UEs selecting the same preamble.

The beam using entity 2420 is capable of modifying beam information regarding the UE or changing a beam for a UE, based on the received beam feedback information, in operation 2490.

When the beam measurement entity 2410 ascertains that the UE's initiating beam feedback transmission condition is not satisfied in operation 2465, it is capable of transmitting feedback information to the beam using entity 2420 using the allocated dedicated feedback resource in operation 2485.

As described in the flow diagram, the technology according to the present disclosure supports the transmission of beam feedback every third uplink information transmission, compared to 3GPP RACH. For example, an existing random access protocol does not include the transmission of beam feedback via the third uplink information transmission. However, in order to transmit beam feedback information using a random access protocol, the embodiment of the present disclosure includes content related to beam feedback in channel information, and transmits the channel information as in operation 2478. To this end, in order to respond to an RACH procedure that the UE requested by transmitting a random access preamble, an eNB needs to allocate a resource of a sufficient size for the third uplink information transmission so that the corresponding allocated resource can transmit beam feedback.

Figure 27A:
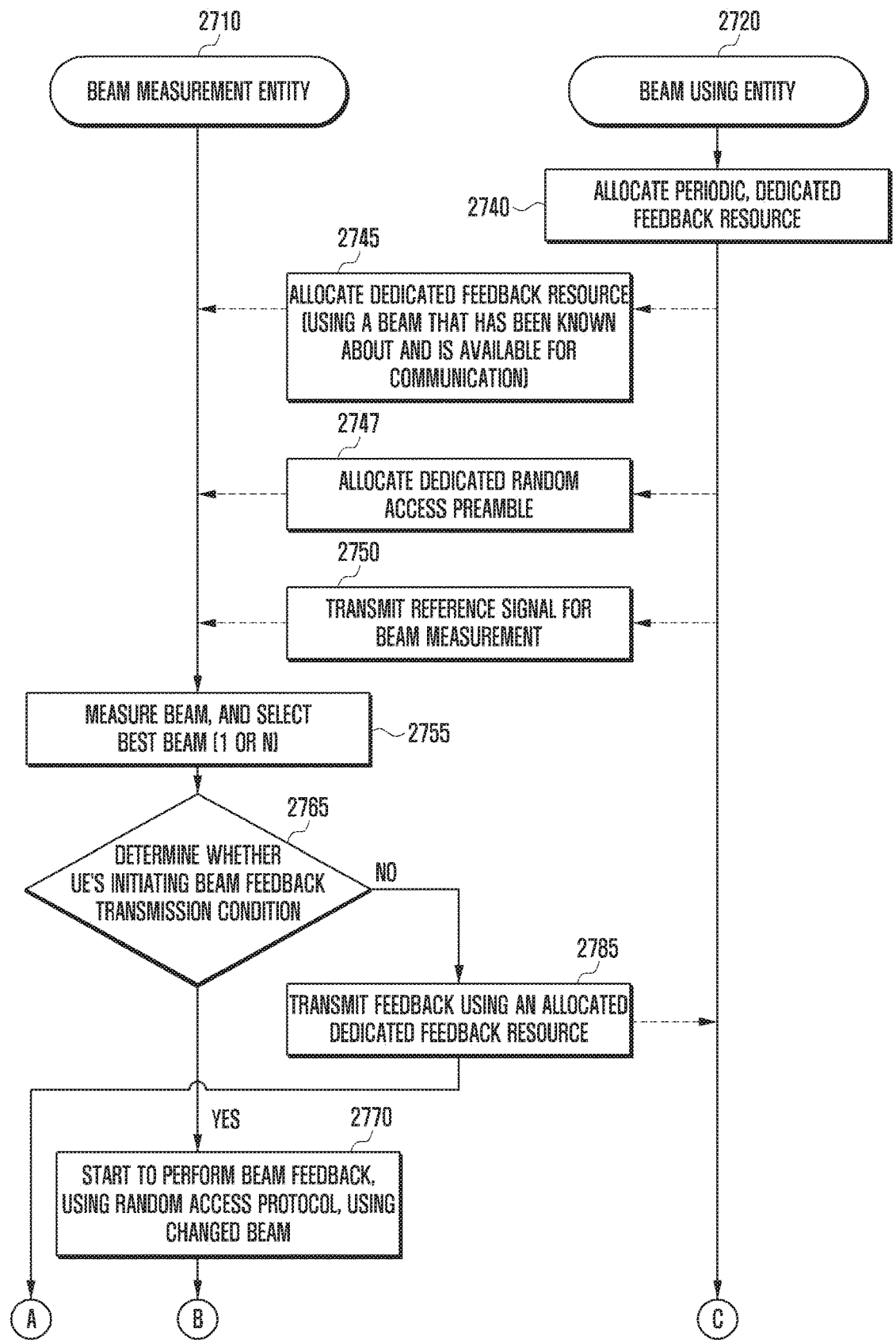
FIGS. 27A and 27B are flow diagrams that describe operations of a UE when a beam feedback method using an eNB shared reception interval of the embodiment shown in FIG. 23 is a contention-free random access method according to various embodiments of the present disclosure.
Figure 27B:
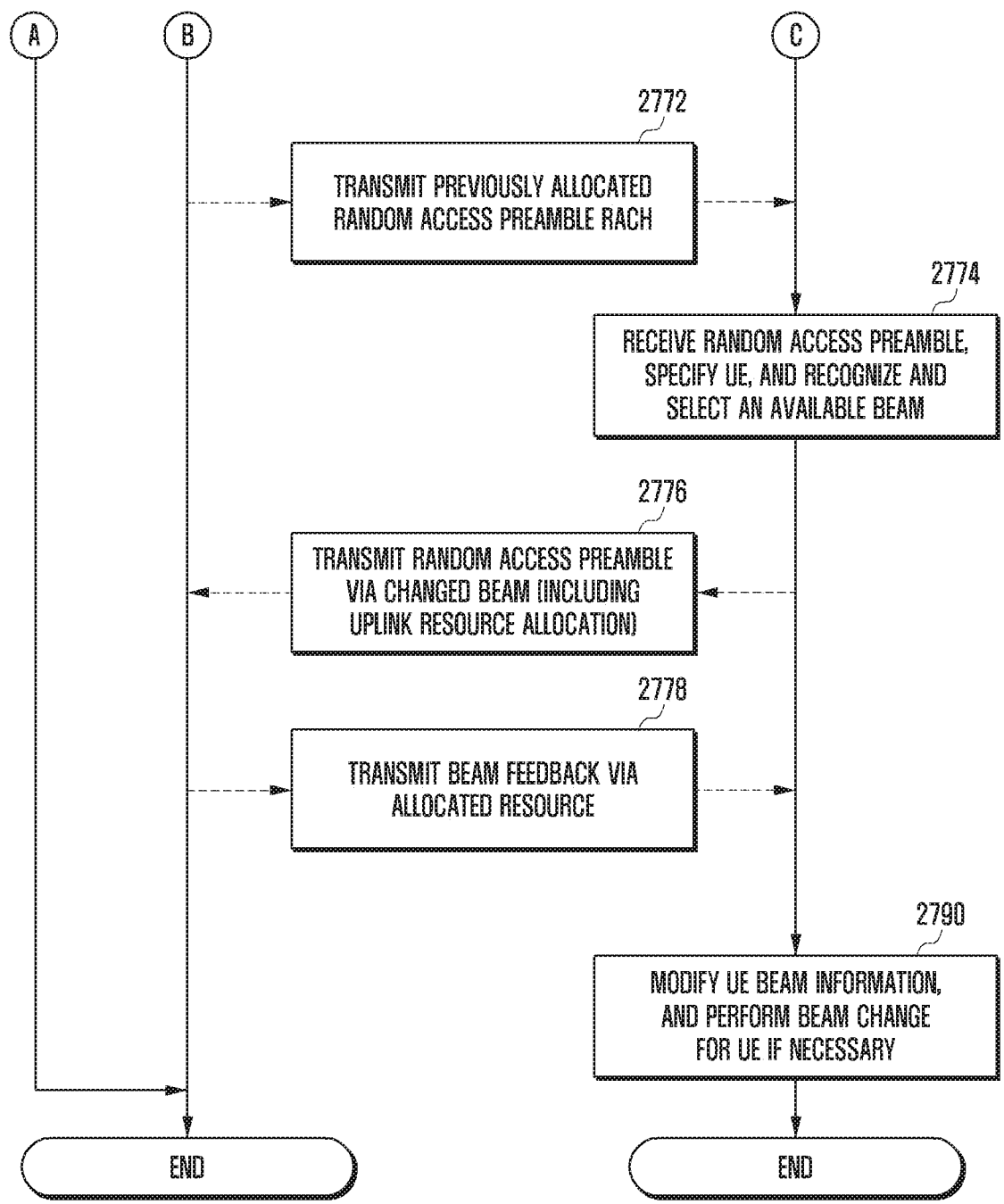

FIGS. 27A and 27B are flow diagrams that describe operations of a UE when a beam feedback method using an eNB shared reception interval of the embodiment shown in FIG. 23 is a contention-free random access method according to various embodiments of the present disclosure.

The contention-free random access method is configured, referring to 3GPP LTE RACH.

Referring to FIGS. 27A and 27B, a beam measurement entity 2710 may be a UE, and a beam using entity 2720 may be an eNB.

Operations 2740 to 2765 refer to the description regarding operations 2340 to 2365 shown in FIG. 23.

Since the embodiment shown in FIGS. 27A and 27B has a feature to perform beam feedback via contention-free random access, the beam using entity 2720 is capable of allocating a dedicated random access preamble in operation 2747. Each UE is allocated a unique random access preamble. The random access preamble may be allocated with a unique value so that each UE can use the random access preamble to request the allocation of a resource for only beam feedback transmission. The random access preamble may be allocated with a unique value so that each UE can use the random access preamble for various purposes, e.g., a purpose for requesting the allocation of a resource for uplink transmission, a purpose for requesting the allocation of a resource for beam feedback transmission, and the like.

When the beam measurement entity 2710 ascertains that UE's initiating beam feedback transmission condition is satisfied in operation 2765, it starts to perform beam feedback using the changed beam in operation 2770. The beam measurement entity 2710 starts to perform beam feedback using a random access protocol.

The beam measurement entity 2410 is capable of transmitting a random access preamble using a pre-selected random access preamble in operation 2772. The beam measurement entity 2710 is capable of transmitting a random access preamble using the received random access preamble in operation 2747. In order to perform the contention-free random access, the UE transmits a random access preamble to an eNB, via an RACH and a unique random access preamble that the eNB has allocated to the UE.

The beam using entity 2720 is capable of specifying the UE that transmitted a random access preamble, based on the received random access preamble in operation 2774. The beam using entity 2720 is capable of identifying and selecting an available beam for the UE, based on the received random access preamble. When the eNB receives a corresponding preamble, it recognizes that the UE has beam feedback information to transmit, and allocates the UE a corresponding amount of beam feedback resource.

When a beam is changed, the beam using entity 2720 is capable of transmitting a random access response using the changed beam in operation 2776. The random access response may contain resource allocation information for beam feedback.

The beam measurement entity 2710 is capable of transmitting beam feedback information via the allocated resource in operation 2778.

The beam using entity 2720 is capable of modifying UE beam information based on the received beam feedback information in operation 2790. In addition, the beam using entity 2720 and the beam measurement entity 2710 may further perform a beam change procedure.

When the beam measurement entity 2710 ascertains that the UE's initiating beam feedback transmission condition is not satisfied in operation 2765, it is capable of transmitting beam feedback using an allocated power feedback resource in operation 2785.

The embodiment may set the conditions in such a way that the beam feedback resource allocation of an eNB is set to periodic resource allocation, a UE's initiating beam feedback transmission condition is set to a change from a best beam to another beam, a previous beam is set so that it is not available, and a shared reception interval of an eNB is set to a random access reception interval, which is descried below referring to FIG. 28.

Figure 28:
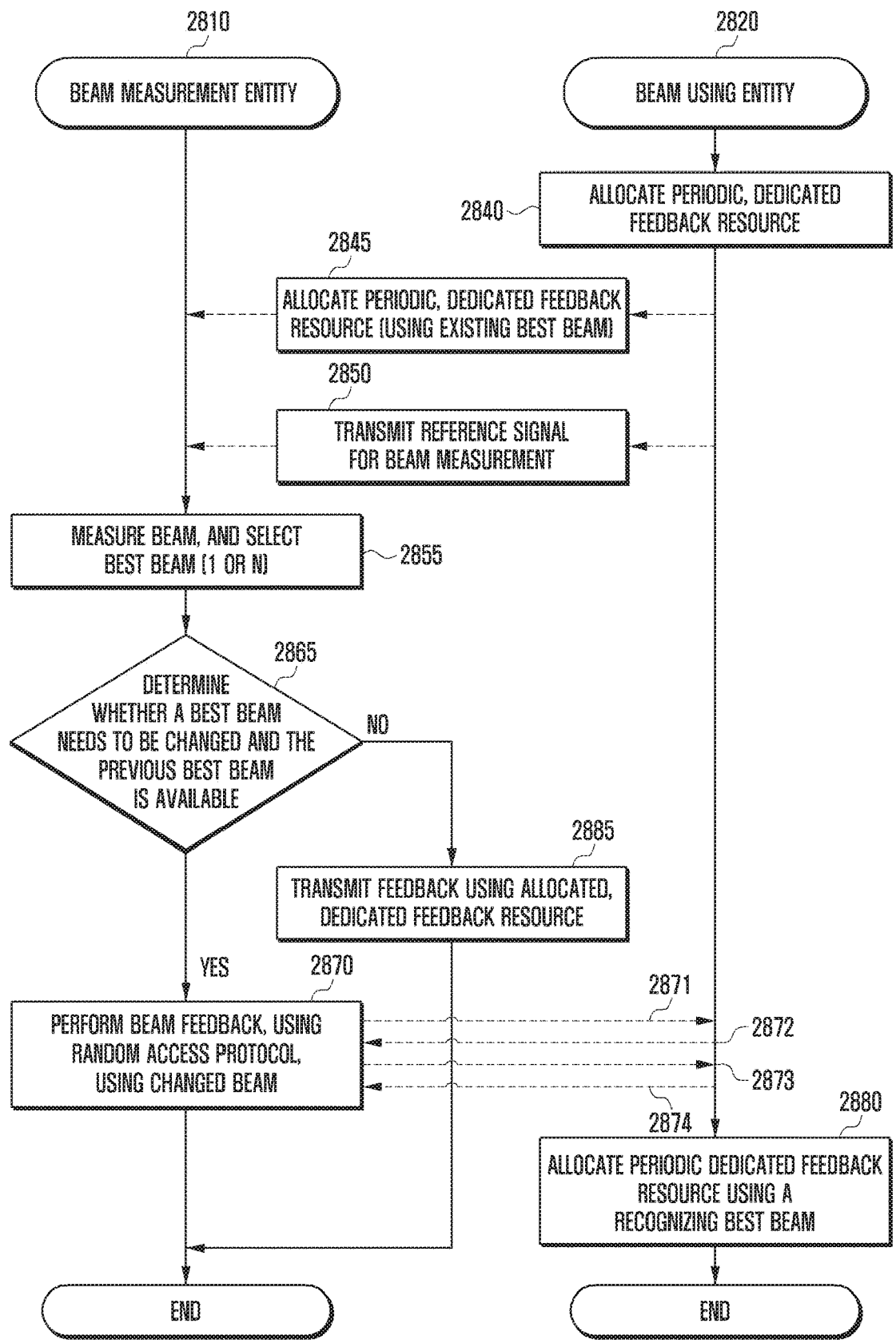
FIG. 28 is a flow diagram that describes a method for a UE to perform beam measurement and beam feedback using a random access protocol according to an embodiment of the present disclosure.

FIG. 28 is a flow diagram that describes a method for a UE to perform beam measurement and beam feedback using a random access protocol according to an embodiment of the present disclosure.

Referring to FIG. 28, a beam measurement entity 2810 may be a UE, and a beam using entity 2820 may be an eNB.

Operations 2840 to 2855 refer to the description regarding operations 2740 to 2755 shown in FIGS. 27A and 27B.

The beam measurement entity 2810 determines whether a best beam needs to be changed and the previous best beam is available in operation 2865. The possibility of use of the previous best beam may be related to an instance that the channel quality of the previous best beam (a serving beam currently in use) is less than or equal to a threshold. The possibility of use of the previous best beam may be an instance that a best beam measured by the UE is changed from an existing best beam, and the channel quality of the previous best beam is less than a specified threshold [(another beam>current beam+Threshold_1) and/or (current beam<Threshold_2)]. The channel quality may be one of the following RSRP, RSRQ, CQI, SNR, SINR, PER, BER, BLER, and FER.

When the beam measurement entity 2810 ascertains that a best beam does not need to be changed in operation 2865, it transmits feedback information via an allocated dedicated feedback resource in operation 2885.

On the other hand, when the beam measurement entity 2810 ascertains that a best beam needs to be changed in operation 2865, it proceeds with operation 2870 of sub-operations 2871 to 2874. The beam measurement entity 2810 is capable of performing beam feedback using a changed beam in operations 2871 to 2874. To this end, the beam measurement entity 2810 may use a random access protocol. The process of using a random access protocol refers to the sections described above referring to FIGS. 23, 24A and 24B, 27A and 27B, and the like.

The beam using entity 2820 is capable of allocating a dedicated feedback resource via a best beam that it has recognized in operation 2880. The resource allocation may be performed periodically. The beam using entity 2820 is capable of recognizing a best beam from the beam feedback.

3. 1. The UE's Initiating Beam Feedback Transmission Method Based on Uplink Synchronization A. When uplink is synchronized (when timeAlignment-Timer (TAT) has not expired or a condition is satisfied), the UE requests a resource for beam feedback via uplink transmission using a corresponding preamble, and transmits beam feedback via the allocated resource, in an interval in which an eNB, which can transmit a preamble with a short cyclic prefix (CP) according to uplink synchronization, performs receptions by sweeping a beam.

a1. When an eNB performs reception using a specified beam (a beam that the UE desires to change) in an interval in which the eNB performs reception by sweeping a beam, the UE transmits a corresponding preamble to the eNB, thereby requesting the eNB to change a beam to a corresponding beam. In this case, the eNB may immediately perform beam change in response to the UE's request without allocating resources or may transmit a signal for commanding to perform beam change.

a2. When an interval transmitting a preamble for a beam change is an interval transmitting a SR, the UE includes beam feedback in a UL grant resource of SR and transmits it.

a3. When beam change is needed, an eNB may transmit a beam change indication in response to the beam feedback B. When uplink is not synchronized or when, although uplink is synchronized, the UE is not allocated a preamble with a short cyclic prefix by an eNB, the UE transmits a preamble, using a contention-based preamble arbitrarily selected or a contention-free preamble previously allocated by an eNB, in an interval in which the eNB performs reception by sweeping a beam, thereby requesting an uplink resource from the eNB and transmitting beam feedback via the allocated uplink resource.

b1. When an eNB performs reception using a specified beam (a beam that the UE desires to change) in an interval in which the eNB performs reception by sweeping a beam, a UE transmits a corresponding preamble to the eNB, thereby requesting the eNB to change a beam to a corresponding beam. In this case, the eNB may immediately perform beam change in response to the UE's request without allocating resources or may transmit a signal for commanding to perform beam change.

b2. When an interval transmitting a preamble for a beam change is an RACH, a UE includes beam feedback in an msg.3 of the RACH and transmits it.

b3. When beam change is needed, a beam change indication is included in a contention result (contention resolution), i.e., an msg.4 of the RACH, and then transmitted.

C. A corresponding UE transmits, to an eNB, a transmittable resource allocation request message, a beam feedback transmission message or a beam change request message, regardless of uplink synchronization, in an interval in which the eNB performs reception by sweeping a beam, thereby notifying the eNB that beam change is needed.

c1. The UE may transmit, to an eNB, a signal which is previously arranged and is receivable by the eNB. The signal may be a very short signal (short preamble/beacon/reference signal/pilot signal) transmitted via a very narrow frequency band which has been arranged between the UE and the eNB.

c2. When an eNB receives a signal and needs to identify a specified UE transmitting the signal, it may perform a corresponding operation and an operation for changing a scheduling beam of the UE.

D. Beam feedback may be transmitted in the form of piggyback (MAC-CE) or multiplexing (UCI) uplink data in a previously allocated resource for uplink transmission.

E. The beam feedback method is not limited by RACH, but may be applied to transmission in any interval where an eNB performs reception by sweeping a beam.

In an embodiment of the present disclosure, when a difference between current time and reference signal transmission time for beam measurement is less than or equal to a specified threshold, the eNB may not perform the allocation of a feedback resource.

Figure 29:
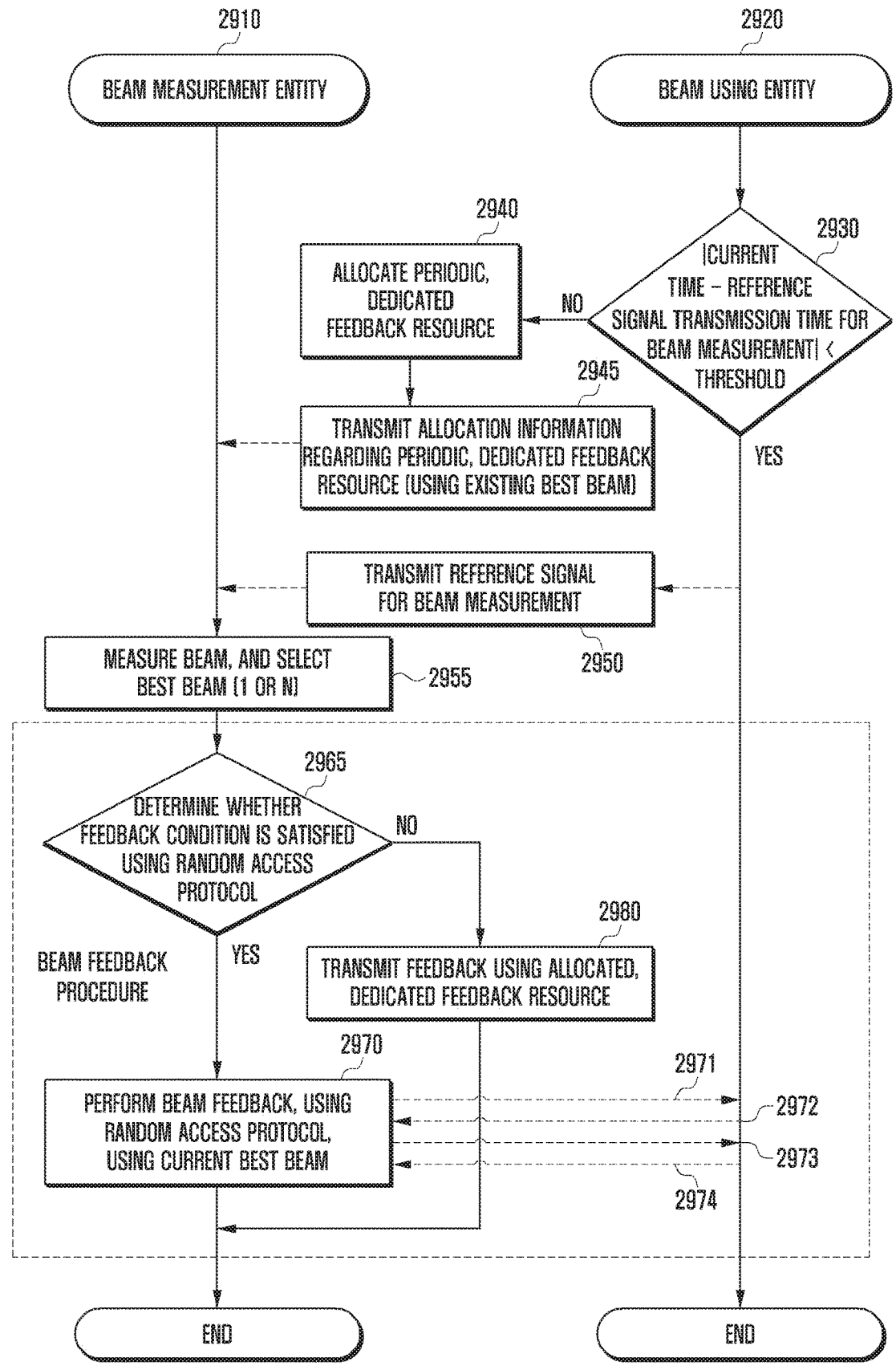
FIG. 29 is a flow diagram that describes a feedback method based on feedback resource allocation, using a time threshold according to an embodiment of the present disclosure.

FIG. 29 is a flow diagram that describes a feedback method based on feedback resource allocation, using a time threshold, according to an embodiment of the present disclosure.

Referring to FIG. 29, a beam measurement entity 2910 may be a UE, and a beam using entity 2920 may be an eNB. The beam using entity 2920 compares a difference between current time and reference signal transmission time for beam measurement with a threshold in operation 2930. When the difference is less than or equal to a threshold, the beam using entity 2920 does not allocate a feedback resource. When the difference is greater than the threshold, the beam using entity 2920 allocates feedback resource in operation 2940. It should be understood that the beam measurement and the periodic dedicated feedback resource allocation may be performed in any other order.

Operations 2940 to 2955 refer to the description regarding operations 2840 to 2855 shown in FIG. 28. The beam measurement entity 2910 is capable of determining whether a condition for transmitting feedback information is satisfied using a random access protocol in operation 2965. The condition of operation 2965 may be at least one of the conditions related to the UE's initiating feedback method as described above.

When the beam measurement entity 2910 ascertains that a condition for transmitting feedback information is not satisfied using a random access protocol in operation 2965, it transmits feedback information via an allocated dedicated feedback resource in operation 2980.

On the other hand, when the beam measurement entity 2910 ascertains that a condition for transmitting feedback information is satisfied using a random access protocol in operation 2965, it performs beam feedback in operation 2970. The beam feedback may be performed using a selected, current best beam. Operations 2970 to 2974 correspond to operations 2870 to 2874 shown in FIG. 28.

In an embodiment of the present disclosure, a UE may perform transmission within a specified time before performing beam measurement and before transmitting feedback, ignoring an allocated, dedicated feedback resource.

Figure 30:
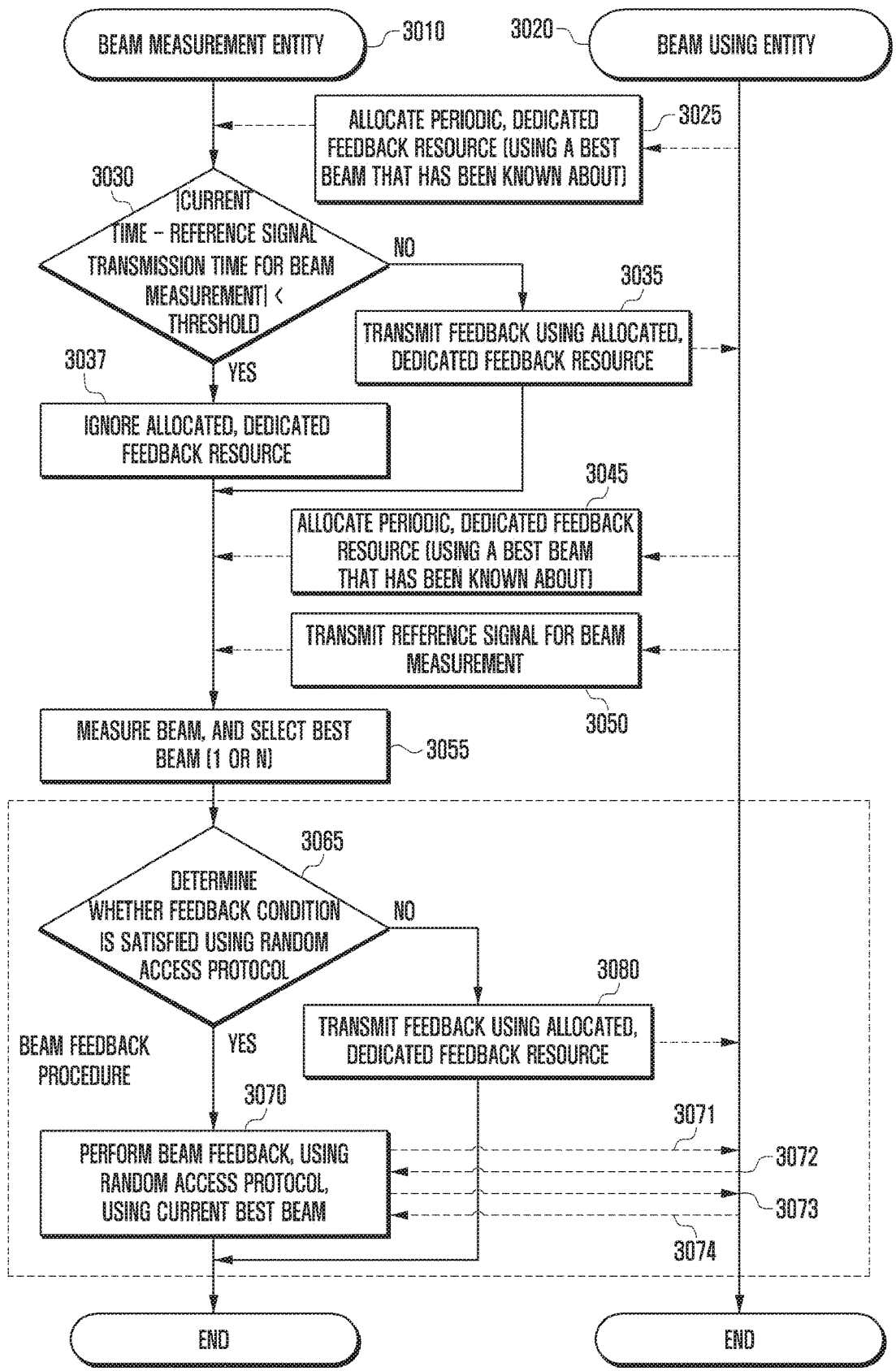
FIG. 30 is a flowchart that describes a method of transmitting feedback using random access or a dedicated feedback resource, based on a specified time according to an embodiment of the present disclosure.

FIG. 30 is a flowchart that describes a method of transmitting feedback using random access or a dedicated feedback resource, based on a specified time, according to an embodiment of the present disclosure.

Referring to FIG. 30, a beam measurement entity 3010 may be a UE, and a beam using entity 3020 may be an eNB.

The beam using entity 3020 is capable of allocating a resource for beam feedback in operation 3025. The resource for beam feedback may be a periodic dedicated feedback resource. The beam using entity 3020 is capable of allocating a resource using a best beam that it has known about.

The beam measurement entity 3010 compares a difference between current time and reference signal reception time for beam measurement with a threshold in operation 3030. When the difference is greater than or equal to a threshold, the beam measurement entity 3010 transmits feedback information via an allocated dedicated feedback resource in operation 3035. When the difference is less than the threshold, the beam measurement entity 3010 does not perform feedback, ignoring the allocated dedicated feedback resource in operation 3037. In this case, the beam measurement entity 3010 may perform beam feedback based on the procedure following operation 3045.

Operations 3045 to 3080 refer to the description regarding operations 2945 to 2980 shown in FIG. 29.

<Instruction Information for a Beam Change Transmitted by an eNB>

In order to change an eNB beam (or a UE beam) used to communicate with UE, a beam change instruction frame transmitted by an eNB needs to include ID information regarding a beam that the eNB and the UE needs to share, such as, an eNB beam ID, a UE beam ID, a beam pair ID, and the like.

Figure 31A:
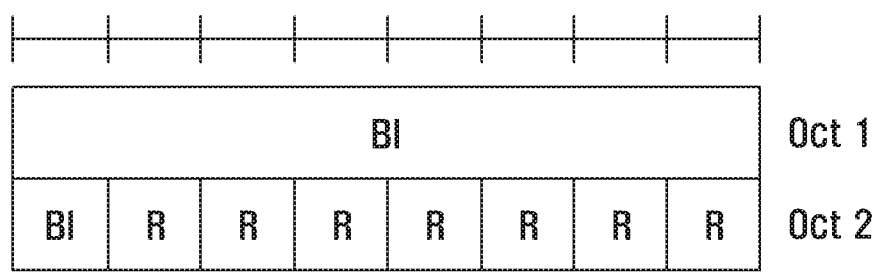

FIGS. 31A and 31B are diagrams showing frame structures for a beam change according to an embodiment of the present disclosure.

Referring to FIG. 31A, the structure of a frame (or MAC-CE, PHY DCI, MAC payload) including a beam ID of 9 bits is shown. For example, MAC CE may be beam change instruction MAC CE. PHY DCI may be instructed by xPDCCH order.

BI (9-bit): a field indicating a beam index

R: reserved bit, set to "0"

Referring to FIG. 31B, when an eNB specifies one of the serving beams of a UE and changes the selected beam to its desired beam, the structure of a frame (or MAC-CE, PHY DCI, MAC payload) including the desired beam ID of 9 bits is shown. For example, MAC CE may be beam change instruction MAC CE. PHY DCI may be instructed by xPDCCH order.

BI_old (9-bit): a field indicating a beam index that the UE has known about and which needs to be changed BI_new (9-bit): a field indicating a beam index to be newly used, instead of BI_old.

R: reserved bit, set to "0"

Figure 32A:
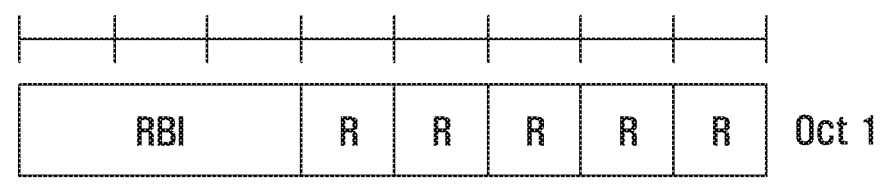
Figure 32B:
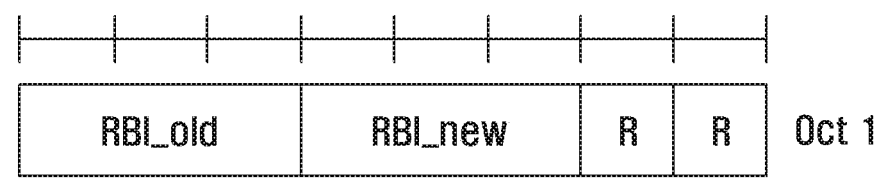

FIGS. 32A and 32B are diagrams showing frame structures for a beam change according to various embodiments of the present disclosure.

Referring to FIG. 32A, the structure of a frame (or MAC-CE, PHY DCI, MAC payload) including a beam ID of 3 bits is shown.

RBI (3-bit): this field indicates the beam index;

R: reserved bit, set to "0"

Referring to FIG. 32A, the structure of a frame (or MAC-CE, PHY DCI, MAC payload) including a beam ID of 3 bits is shown RBI_old (3-bit): a field indicating a beam index that the UE has known about and which needs to be changed RBI_new (3-bit): a field indicating a beam index to be newly used, instead of RBI_old.

R: reserved bit, set to "0"

In the following description, operations of an eNB are described, along with the operations of eNBs described in the previous embodiments.

<Beam Change Method>

In order to support a UE operating as in embodiments of the present disclosure and to perform beam change by an eNB, the beam change method is implemented as follows.

1. A Method for an eNB to Transmit a Specified Signal and Instruct to Change a Beam to Communicate with the UE An eNB changes a beam that it will communicate with specified UE, later, and provides the UE with corresponding information, via the operations described below.

Figure 33:
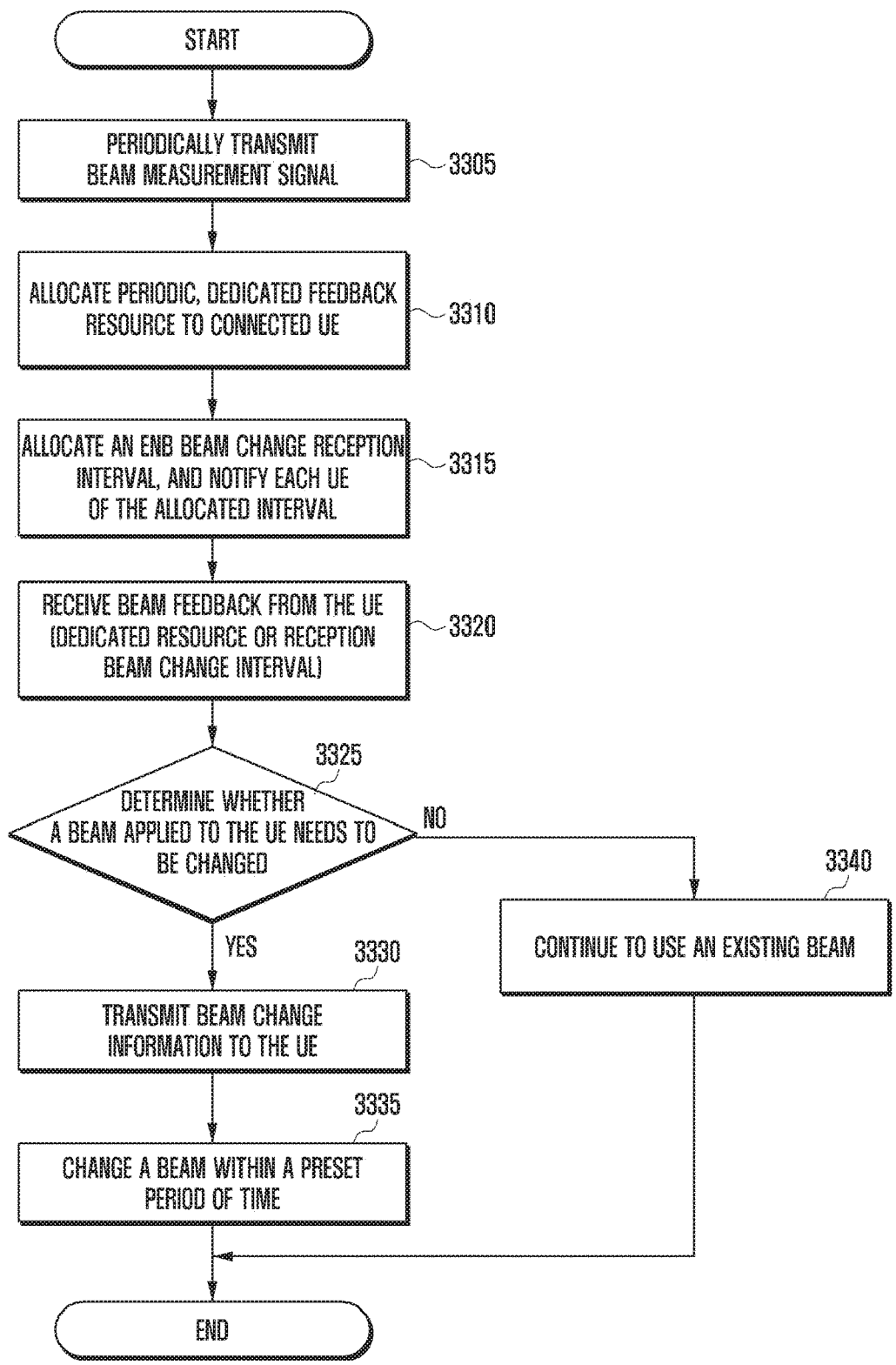
FIG. 33 is a flowchart that describes a beam change method of an eNB according to an embodiment of the present disclosure.

FIG. 33 is a flowchart that describes a beam change method of an eNB according to an embodiment of the present disclosure.

Referring to FIG. 33, an eNB is capable of transmitting a beam measurement signal in operation 3305. The eNB may periodically transmit a beam measurement signal. The eNB is capable of allocating a beam feedback resource to the connected UE in operation 3310. The beam feedback resource may be a periodic dedicated feedback resource.

The eNB is capable of allocating an eNB beam change reception interval and notifying each UE of the allocated interval in operation 3315.

The eNB receives beam feedback from the UE in operation 3320. The eNB may receive beam feedback from the UE, via its allocated, dedicated resource or in a reception beam change interval. The eNB may receive feedback from each UE, via a periodic dedicated feedback resource or in a reception beam change reception interval. In an embodiment of the present disclosure, the eNB may receive beam feedback from the UE, via any resource/interval.

The eNB is capable of determining whether a beam applied to the UE needs to be changed in operation 3325. When the eNB ascertains that a beam applied to the UE does not need to be changed in operation 3325, it continues to use an existing beam in operation 3340. For example, when the eNB receives corresponding beam feedback that does not request a change of an existing beam used by the UE or ascertains that beam change does not need to be changed based on an analysis result of corresponding feedback information, it continues to use an existing beam.

On the other hand, when the eNB ascertains that a beam applied to the UE needs to be changed in operation 3325, it transmits a beam change request message to the UE in operation 3330. For example, when the eNB receives corresponding beam feedback containing a beam change request or ascertains that beam change needs to be changed based on an analysis result of corresponding feedback information, it determines to change a serving beam to a corresponding beam and transmits a beam change request message to UE. The eNB changes a serving beam to a corresponding beam at a preset or arranged time in operation 3335.

The eNB may need to transmit the beam change signal within a certain period of time (e.g., Timer_feedback_change) since it received specified information (e.g., uplink beam feedback information).

The eNB may inform the UE that it will transmit the beam change signal to the UE within a certain period of time after the reception of specified information, via an RRC message (RRC IE), MAC message (MAC-CE), and PHY message (PHY DCI). In this case, since a corresponding value is described in the standard, it may be a value that the UE or an eNB has known about since when it is implemented.

The beam change signal may be implemented or standardized so that an eNB can transmit it at any timing.

1. 1. Method for an eNB to Determine Whether Beam Change is Needed

A method of determining whether beam change is needed is performed as follows.

A. The channel quality or performance of a serving beam (scheduling beam) is less than a specified threshold a1. A current beam measurement value < a threshold a2. The measurement value may be RSRP, RSRQ, SNR, SINR, CQI, BER, FER, PER, BLER, and the like. The measurement value may also be any value if it can be used to determine the channel quality.

B. The channel quality or performance of any other beam, except for a serving beam (scheduling beam), is greater than or equal to a specified threshold b1. A new beam measurement value > a threshold b2. The measurement value may be RSRP, RSRQ, SNR, SINR, CQI, BER, FER, PER, BLER, and the like. The measurement value may also be any value if it can be used to determine the channel quality.

C. The channel quality or performance of another beam is greater than or equal to a specified threshold/offset, compared with a serving beam c1. A new beam measurement value>current beam measurement value+threshold c2. The measurement value may be RSRP, RSRQ, SNR, SINR, CQI, BER, FER, PER, BLER, and the like. The measurement value may also be any value if it can be used to determine the channel quality.

D. The channel quality or performance of a serving beam (scheduling beam) is less than a specified threshold, and the channel quality or performance of any other beam, except for the serving beam (scheduling beam), is greater than or equal to the specified threshold d1. (A current beam measurement value<Threshold_out) & (a new beam measurement value>Threshold_in)

d2. The measurement value may be RSRP, RSRQ, SNR, SINR, CQI, BER, FER, PER, BLER, and the like. The measurement value may also be any value if it can be used to determine the channel quality.

The threshold may be: a constant, or a fixed value according to the standard, a value that an eNB sets using an RRC message, MAC-CE, PHY DCI, and the like, or a value selected by the UE.

E. Timer (e.g., Feedback Timer) has expired e1. Uplink beam feedback is not received during a corresponding timer's time, or e2. Uplink resource allocation is not transmitted (performed) during a corresponding timer's time, or e3. Uplink transmission is not received (performed) successfully during a corresponding timer's time, and the like.

F. A serving beam (i.e., an eNB beam, a UE beam, or a beam pair), derived from the beam measurement, is not included within the top K (or K % from the top) in the ranking of the entire beam (i.e., an eNB beam, a UE beam, or a beam pair) reported by the UE.

G. A serving beam (i.e., an eNB beam, a UE beam, or a beam pair), derived from the beam measurement, is included within the bottom K (or K % from the bottom) in the ranking of the entire beam (i.e., an eNB beam, a UE a beam, or beam pair) reported by the UE.

H. After information (MAC PDU, MAC-CE, Data, PHY packet, and the like, . . . ) requesting a response from the UE is transmitted, the response (HARQ ACK, RLC ACK, Feedback ACK, and the like) is not received until a period of time (timer) has elapsed.

h1. The corresponding response request information may be a bit (indicator) that exists at a specified location in a MAC message or a preset PHY.

h2. The corresponding response request information may be a preset sequence.

h3. A corresponding response needs to be received within a preset period of time after eNB information is transmitted.

1. 2. Method for an eNB to Change a Beam

The eNB/UE is capable of using a new beam contained in a beam change request signal from a corresponding beam change time. A method of changing a beam and the beam change timing point (time) are explained as follows.

The beam change time may have a value as an absolute time, e.g., a subframe number, a slot number, a GPS time, a radio frame number, and the like.

The beam change time may have a value as a relative time after a specified time (e.g., a subframe number, a slot number, a GPS time, a radio frame number, and the like) has elapsed from a transmission/reception time of a beam change request signal, a transmission/reception time of ARQ ACK (last) in response to a beam change request signal, or a transmission/reception time of HARQ ACK (last) in response to a beam change request signal.

The beam change time may be specified in a beam change request signal, and may be transmitted/received via the signal, configured by an eNB to another signal (e.g., RRC IE, MAC-CE, PHY DCI, and the like) according to individual UEs, or specified as a particular numeral (offset) in the standard. Alternatively, an eNB may include the beam change time in Broadcasting Info. (MIB, SIB, and the like), and notify it via the Broadcasting Info. message.

<Beam Information Feedback and Beam Change Method Using RACH Procedure>

In order to use the beam information feedback and beam change method, various embodiments implemented by applying an RACH procedure of LTE are provided as follows.

An RACH procedure proposed by applying an existing RACH procedure is considered by numbering messages as follows.

Message 1 (MSG1): a UE transmits a random access preamble via an RACH channel

Message 2 (MSG2): an eNB transmits a random access response via a PDCCH channel

Message 3 (MSG3): a UE transmits a Buffer Status Report (BSR), uplink information, or beam feedback information, via a PUSCH channel.

Message 4 (MSG4): an eNB transmits contention resolution via a PDCCH channel

The embodiment may be applied to an RACH procedure where a UE performs initial cell access, cell access after RLF occurred, access in a target cell during handover, beam recovery when determining beam misalignment, cell access in an idle mode due to paging reception or uplink data creation, and the like.

For example, when a UE performs initial cell access, an RACH procedure is described as follows.

When the UE obtains downlink synchronization from an eNB and selects a beam (whose signal quality is greater than or equal to that of a best beam or a threshold) through which it can communicate with an eNB, it transmits an RACH preamble using a resource corresponding to the beam. It should be understood that the UE may also include the beam information in a corresponding RACH preamble or a resource right after the RACH preamble, and transmit it via uplink. The UE receives, from the eNB, an acknowledgement message (i.e., a RAR message) in response to the RACH preamble, and determines whether the RAR message contains beam feedback instruction information. When the RAR message contains beam feedback instruction information, the UE transmits feedback in response to the beam of the eNB according to the beam feedback instruction information. The beam feedback instruction information includes at least one of the following: the number of beams for feeding back an intensity level of signal, a resource for transmitting beam feedback, a transmission timing of beam feedback, a format of beam feedback (L1 signal including UCI or a higher layer message including MAC CE), a format of indicator instructing to change an existing beam to a beam reporting beam feedback (the UE changes an existing beam to the reported beam, voluntarily or after receiving a beam change indicator signal from an eNB), and timing information when an existing beam is changed to a beam reporting beam feedback. In an embodiment of the present disclosure, allocation information regarding a resource to transmit beam feedback may be received with being multiplexed with MSG4 or after MSG4.

In order to support beam feedback of a UE via the MSG3, each eNB needs to allocate an amount of resource so that the UE receiving an RA preamble can perform at least beam feedback transmission, and to transmit scheduling information via RAR. When MSG3 defines contention-based RACH transmitting beam feedback according to the standard, all eNBs need to allocate an amount of resource so that the UE performing contention-based RACH can perform at least beam feedback transmission, and to transmit scheduling information via RAR.

The MSG4 may be transmitted, containing a Beam Change Indication message for beam change.

An eNB and UE, performed transmission/reception of beam feedback according to beam feedback instruction information via the RAR message, may change a beam according to beam feedback information the UE or may perform a procedure after the transmission/reception of beam feedback, while maintaining the current beam.

After receiving the RAR message, the UE transmits a beam feedback message/signal along with MSG3, according to the beam feedback instruction. Alternatively, after receiving the RAR message, the UE transmits MSG3, and then beam feedback message/signal, according to the beam feedback instruction information. Alternatively, after receiving the RAR message, the UE transmits a beam feedback message/signal before transmitting MSG3, according to the beam feedback instruction information. The expression, 'after the MSG3 transmission,' is referred to as an interval between an MSG3 transmission timing and an MSG4 reception timing, using a separate resource and the MSG3. The expression, 'after the MSG3 transmission,' corresponds to a timing after the MSG3 transmission and the MSG4 reception, using a separate resource and the MSG3. The expression, 'after the MSG3 transmission,' corresponds to a timing after the MSG3 transmission or before the MSG4 reception, using a separate resource and the MSG3.

When the UE is set to voluntarily change an existing beam to a reported beam according to the beam feedback instruction information, the UE changes an existing beam to the reported beam at the beam change timing and then communicates with the eNB.

When the UE is set to receive a beam change indicator signal from an eNB and perform beam change according to the beam feedback instruction information, the UE receives a beam change indicator signal from an eNB, changes an existing beam to a beam instructed by the beam change indicator signal, and then communicates with the eNB. The beam change timing information may be set to a system value or may be received from the eNB.

The beam change indicator signal corresponds to a signal transmitted via the MSG4, an L1/higher layer signal transmitted along with the MSG4, or a signal transmitted separately from the MSG4. When the beam change indicator signal corresponds to a signal transmitted separately from the MSG4, the transmission timing of the beam change indicator signal corresponds to an interval between the MSG 3 transmission timing and the MSG 4 reception timing. When the beam change indicator signal corresponds to a signal transmitted separately from the MSG4, the transmission timing of the beam change indicator signal corresponds to a timing before the MSG3 transmission. When the beam change indicator signal corresponds to a signal transmitted separately from the MSG4, the transmission timing of the beam change indicator signal corresponds to a timing after the MSG4 reception.

When the RAR message does not contain the beam feedback instruction information, the UE may transmit beam feedback via MSG3 transmitted in response to the RAR message. When beam feedback is transmitted via the MSG3, the eNB may transmit a beam change indicator via MSG4 or a separate signaling operation.

In the following description, various embodiments are described with reference to the drawings.

Figure 34:
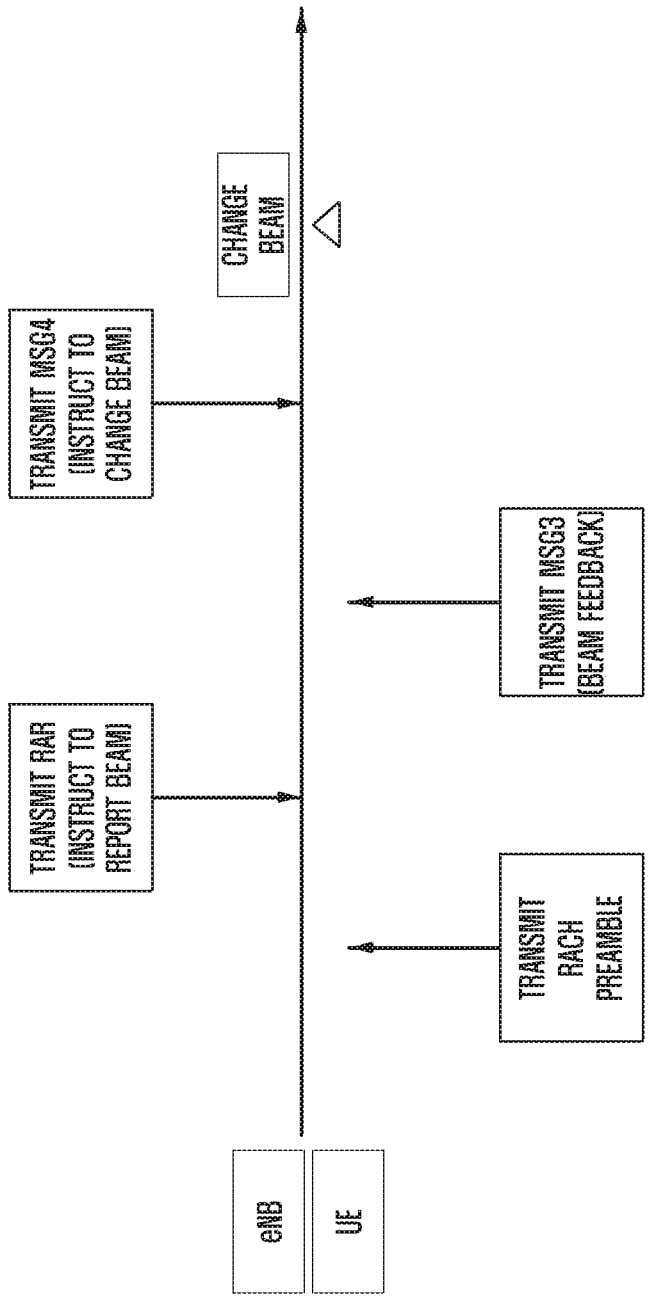
FIG. 34 is a diagram that describes a beam feedback method according to an embodiment of the present disclosure.

FIG. 34 is a diagram that describes a beam feedback method according to an embodiment of the present disclosure.

Referring to FIG. 34, beam feedback is contained in MSG3 or multiplexed with MSG3. A beam change indicator is contained in MSG4 or multiplexed with MSG4.

The UE performs the transmission of a random access preamble. The UE may perform the transmission of a random access preamble using a beam to be changed. An eNB transmits a random access response based on the random access preamble. The random access response may contain information instructing to request the report of beam feedback. The UE receives the random access response and performs the transmission of MSG3. In this case, the UE transmits, to the eNB, MSG3 containing beam feedback or MSG3 multiplexed with beam feedback. The eNB receives the MSG3 and transmits MSG4 to the UE. MSG4 may contain a beam change indication. MSG4 is multiplexed and transmitted with a beam change indication. After the transmission of MSG4, a beam may be changed. Beam change may be performed after a period of time has elapsed from the MSG4 transmission.

Figure 35:
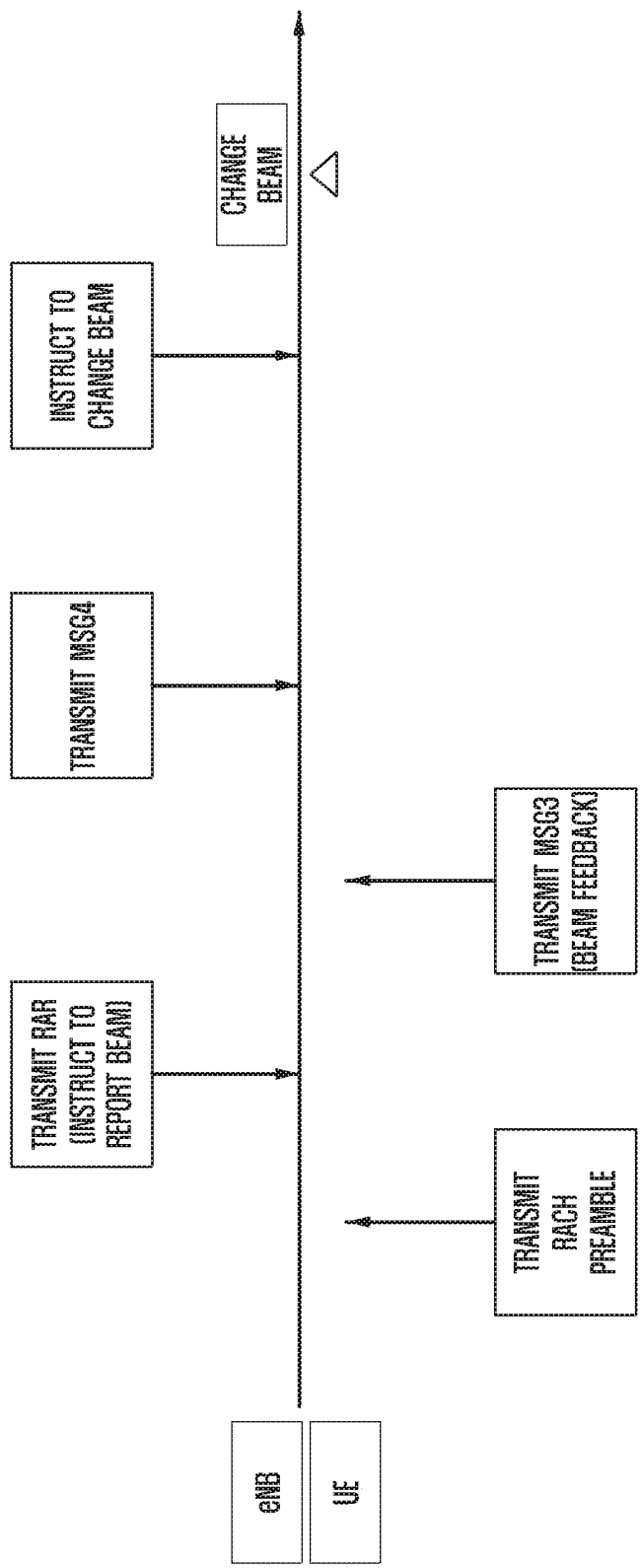
FIGS. 35 to 49 are diagrams that describe a beam feedback method according to various embodiments of the present disclosure.

FIG. 35 is a diagram that describes a beam feedback method according to an embodiment of the present disclosure.

Referring to FIG. 35, the procedure from the transmission of a random access preamble to the transmission of MSG3 refers to the description referring to FIG. 34. After MSG3 reception, the eNB performs the transmission of MSG4. The part of the embodiment shown in FIG. 35, which differs from that of the embodiment shown in FIG. 34, is that the beam change instruction is transmitted after MSG4 is transmitted. The eNB transmits MSG4, and then transmits a beam change instruction. After the transmission of the beam change instruction, a beam may be changed.

Figure 36:
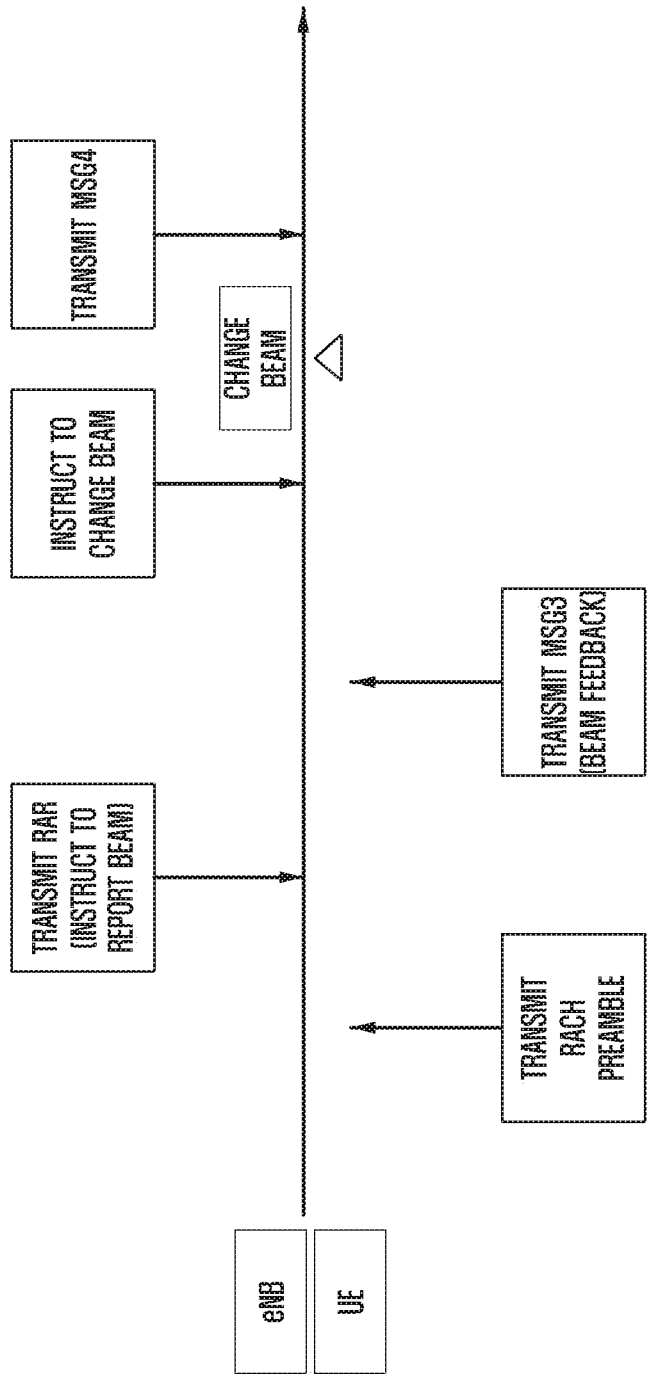

FIG. 36 is a diagram that describes a beam feedback method according to an embodiment of the present disclosure.

Referring to FIG. 36, the embodiment of FIG. 36 is similar to that of FIG. 35, except that they have different transmission timing points of a beam change instruction, respectively. After the transmission of MSG3, the eNB transmits a beam change instruction to the UE before transmitting MSG 4. After the transmission of a beam change instruction, a beam is changed. The eNB performs the transmission of MSG4 using the changed beam.

Figure 37:
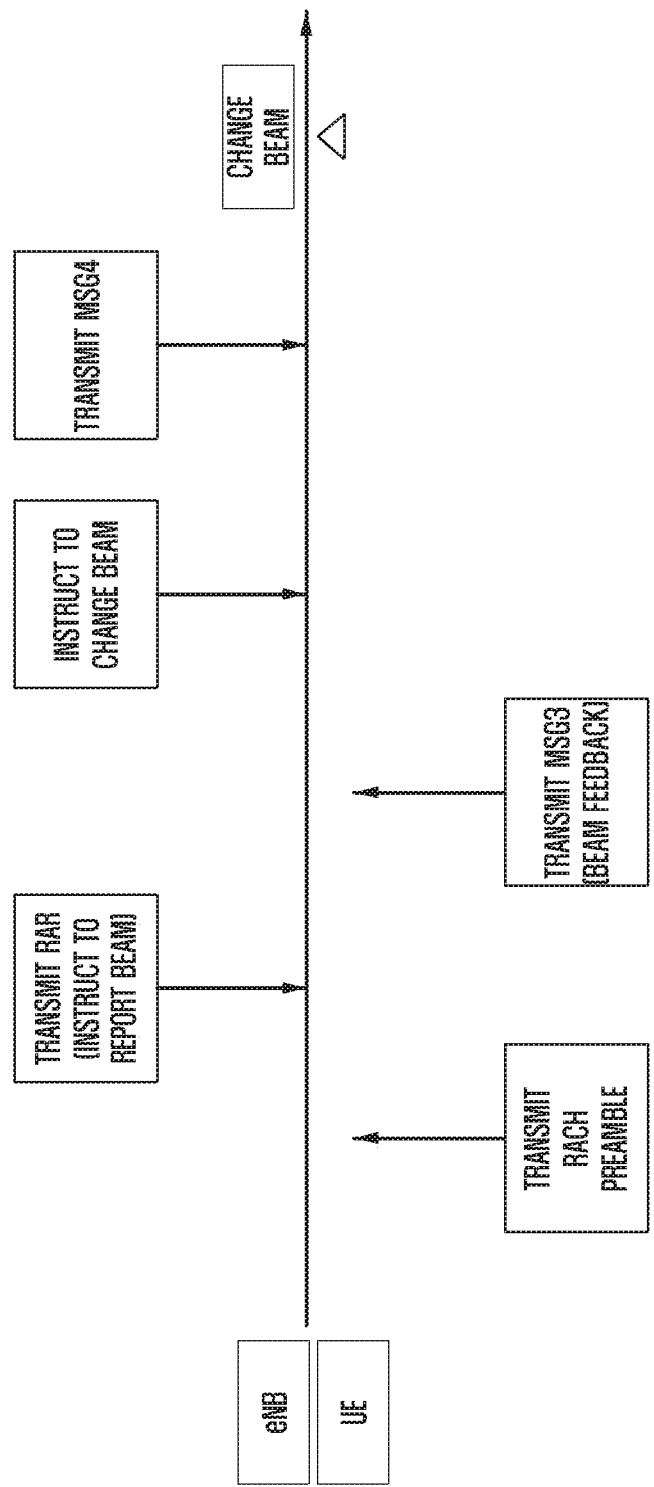

FIG. 37 is a diagram that describes a beam feedback method according to an embodiment of the present disclosure.

Referring to FIG. 37, the embodiment of FIG. 37 is similar to that of FIG. 36, except that they have different beam change timing points, respectively. After the eNB performs the transmission of a beam change instruction and MSG4, a beam is changed.

Figure 38:
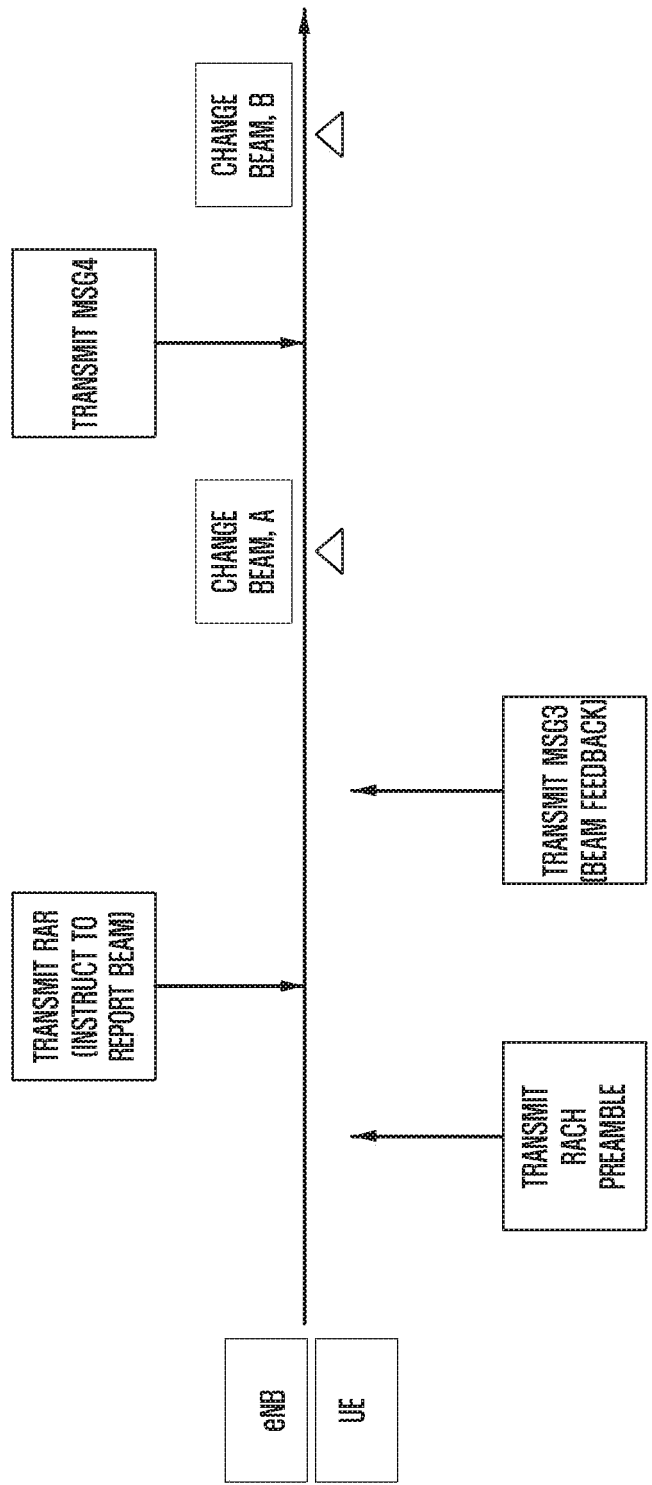

FIG. 38 is a diagram that describes a beam feedback method according to an embodiment of the present disclosure.

Referring to FIG. 38, the embodiment of FIG. 38 is similar to that of FIG. 36 or FIG. 37, but does not explicitly perform the transmission of a beam change instruction. The embodiment shown in FIG. 37 does not perform a separate beam change signaling operation (does not have an implicit beam change instruction). After the eNB performs the reception of MSG3 or the transmission of MSG4, a beam is changed.

Figure 39:
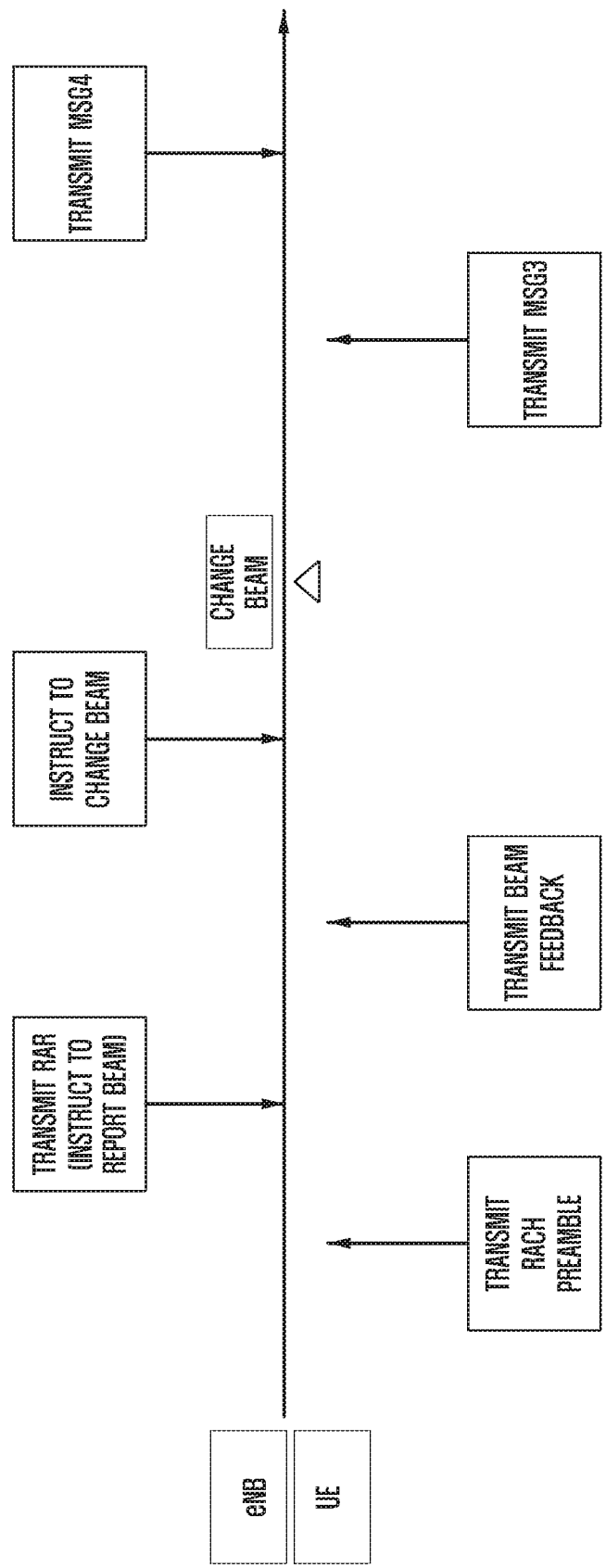

FIG. 39 is a diagram that describes a beam feedback method according to an embodiment of the present disclosure.

Referring to FIG. 39, the embodiment of FIG. 39 has a transmission timing point of a beam change instruction and a beam change timing point which differ from those of the embodiments shown in FIGS. 36 and 37. The MSG3 contains beam feedback. The MSG3 is not multiplexed with beam feedback. A beam is fed back via a separate procedure. After receiving a random access response, the UE performs the transmission of beam feedback information before transmitting MSG3. An eNB receives beam feedback and instructs to perform beam change. After instructing beam change, a beam is changed. After the beam change, the UE performs the transmission of MSG3, and the eNB performs the transmission of MSG4. MSG3 and MSG4 may be transmitted via the changed beam.

Figure 40:
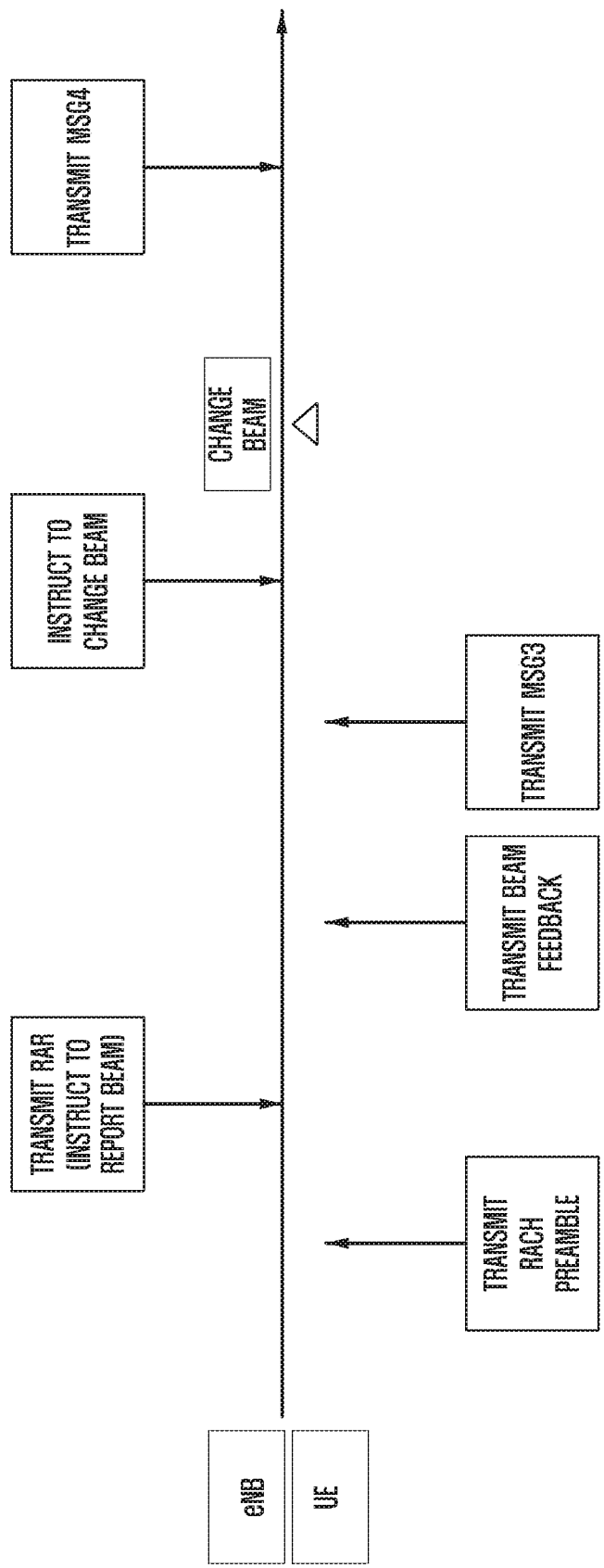

FIG. 40 is a diagram that describes a beam feedback method according to an embodiment of the present disclosure.

Referring to FIG. 40, the embodiment of FIG. 40 differs from that of FIG. 39, in that transmission timing points of MSG3 differ from each other. After the transmission of beam feedback, the UE performs the transmission of MSG3. After the transmission of MSG3, the eNB performs the transmission of a beam change instruction. After instructing beam change, a beam is changed. MSG4 may be transmitted via the changed beam.

Figure 41:
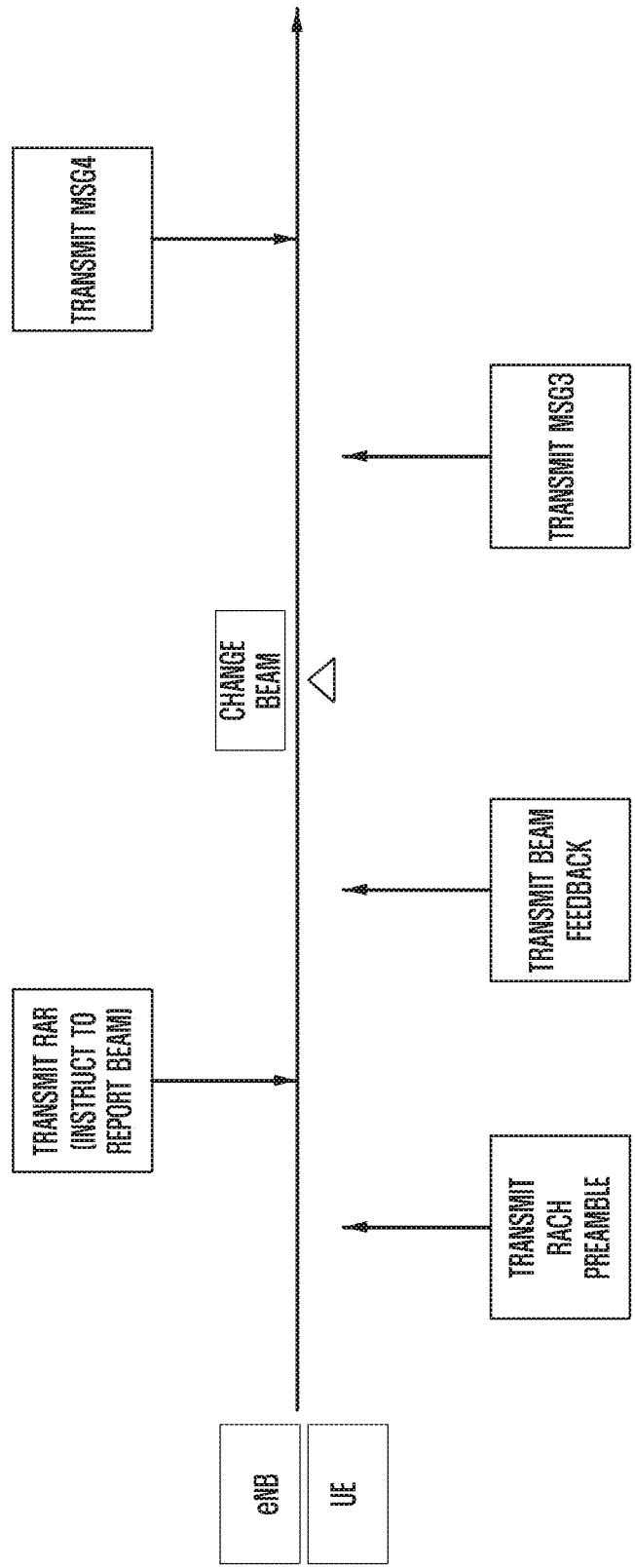

FIG. 41 is a diagram that describes a beam feedback method according to an embodiment of the present disclosure.

Referring to FIG. 41, the embodiment of FIG. 41 does not perform the transmission of a separate beam change indicator, compared with the embodiment of FIG. 39. After the reception of beam feedback, the eNB does not perform the transmission of a separate beam change instruction. However, a beam is changed after a period of time has elapsed since the beam feedback.

Figure 42:
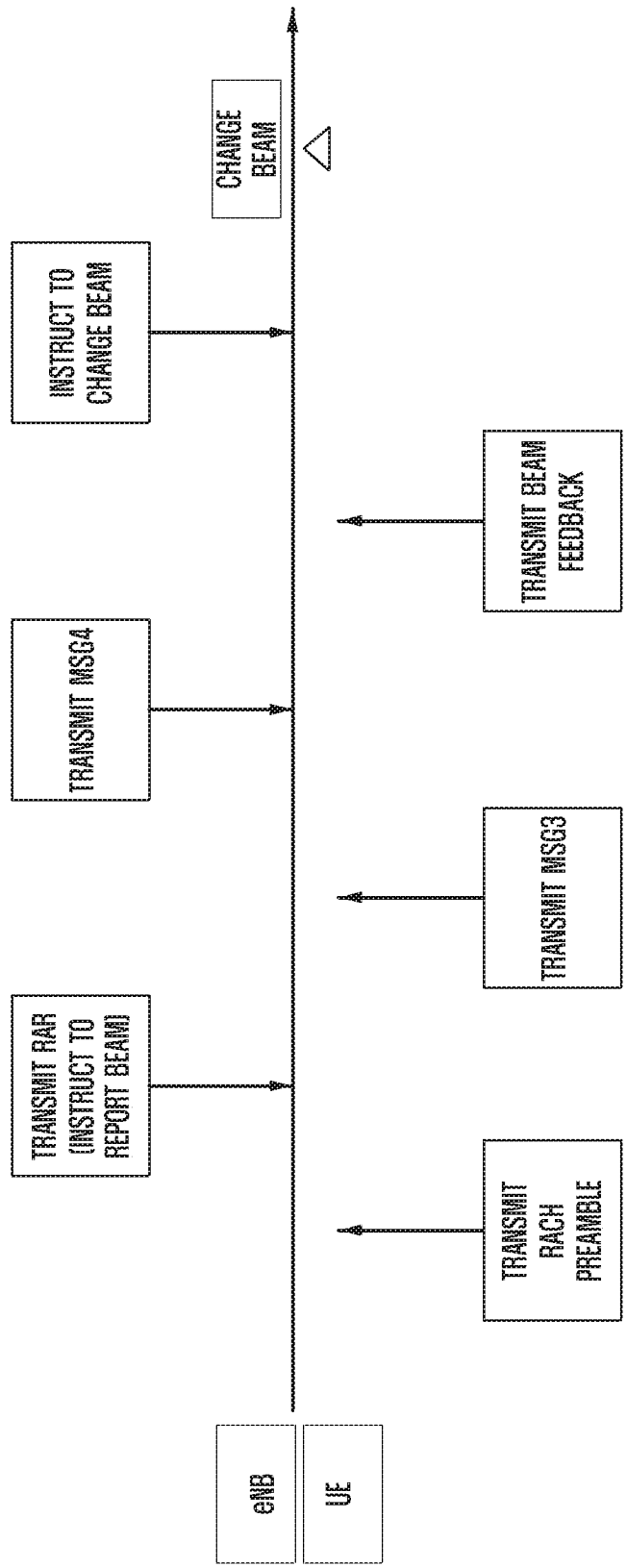

FIG. 42 is a diagram that describes a beam feedback method according to an embodiment of the present disclosure.

Referring to FIG. 42, the embodiments of FIGS. 42 and 39 differ from each other, in that they have different transmission timing pints of beam feedback and different transmission timing points of a beam change instruction, respectively. After the transmission/reception of MSG1~MSG4, the UE performs the transmission of beam feedback. Thereafter, the eNB performs the transmission of a beam change instruction. After the transmission of a beam change instruction, a beam is changed.

Figure 43:
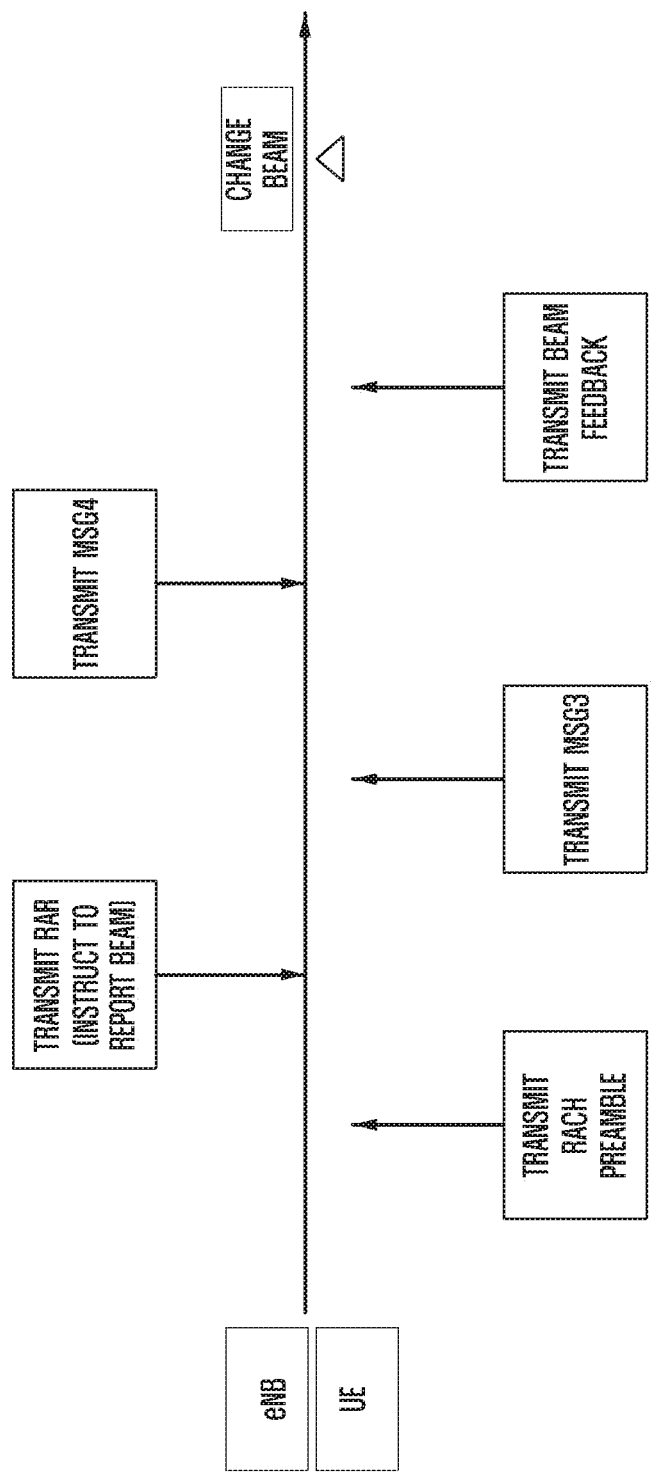

FIG. 43 is a diagram that describes a beam feedback method according to an embodiment of the present disclosure.

Referring to FIG. 43, the embodiment of FIG. 43 differs from that of FIG. 42, in that it does not include a procedure for transmitting a separate beam change instruction. The beam change instruction may be implicitly performed. The beam feedback transmission resource information may be instructed during the RAR transmission or the MSG4 transmission. The beam feedback transmission resource information may be instructed separately after the transmission of MSG4.

Figure 44:
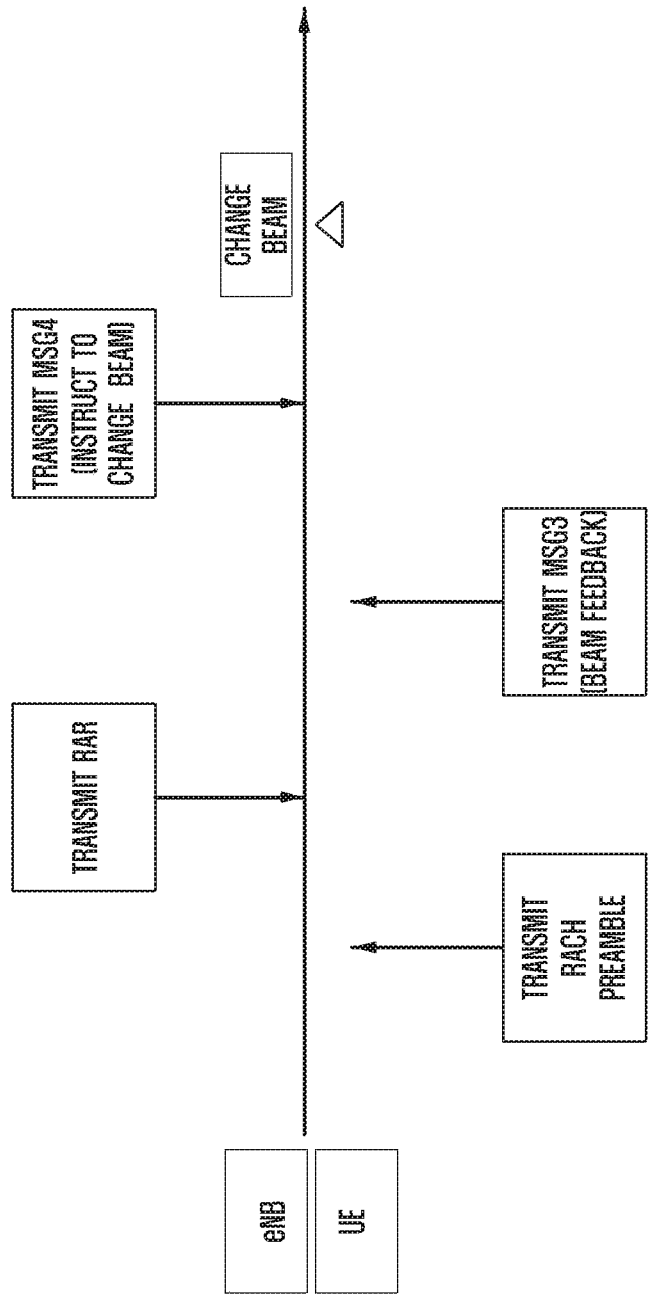

FIG. 44 is a diagram that describes a beam feedback method according to an embodiment of the present disclosure.

Referring to FIG. 44, the embodiment of FIG. 44 differs from that of FIG. 43, in that a beam report instruction is not contained in an RAR. When an RAR message does not contain beam feedback instruction information, beam change may be performed, via MSG3 and MSG4, after the transmission/reception of beam feedback and a beam change instruction, respectively. MSG4 may contain an explicit beam change indication. Alternatively, MSG4 and an explicit beam change instruction signal may be multiplexed with each other.

In the case of the RACH procedure performing handover to a target cell, a UE and an eNB perform the transmission/reception of an RAR message containing the beam report instruction information without performing the transmission/reception of MSG3 or MSG4, and perform the transmission/reception of beam feedback and a beam change signal by a separate signaling process after transmitting/receiving the RAR message. In this case, the beam report instruction information may contain at least one of the following: allocation information regarding a resource for a beam feedback signal, a condition as to whether an implicit/explicit beam change signal is transmitted, and allocation information regarding a resource for a beam change signal.

Figure 45:
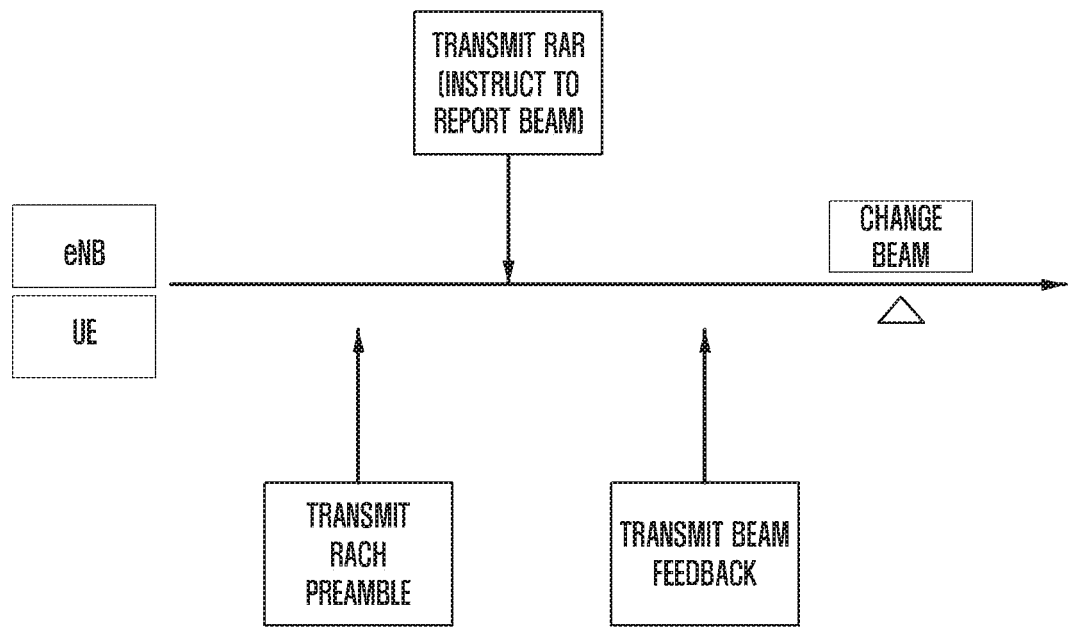

FIG. 45 is a diagram that describes a beam feedback method according to an embodiment of the present disclosure.

Referring to FIG. 45, then handover is performed, beam feedback may be transmitted after the transmission/reception of an RAR containing beam report instruction information. Beam change may be performed based on an implicit beam change indicator.

Figure 46:
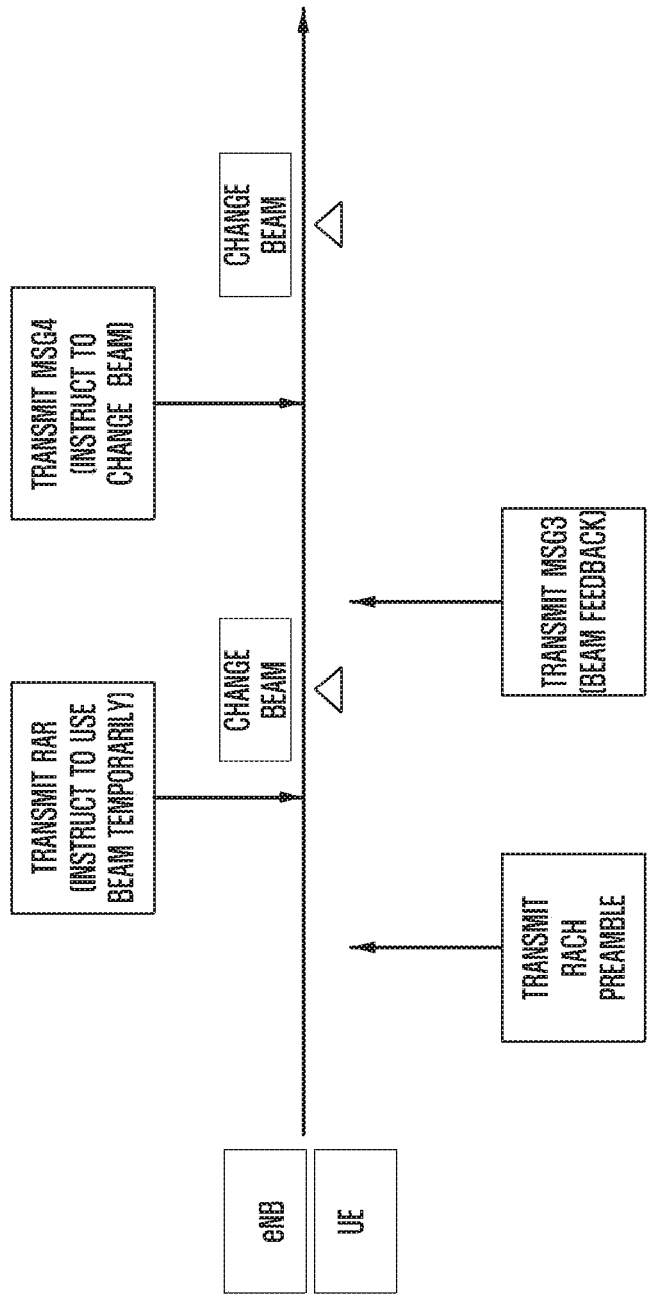

FIG. 46 is a diagram that describes a beam feedback method according to an embodiment of the present disclosure.

Referring to FIG. 46, an eNB may allocate a resource by temporarily using a beam receiving an RACH preamble via an RAR. In this case, when the eNB receives one RACH preamble, it performs resource allocation for one beam. When the eNB receives two or more RACH preambles transmitted from the same UE, it may transmit an RAR using the best one of the received preambles. Beam feedback may be contained in MSG3 or may be multiplexed with MSG3. A beam change instruction may be contained in MSG4 or may be multiplexed with MSG4.

Figure 47:
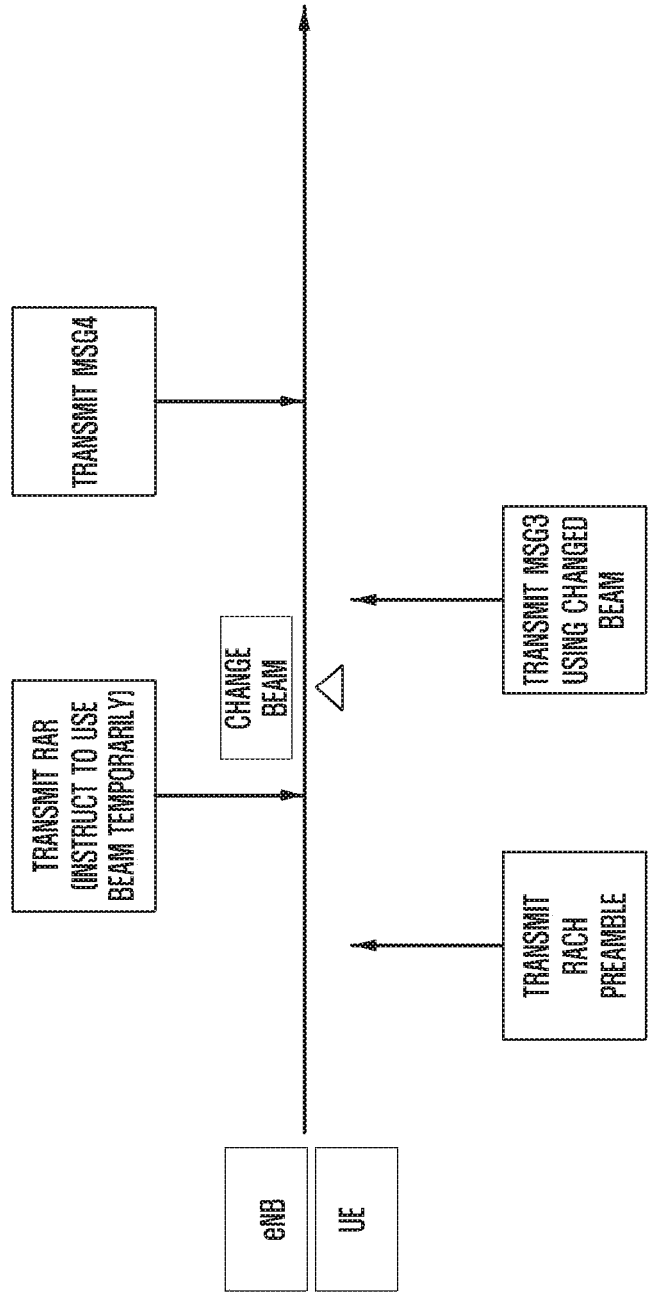

FIG. 47 is a diagram that describes a beam feedback method according to an embodiment of the present disclosure.

Referring to FIG. 47, an eNB may instruct to perform beam change in order to use a best beam receiving an RACH preamble via an RAR as a serving beam. In this case, when the eNB receives one RACH preamble, it performs resource allocation for one beam. When the eNB receives two or more RACH preambles transmitted from the same UE, it may transmit an RAR using the best one of the received preambles. The eNB and the UE change an existing beam to a corresponding beam, and then perform the transmission of MSG3 and MSG4.

Figure 48:
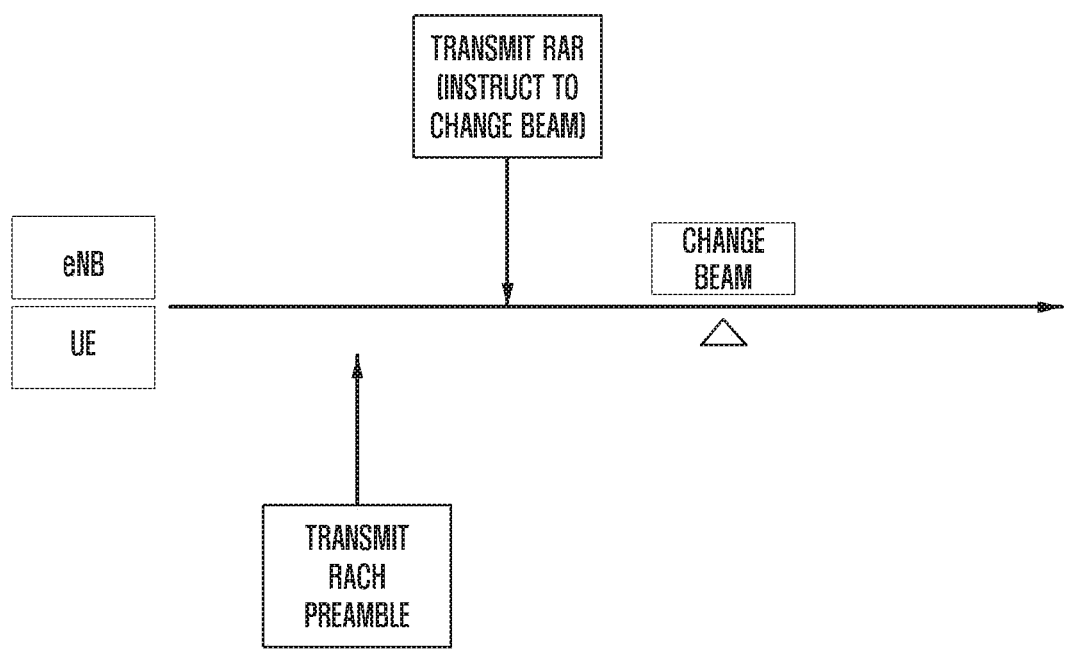

FIG. 48 is a diagram that describes a beam feedback method according to an embodiment of the present disclosure.

Referring to FIG. 48, after the transmission/reception of an RAR containing a beam change indication, a beam may be changed. The beam change is performed based on an explicit beam change indicator. A corresponding beam change instruction may be transmitted, separately from an RAR.

The beam change instruction may be contained in the message in a form of MAC-CE, or may be multiplexed in a form of field in a DCI.

In the case of the RACH procedure performing handover to a target cell, a UE and an eNB perform the transmission/reception of an RAR message and a beam change instruction message without performing the transmission/reception of MSG3 or MSG4, and change a serving beam to a corresponding beam. In this case, the beam report instruction information may contain at least one of the following: allocation information regarding a resource for a beam feedback signal, a condition as to whether an implicit/explicit beam change signal is transmitted, and allocation information regarding a resource for a beam change signal.

Figure 49:
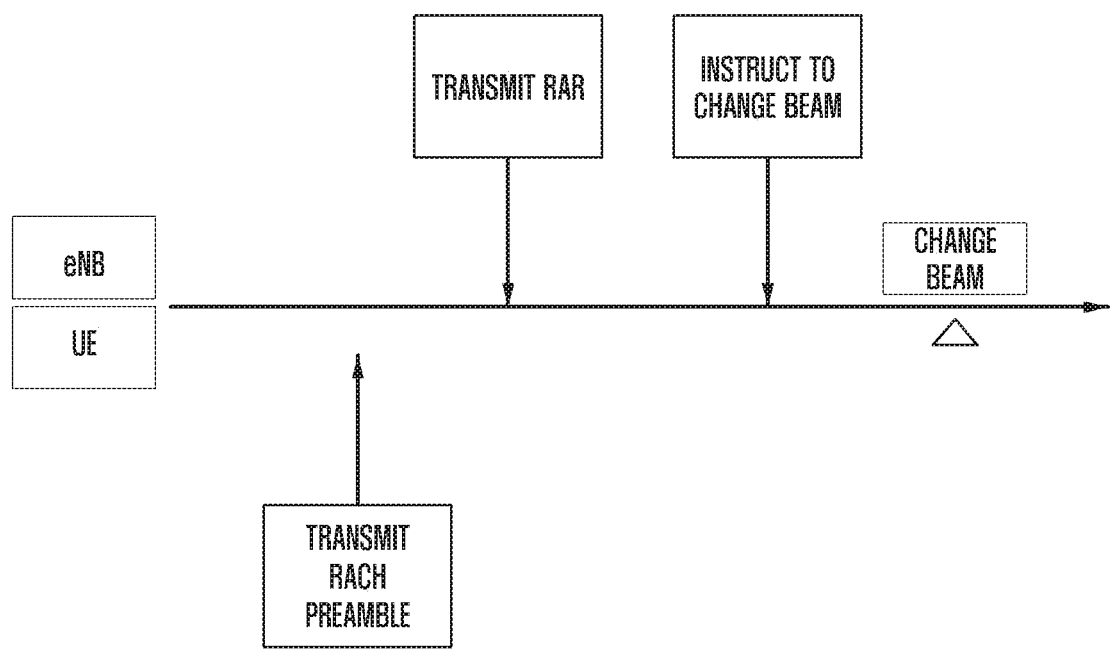

FIG. 49 is a diagram that describes a beam feedback method according to an embodiment of the present disclosure.

Referring to FIG. 49, after the transmission/reception of an RAR containing a beam change indication, a beam may be changed. The beam change is performed based on an explicit beam change indicator. A corresponding beam change instruction may be transmitted, separately from an RAR.

In embodiments of the present disclosure described above, an RACH preamble may be replaced with an SR request signal (or SR request preamble) of UE, the RAR transmission may be replaced with the UL Grant transmission of an eNB, MSG3 may be replaced with a message which is transmitted using a resource that an eNB allocated as UL grant for SR transmission, and MSG4 may be replaced with a message of an eNB in response to a message that the UE transmitted via a resource that an eNB allocated as UL grant for SR transmission.

In embodiments of the present disclosure described above, the RACH-related transmission may also be part of the Dedicated RACH.

Figure 50:
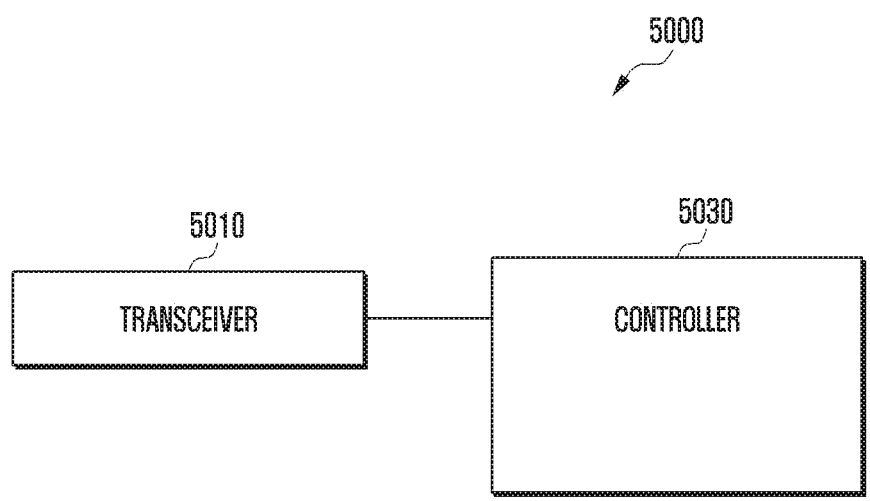
FIG. 50 is a block diagram of a UE according to an embodiment of the present disclosure.

FIG. 50 is a block diagram of a UE according to an embodiment of the present disclosure.

Referring to FIG. 50, a UE 5000 is capable of including a transceiver 5010 for performing the transmission/reception of signals, and a controller 5030. The UE 5000 is capable of performing the transmission/reception of signals, information, messages, and the like, via the transceiver 5010. The controller 5030 is capable of controlling all the operations of the UE 5000. The controller 5030 is capable of including at least one processor. The controller 5030 is capable of controlling operations of the UE described above in embodiments of the present disclosure.

The controller 5030 is capable of receiving a beam feedback trigger condition and determining whether it satisfies the beam feedback trigger condition. When the beam feedback trigger condition is satisfied, the controller 5030 is capable of triggering beam feedback from a MAC layer of the UE, and controlling the transmission of a MAC CE containing beam feedback information, based on the beam feedback trigger. The beam feedback trigger condition may include a condition that a channel measurement value of at least one beam is greater than a sum of a preset threshold and a channel measurement value of a serving beam.

When uplink of the UE is synchronized, the controller 5030 is capable of performing control operations so that the beam feedback information can be transmitted, using an uplink allocated resource received via a SR procedure. In order to transmit an SR and perform beam feedback based on the SR transmission, the UE is capable of receiving information regarding an allocated resource. Resource allocation may be performed periodically or aperiodically.

When uplink of the UE is not synchronized, the controller 5030 is capable of performing control operations so that the beam feedback information can be transmitted via a random access protocol. When beam feedback is triggered, the controller 5030 transmits a random access preamble, receives a random access acknowledgement in response to the transmission of the random access preamble, transmits the beam feedback information based on the received random access acknowledgement, and receives a random access contention result in response to the transmitted, beam feedback information. A message transmitting beam feedback information may be MSG3 in the random access protocol.

The controller 5030 receives a beam change indication. After receiving the beam change indication, the controller 5030 performs beam change, based on the beam feedback information, after a preset period of time has elapsed.

Figure 51:
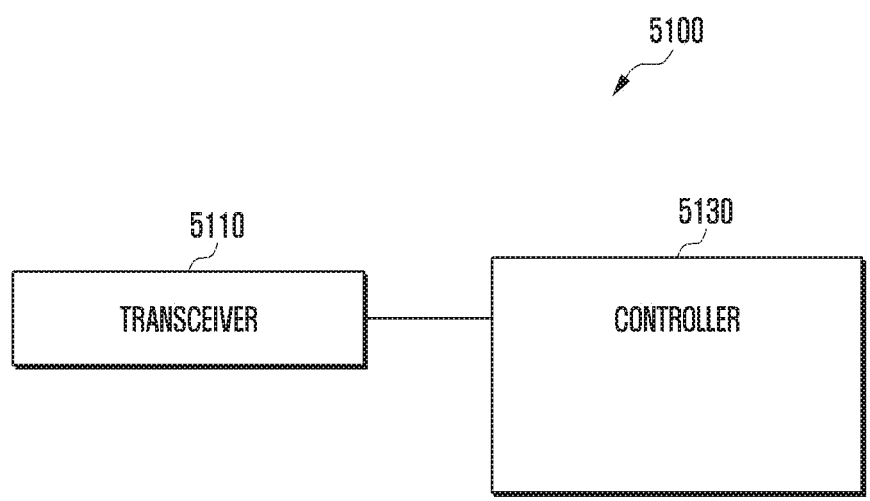
FIG. 51 is a block diagram of an eNB according to an embodiment of the present disclosure.

FIG. 51 is a block diagram of an eNB according to an embodiment of the present disclosure.

Referring to FIG. 51, an eNB 5100 is capable of including a transceiver 5110 for performing the transmission/reception of signals, and a controller 5130. The eNB 5100 is capable of performing the transmission/reception of signals, information, messages, and the like, via the transceiver 5110. The controller 5130 is capable of controlling all the operations of the eNB 5100. The controller 5130 is capable of including at least one processor. The controller 5130 is capable of controlling operations of the eNB described above in embodiments of the present disclosure.

The controller 5130 is capable of transmitting a beam feedback trigger condition to the UE, and receiving a MAC CE containing beam feedback information from the UE. When the controller 5130 ascertains that the MAC layer of the UE satisfies the beam feedback trigger condition, the beam feedback information may be triggered. For example, the beam feedback trigger condition may be triggered according to the determination of the MAC layer. The beam feedback trigger condition may also include a condition that a channel measurement value of at least one beam is greater than or equal to a sum of a preset threshold and a channel measurement value of a serving beam.

When uplink of the UE is synchronized, the controller 5130 is capable of allocating an uplink resource to the UE via a SR procedure, and receiving the beam feedback information via the allocated uplink resource.

When uplink of the UE is not synchronized, the controller 5130 is capable of performing control operations so that the beam feedback information can be received via a random access protocol. The controller 5130 receives a random access preamble from the UE, transmits a random access acknowledgement based on the received, random access preamble, receives beam feedback information in response to the transmission of the random access acknowledgement, and transmits a random access contention result based on the received, beam feedback information. A message receiving beam feedback information may be MSG3 in the random access protocol.

The controller 5130 transmits a beam change indication, based on the received, beam feedback information. After transmitting the beam change indication, the controller 5130 performs beam change, based on the beam feedback information, after a preset period of time has elapsed.

As described above, the system, method and apparatus according to embodiments of the present disclosure are capable of performing beam-tracking and beam feedback operation in a beamforming-based system. The system, method and apparatus are also capable of performing beam feedback and beam management (beam tracking) in a wireless system where a UE and an eNB using MIMO antennas coexist.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. A method performed by a terminal in a wireless communication system, the method comprising:
   receiving, from a base station, a radio resource control (RRC) message including information on a dedicated random access preamble for a beam failure recovery and information on a threshold for the beam failure recovery;
   measuring a first measurement value of a serving beam and a second measurement value of at least one beam;
   in case that the first measurement value below a first threshold, triggering a random access procedure for the beam failure recovery based on the second measurement value above a second threshold;
   selecting one beam for the beam failure recovery, in case that the beam failure recovery is triggered;
   transmitting, to the base station, the dedicated random access preamble associated with the one selected beam for the beam failure recovery based on contention-free random access;
   receiving, from the base station, a random access response as a response to the random access preamble; and
   transmitting, to the base station, a message as a response to the random access response, the message including first information indicating that the message is associated with beam feedback and a plurality of second information for identities of the at least one beam,
   wherein the RRC message further includes information on random access resources corresponding to each of at least two beams, and
   wherein a beam to be changed for the terminal and the base station is identified based on a random access resource used for the dedicated random access preamble.

2. The method of claim 1, wherein a random access preamble is transmitted based on contention based random access in case that a reference signal received power (RSRP) of the at least one beam for the beam failure recovery is less than the second threshold.

3. The method of claim 1, wherein the dedicated random access preamble is transmitted through the beam having a reference signal received power (RSRP) above the second threshold.

4. A terminal in a wireless communication system, the terminal comprising:
a transceiver; and
at least one processor configured to:
receive, from a base station via the transceiver, a radio resource control (RRC) message including information on a dedicated random access preamble for a beam failure recovery and information on a threshold for the beam failure recovery,
measure a first measurement value of a serving beam and a second measurement value of at least one beam,
in case that the first measurement value below a first threshold, trigger a random access procedure for the beam failure recovery based on the second measurement value above a second threshold,
select one beam for the beam failure recovery, in case that the beam failure recovery is triggered,
transmit, to the base station via the transceiver, the dedicated random access preamble associated with the one selected beam for the beam failure recovery based on contention-free random access,
receive, from the base station via the transceiver, a random access response as a response to the random access preamble, and
transmit, to the base station via the transceiver, a message as a response to the random access response, the message including first information indicating that the message is associated with beam feedback and a plurality of second information for identities of the at least one beam,
wherein the RRC message further includes information on random access resources corresponding to each of at least two beams, and
wherein a beam to be changed for the terminal and the base station is identified based on a random access resource used for the dedicated random access preamble.

5. The terminal of claim 4, wherein a random access preamble is received based on contention based random access in case that a reference signal received power (RSRP) of the at least one beam for the beam failure recovery is less than the second threshold.

6. The terminal of claim 4, wherein the dedicated random access preamble is transmitted through the beam having a reference signal received power (RSRP) above the second threshold.

7. A method performed by a base station in a wireless communication system, the method comprising:
transmitting, to a terminal, a radio resource control (RRC) message including information on a dedicated random access preamble for a beam failure recovery and information on a threshold for the beam failure recovery;
receiving, from the terminal, the dedicated random access preamble associated with one selected beam among at least one beam measured for a second measurement value, in case that the beam failure recovery is triggered based on a first measurement value of a serving beam below a first threshold and the second measurement above a second threshold, the dedicated random access preamble being received based on contention free random access;
transmitting, to the terminal, a random access response as a response to the random access preamble; and
receiving, from the terminal, a message as a response to the random access response, the message including first information indicating that the message is associated with beam feedback and a plurality of second information for identities of the at least one beam,
wherein the RRC message further includes information on random access resources corresponding to each of at least two beams, and
wherein a beam to be changed for the terminal and the base station is identified based on a random access resource used for the dedicated random access preamble.

8. The method of claim 7, wherein a random access preamble is transmitted based on contention based random access in case that a reference signal received power (RSRP) of the at least one beam for the beam failure recovery is less than the threshold.

9. The method of claim 7, wherein the dedicated random access preamble is transmitted through the beam having a reference signal received power (RSRP) above the second threshold.

10. A base station in a wireless communication system, the base station comprising:
a transceiver; and
at least one processor configured to:
transmit, to a terminal via the transceiver, a radio resource control (RRC) message including information on a dedicated random access preamble for a beam failure recovery and information on a threshold for the beam failure recovery,
receive, from the terminal via the transceiver, the dedicated random access preamble associated with one selected beam among at least one beam measured for a second measurement value, in case that the beam failure recovery is triggered based on a first measurement value of a serving beam below a first threshold and the second measurement above a second threshold, the dedicated random access preamble being received based on contention free random access,
transmit, to the terminal via the transceiver, a random access response as a response to the random access preamble, and
receive, from the terminal via the transceiver, a message as a response to the random access response, the message including first information indicating that the message is associated with beam feedback and a plurality of second information for identities of the at least one beam,
wherein the RRC message further includes information on random access resources corresponding to each of at least two beams, and
wherein a beam to be changed for the terminal and the base station is identified based on a random access resource used for the dedicated random access preamble.

11. The base station of claim 10, wherein a random access preamble is transmitted based on contention based random access in case that a reference signal received power (RSRP) of the at least one beam for the beam failure recovery is less than the threshold.

12. The base station of claim 10, wherein the dedicated random access preamble is transmitted through the beam having a reference signal received power (RSRP) above the second threshold.

* * * * *